(12) United States Patent
Mohamed et al.

(10) Patent No.: US 8,721,785 B2
(45) Date of Patent: *May 13, 2014

(54) METHOD FOR TREATING PARTICULATE MATERIAL

(75) Inventors: Abdel-Mohsen Onsy Mohamed, Al Ain (AE); Maisa Mabrouk El Gamal, Al Ain (AE)

(73) Assignee: United Arab Emirates University, Al Ain (AE)

( * ) Notice: Subject to any disclaimer, the term of this patent is extended or adjusted under 35 U.S.C. 154(b) by 172 days.

This patent is subject to a terminal disclaimer.

(21) Appl. No.: 12/992,520

(22) PCT Filed: May 8, 2009

(86) PCT No.: PCT/IB2009/005579
§ 371 (c)(1),
(2), (4) Date: Nov. 12, 2010

(87) PCT Pub. No.: WO2009/138857
PCT Pub. Date: Nov. 19, 2009

(65) Prior Publication Data
US 2011/0065854 A1    Mar. 17, 2011

(51) Int. Cl.
*C04B 14/28*    (2006.01)
(52) U.S. Cl.
USPC .......................................... 106/716
(58) Field of Classification Search
USPC .......................................... 106/716
See application file for complete search history.

(56) References Cited

U.S. PATENT DOCUMENTS

| | | | |
|---|---|---|---|
| 1,307,920 A | | 6/1919 | Nestell |
| 2,329,940 A | * | 9/1943 | Ponzer .......................... 106/751 |
| 2,871,133 A | | 1/1959 | Palonen et al. |
| 2,991,154 A | | 7/1961 | Patzias |
| 3,459,717 A | | 8/1969 | Signouret et al. |

(Continued)

FOREIGN PATENT DOCUMENTS

| | | |
|---|---|---|
| DE | 199 34 167 A1 | 1/2001 |
| EP | 0 048 106 A1 | 3/1982 |

(Continued)

OTHER PUBLICATIONS

Pending U.S. Appl. No. 12/989,623, filed Jan. 6, 2011 cited by applicants.*

(Continued)

*Primary Examiner* — Paul Marcantoni
(74) *Attorney, Agent, or Firm* — Kilpatrick Townsend & Stockton LLP

(57) ABSTRACT

This invention describes the use of a fluidized bed reactor in the carbonation of a solid, inorganic and alkaline particulate material which contains alkaline metal salts. It also describes a method for treating cement kiln dust (CKD) containing alkaline metal salts. The treatment method comprises two steps: (a) a hydration step; and (b) a carbonation step, wherein the carbonation step is carried out in a fluidized bed reactor. In a preferred aspect of the present invention, the treated CKD is used as an aggregate in sulfur polymer concrete (SPC). Accordingly, the present invention also provides a method for producing SPC, which method comprises heating and mixing treated CKD of the present invention, elemental sulfur and modified sulfur to produce a mixture. The SPC can be used as a barrier to restrict permeation of matter, e.g. in a containment construction for storing matter such as hazardous waste.

32 Claims, 22 Drawing Sheets

(56) References Cited

U.S. PATENT DOCUMENTS

| | | |
|---|---|---|
| 3,661,530 A | 5/1972 | Block |
| 3,989,534 A | 11/1976 | Plunguian et al. |
| 4,022,626 A | 5/1977 | McBee et al. |
| 4,025,352 A | 5/1977 | Leutner et al. |
| 4,031,184 A | 6/1977 | McCord |
| 4,032,469 A | 6/1977 | Bartzsch |
| 4,058,500 A | 11/1977 | Vroom |
| 4,188,230 A | 2/1980 | Gillott et al. |
| 4,219,515 A | 8/1980 | Helser et al. |
| 4,225,353 A | 9/1980 | Beaudoin et al. |
| 4,250,134 A * | 2/1981 | Minnick .................. 588/257 |
| 4,256,499 A | 3/1981 | Terrel |
| 4,293,463 A | 10/1981 | Vroom |
| 4,311,826 A | 1/1982 | McBee et al. |
| 4,344,796 A * | 8/1982 | Minnick .................. 588/256 |
| 4,348,313 A | 9/1982 | McBee et al. |
| 4,376,830 A | 3/1983 | Nimer et al. |
| 4,376,831 A | 3/1983 | Woo |
| 4,391,969 A | 7/1983 | McBee et al. |
| 4,402,891 A | 9/1983 | Kachinski, Jr. |
| 4,414,385 A | 11/1983 | Swanson |
| 4,428,700 A | 1/1984 | Lennemann |
| 4,496,659 A | 1/1985 | Nimer et al. |
| 4,584,179 A | 4/1986 | Galli |
| 5,173,044 A | 12/1992 | Neilsen |
| 5,264,013 A | 11/1993 | Brentrup |
| 5,678,234 A | 10/1997 | Colombo et al. |
| 5,792,440 A | 8/1998 | Huege |
| 5,962,630 A | 10/1999 | O'Brien et al. |
| 6,331,207 B1 | 12/2001 | Gebhardt |
| 6,334,895 B1 * | 1/2002 | Bland ..................... 106/705 |
| 6,416,691 B1 | 7/2002 | Pildysh |
| 6,441,054 B1 | 8/2002 | Ou et al. |
| 6,517,631 B1 * | 2/2003 | Bland ..................... 106/705 |
| 6,613,141 B2 | 9/2003 | Key, Jr. |
| 7,141,093 B2 | 11/2006 | Charette |
| 7,549,859 B2 * | 6/2009 | Dupuis .................... 432/58 |
| 8,043,426 B2 * | 10/2011 | Mohamed et al. ........ 106/716 |
| 2003/0183069 A1 | 10/2003 | Bubits |
| 2004/0010956 A1 | 1/2004 | Bubits |
| 2007/0186820 A1 | 8/2007 | O'Hearn |

FOREIGN PATENT DOCUMENTS

| | | |
|---|---|---|
| EP | 0 292 285 A1 | 11/1988 |
| EP | 0 402 507 A1 | 12/1990 |
| EP | 0 484 001 A2 | 5/1992 |
| EP | 1 961 713 A1 | 8/2008 |
| GB | 1007336 | 10/1965 |
| JP | 62-62120 | 3/1987 |
| JP | 64-52891 A | 2/1989 |
| JP | 2005 279370 | 10/2005 |
| JP | 2006255705 A | 9/2006 |

OTHER PUBLICATIONS

Abu-Zuhri et al., "Polarographic Study of Some Arylidene-2-Pyridylhydrazones," An-Najah J. Res., 1992, vol. II, No. 7, pp. 29-34.

ACI Committee, "Guide for mixing and placing sulfur concrete in construction" Reported by ACI Committee 548, 1993 (ACI 548.2R-93), American Concrete Institute, Farmington Hills, Mich., USA.

Ballone, et al., "Density functional and Monte Carlo studies of sulfur. II Equilibrium polymerization of the liquid phase," Journal of chemical physics, 2003, vol. 119, No. 16, pp. 8704-8715.

Beaudoin, et al., "Durability of Porous systems impregnated with dicyclopentadiene-modified sulfur," The International Journal of Cement Composites and Lightweight Concrete, 1984, vol. 6, No. 1, pp. 13-17.

M. Fernandez Bertos et al., "A review of accelerated carbonation technology in the treatment of cement-based materials and sequestration of $CO_2$," Journal of Hazardous Materials, 2004, B112, pp. 193-205.

Bordoloi et al., "Plastic sulfur stabilization by copolymerization of sulfur with dicyclopentadiene," Advances in Chemistry Series, 1978, No. 165, American Chemical Society, Washington, DC, pp. 31-53.

Blight et al.,. "Preparation and properties of modified sulfur systems," In New Uses of Sulfur-II, Advances in Chemistry Series, 1978, No. 165 American Chemical Society, pp. 13-30.

Carpenter, A.B., "Oriented overgrowths of thaumasite on ettringite," American Mineralogist, 1963, vol. 48, pp. 1394-1396.

Currell, B.R., "The importance of using additives in the development of new applications for sulfur," Symposium on new users, for sulfur and pyrites, Madrid, 1976, pp. 105-110.

Darnell et al., "Full-scale tests of sulfur polymer cement and non-radioactive waste in heated and unheated prototypical containers," EGG-WM-10109, 1992, Idaho Natl. Engineering Lab., Idaho Falls, Idaho, pp. 1-88.

Darnell, G. R., "Sulfur polymer cement, a new stabilization agent for mixed and Low-level radioactive waste," EGG-M-91419, 1991, Idaho Natl. Engineering Lab., Idaho Falls, Idaho, pp. 1-19.

Dow Technical Data Sheet for TRITONTM X-100 & X-100 CG Surfactant, Product Information, 4 pages.

Ecker et al., Bundesministerium fur Wirtschaftiche Angelenheiten, 1986, StraBenforschung Nr. (678), Schwefelbton im Strassenbau. (in German) "Sulfur Concrete in Road Constructions," pp. 1-92.

Feldman et al., "Some Factors affecting durability of sulfur impregnated porous bodies," Cement and Concrete Research, 1978, vol. 8, No. 3, pp. 273-282.

Ghorab et al., "Reuse of Cement Kiln Bypass Dust in the Manufacture of Ordinary Portland Cement," Polymer-Plastics Technology and Engineering Nov. 2004, vol. 43, Issue 6, , pp. 1723-1734.

Helser et al, 1992, "Polymers for Subterranean Containment Barriers for Underground Storage Tanks (USTs)," Environmental and Waste Technology Center, Dec. 1992, Brookhaven National Laboratory, Upton, NY, pp. 1-52, BNL-48750.

Heiser et al, "A Process for solidifying sodium nitrate waste in polyethylene," Symposium on Environmental aspects of stabilization and solidification of hazardous and radioactive wastes, 1989, pp. 1-24, BNL-42564.

Jong et al., "Fiber reinforcement of concrete to enhance flexural properties," R1-8956, Bureau of Mines, Department of Interior, Washington, DC, 17 pages.

Kalb et al, "Comparison of modified sulfur cement and hydraulic cement for encapsulation of radioactive and mixed wastes," 1990, pp. 1-13, BNL-45163.

Kalb et al., "Modified sulfur cement encapsulation of Mixed Waste Contaminated Incinerator Fly Ash," Waste Management Journal, 1991, vol. 11, No. 3, pp. 147-153, Pergamon Press, NY.

Lageraaen et al, "Use of Recycled Polymers for Encapsulation of Radioactive, Hazardous and Mixed Wastes," Brookhaven National Laboratory, 1997, pp. 1-30, BNL-66575 Informal Report.

Lin et al, "Modifications of Sulfur Polymer Cement (SPC) Stabilization and Solidification (S/S) Process," Waste Management, 1995, vol. 15, Nos. 5/6, pp. 441-447.

Mansoori, G Ali, "Nanoscal Structures of Asphaltene Molecule, Asphaltene Steric-Colloid and Asphaltene Micelles & Vesicles," Extract from Principles of Nanotechnology, 2005, http://trigger.uic.edu/~mansoori/asphaltene. molecule_html, accessed on Mar. 22, 2011, pp. 1-6.

Masson et al., "Bitumen microstructure by ,modulated differential scanning calorimetry," Thermochim Acta 374, 2001, pp. 105-114.

Masterton et al., Chemistry: Principles and Reactions, Third edition, 1997, pp. 159-169, Harcourt Brace College Publishers, Florida.

Mattus et al., "Evaluation of Sulfur polymer cement as a waste form for the immobilization of Low-Level Radioactive or Mixed Waste,", Oak Ridge National Laboratory, 1994, pp. 1-40, Oak Ridge, TN, ORNL/TM-12657.

Mayberry et al., Technical area status report for low-level mixed waste final waste forms, Aug. 1993, vol. 1, , Mixed Waste Integrated Program, Office of Technology Development, US. Department of Energy, pp. 1-138, DOE MWIP-3.

McBee et al., "Corrosion-resistant sulfur concretes," Report of Investigation 8758, Bureau of Mines Report, Dept. of Interior, U.S. Bureau of Mines, 1983, pp. 1-31, Washington, D.C.

(56) References Cited

OTHER PUBLICATIONS

McBee et al., "Development of specialized sulfur concretes," Report of Investigation 8346, U.S. Department of the Interior, Bureau of Mines, 1979, pp. 1-26.

McBee et al., Abstract of "Modified-sulfur cements for use in concretes, flexible paving's, coatings, and grouts," Proceedings, 1981, SULFUR-81 International Conference on Sulfur, Calgary, 1 page.

McBee et al., "Sulfur," Kirk-Othmer Encyclopedia of Chemical Technology, 1985, vol. 23, pp. 1-37, Wiley & Sons, Inc.

McBee et al, "Modified-sulfur concrete technology," Proceedings, SULFUR-81, 1981, pp. 367-388, International Conference on Sulfur, Calgary.

Mehta et al., "Hydraulic Cements," Concrete, Microstructure, Properties and Materials, 2005, Third Edition, Chapter 6, pp. 203 and 204.

Mohamed et al., "Compositional control on sulfur polymer concrete production for public works," Sustainable Practice of Environmental Scientists and Engineers in Arid Lands, A.M.O., 2006, pp. 1-12, A. A. Balkema Publishers.

Mohamed et al., "Development of modified sulfur cement and concrete barriers for containment of hazardous waste in arid lands," Sustainable Development and Climate Change, Feb. 5-7, 2007, pp. 1-11, Doha, Qatar.

Mohamed et al., "Durability and leachability characteristics of modified sulfur cement and concrete barriers for containment of hazardous waste in arid lands," 1st Joint QP-JCCP Environment Symposium in Qatar, Sustainable Development and Climate Change, Feb. 5-7, 2007, pp. 1-12, Doha, Qatar.

Mohamed et al., "Evaluation of the Potential Use of Cement Kiln Dust as an Aggregate Material for Manufacturing of Sulfur Polymer Concrete," 10th Annual UAEU Research Conference, Apr. 2009, pp. 1-8.

Mohamed et al., "Solidification/Stabilization Processes," Geoenvironmental Engineering, Developments in Geotechnical Engineering, 82, 1998, Chapter 20, pp. 529-557.

Mohamed et al., "Sulfur based hazardous waste solidification," Environmental Geology, Sep. 2007, vol. 53, No. 1, pp. 159-175, Springer-Verlag.

Mohamed et al., "Sulfur Harvesting: 1. Compositional control on sulfur polymer concrete production for public works," The Seventh Annual UAE University Research Conference Proceedings, Sat Apr. 27, 2006 15:45-16:00, pp. 1-10, Eng 131-Eng 140.

Mohamed et al., "Sulfur Harvesting: 2. Thermo-mechanical behavior of newly developed sulfur polymer concrete," The Seventh Annual UAE University Research Conference Proceedings, Sat Apr. 27, 2006 15:45-16:00, pp. 1-10, Eng 131-Eng 140.

Mohamed et al., (2006) "Thermo-mechanical performance of newly developed sulfur polymer concrete," Developments in Arid Regions Research, vol. 3, pp. 15-26.

Moriyama et al., "Incorporation of an evaporator concentrate in polyethylene for a BWR," Nuclear and Chemical Waste Management, 1982, vol. 3, Issue 1, pp. 23-28.

Nnabuife, Elias Lovet Chukwunonso, "Forest and agricultural residues may not be wastes," Nnamdi Azikiwe University, Awka, Nov. 28, 2001, pp. 1-54.

Ozdemir et al, "Separation of Pozzolonic Material from Lignitic Fly Ash of Tuncbilek Power Station," International Ash Utilization Symposium, 2001, pp. 1-8, Centre for Applied Energy Research, Univ. of Kentucky, Paper #45.

Pickard, S. S., "Sulfur Concrete at AMAX Nickel-A Project Case History," Concrete International: Oct. 1, 1984, vol. 6, Issue 10, pp. 35-41.

Sandrolini et al., "Sulfur-polymer matrix composites from particulate wastes: A sustainable route to advanced materials," Composites: Part A 37, 2006, pp. 695-702.

Sigma "ProductInformation" extract for Triton X-100 (RTM), 2 pages.

Sliva et al., 1996, "Sulfur Polymer Cement as a Low-Level Waste Glass Matrix Encapsulant," Pacific Northwest National Laboratory, Richland, Wash., pp. 1-130, PNNL-10947.

Soderberg, A. F. (1983) "A new construction material," Sudicrete, SUDIC, Calgary (Copy not available).

Standard Specification for Sulfur Polymer Cement and Sulfur Modifier for Us in Chemical-Resistant, Rigid Sulfur Concrete, American Society for Testing and Materials, Jan. 1999, pp. 1-2, ASTM C1159-98.

STARcrete, The Concrete Answer to Corrosion Problems, http://www.starcrete.com, STARcrete Technologies Inc., 2000, The first commercial sulfur concrete, 1 page.

STN Easy, Registry extract for Triton X-100 (RTM), 2009, 2 pages.

Sullivan et al., "Development and testing of superior sulfur concretes," Report of Investigations 8160, 1976, pp. 1-35, Bureau of Mines Report, U.S. Dept of Interior, Washington, D.C.

Syroezhko et al., "Modification of Paving Asphalts with Sulfur," Russian Journal of Applied Chemistry, 2003, vol. 76, No. 3, pp. 491-496.

"Types of Chemical Reactions: Synthesis Reaction," www.matthewstudenny.com, 2 pages.

Vroom, A.H., "Sulfur concrete goes global," Concrete International, Jan. 1998, vol. 20(1), pp. 68-71.

Yousri, Kh.M., "Prospects of Sulfur as a Construction Material in the U.A.E.," Abstract, Poster-E-31 at the 7th International Conference on Chemistry and Its Role in Development, Mansoura University, Apr. 14-17, 2003, 1 page.

* cited by examiner

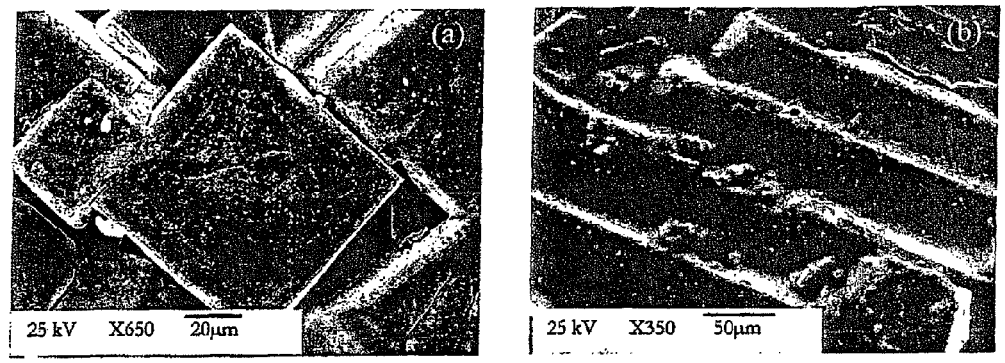
Figure 19 (a) + (b)
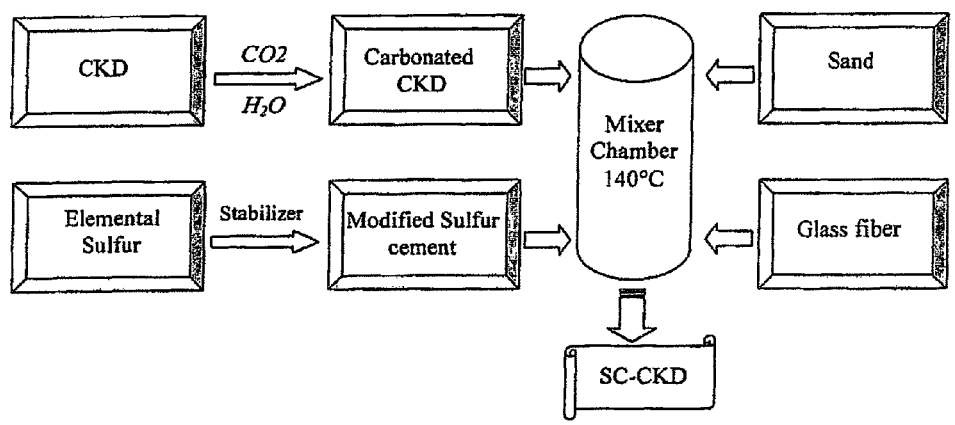
Figure 20

METHOD FOR TREATING PARTICULATE MATERIAL

FIELD OF THE INVENTION

This invention relates to the use of a fluidized bed reactor in the carbonation of a solid, inorganic and alkaline particulate material, and in particular to a method for treating cement kiln dust (CKD), more particularly to a process for converting CKD into a stable material and an apparatus therefor. This invention also relates to the use of treated CKD as a conventional aggregate in producing a durable sulfur polymer concrete (SPC). The invention moreover provides a process for immobilizing solid waste pollutants and converting them into a physical state wherein they are non-hazardous to the environment. The SPC provided by the present invention has numerous applications in public works.

BACKGROUND OF THE INVENTION

Solid waste management represents one of the important areas of international requirements for health, environmental pollution control and economic development. Various waste products or materials are generated by various industries. For example, during Portland cement production, cement kiln dust (CKD) is removed from the stream of kiln gases as they pass through the kiln's dust collection system during clinker production. CKD poses a health hazard, storage problem, and is a potential source of pollution. Thus, in addition to being a waste of potentially valuable material, it also presents serious air stream pollution and dumping problems.

On the other hand, another waste by-product, which is produced in large amounts, is sulfur. Thus, large quantities of by-product sulfur are currently generated by the cleanup of hydrogen sulfide in the up-stream production of petroleum and natural gas and down-stream refinery operations. Such sulfur does have some uses, such as in the manufacture of fertilizers and certain chemicals. However, there has been a noticeable tendency towards an oversupply of sulfur resulting from the ever increasing desulfurization of primary products.

In the following, brief description of the waste by products is discussed.

CKD

CKD is a powder composed principally of micron-sized particles collected from electrostatic precipitators during the high temperature production of cement clinker. The chemical composition of CKD depends both on the raw materials used to produce the clinker, and on the type and source of carbon-based fuel used to heat the clinker in the rotary kiln. The raw material is a combination of calcareous rock or sediment, such as limestone or chalk; and an alumino-silicate material, such as clay or shale.

CKD can vary in composition from virtually unaltered kiln feed to over 90% alkali sulfates and chlorides depending on process type, kiln configuration, raw materials, fuels, process characteristics, and points of collection. It can vary in particle size from that of fine sand or silt to that of clay, with particle size distribution ranging from very broad to very narrow depending on material and process parameters. The quantities of dust generated from a particular kiln depends on the factors that control CKD composition as well as the internal configuration of the kiln, the quantities of gases passed through the kiln, and other operating conditions.

CKD is a major problem at many cement manufacturing plants. Dust is generated in large quantities and is often not suitable for direct return to the cement-producing process as a feed because of high concentrations of alkali metals and sulfates, and incompatibility of the dust with the process. Since large quantities of dust cannot be returned directly to the kiln, it must be disposed of in a safe manner. General disposal practices are placement of dust in waste piles or in land- or quarry fills. Such disposal methods are inherently unsatisfactory because they involve wasting a material for which significant processing and handling costs and efforts have been incurred. Since environmental regulations have matured, the costs and problems of disposal have become more onerous and continued disposal of kiln dust has become more expensive.

When CKD is brought into contact with water, high concentrations of anhydrous phases, which include oxides, sulfates and chlorides, are soluble and leached. Since the prime source of CKD instability is the high contribution of alkali metals oxides, and sulfates, which have high affinity towards water, the question is how to convert the undesired oxides into stable materials like carbonates or bicarbonates, to decrease the solubility, and consequently increase the durability of the application, through effective and inexpensive processes.

Treated CKD has the potential for use in engineering projects such as soil stabilization, waste stabilization/solidification, Portland cement replacement, asphalt pavement, controlled low strength material (flowable fill), Pozzolanic activator, lightweight aggregate, and construction fill, but this isn't always possible Problems relating to CKD have long been recognized, and various methods have been proposed for their solution. The following methods have been suggested for treating CKD. The methods include leaching the dust with water to remove alkalis. The hazard potential of CKD can also be reduced by converting the chemical constituents into an insoluble and immobile form, i.e., stabilization. This involves chemical changes to the stable constituents in the treated substance to produce insoluble, immobile and less toxic compounds.

Nestell, in a U.S. Pat. No. 1,307,920 mixed kiln dust with water and passed carbon dioxide into the resulting mixture to substantially neutralize the slurry. However the product could not be recycled back into the cement kiln for its use as a kiln feed material unless the alkali levels of the original dust were very low.

Palonen et al., in U.S. Pat. No. 2,871,133 agglomerated CKD at high pressure and temperature, to render the alkalis more soluble. The resulting heat-treated agglomerate was then leached with water to remove the soluble alkalis. The residual solids are further treated to adjust moisture for return to a cement kiln. This process suffers because it is very complicated.

Patzias, in U.S. Pat. No. 2,991,154 mixed kiln dust with water and then heated at a known pressure. The slurry was filtered to separate the solution containing the alkalis from the residual solids. Then the separated solution was treated by neutralization with sulfuric acid, evaporation, centrifugation, or a combination thereof, to recover alkali sulfates, for recycling to the cement-making process. This process is not practical because of high water to dust ratio, high temperature, and high pressure to affect the dissolution of alkalis. Kiln dust solids would differ significantly in composition from normal kiln feed requiring kiln feed correction.

McCord, in U.S. Pat. No. 4,031,184 leached CKD at high temperature (but not at high pressure) using potassium chloride to enhance solubility. Then, the CKD solids are flocculated using oil and a fatty acid and the precipitates are palletized. Since the solubility of potassium chloride is higher than that of potassium sulfate by more than a factor of two in both hot and cold water, it is much more likely that any precipitate will be potassium sulfate rather than potassium chloride.

Helser, et al, in U.S. Pat. No. 4,219,515 added carbon dioxide to wastewater from the production of hydrous calcium silicates from lime and silica in order to remove calcium from the water so that it can be recycled to the production process. The resulting calcium carbonate precipitate presumably can be re-producing lime.

Kachinski, in U.S. Pat. No. 4,402,891 added water to CKD in a carbon dioxide atmosphere. Alkalies are not completely removed, and the material is not suitable for return to a cement-making process.

Neilsen, in U.S. Pat. No. 5,173,044 used wet-process slurry to scrub sulfur from kiln gases and retain them in the kiln. This process is of limited applicability because it retains all of the alkalies in the kiln so that, in the majority of cases, only limited amounts of CKD can be used.

Brentrup, in U.S. Pat. No. 5,264,013 collected CKD in a conventional dust collector, which was later progressively heat-treated to volatilize low-boiling pollutants and collect them with a carbonaceous filter medium. The ability to return CKD to the cement-making process was not enhanced.

Huege, in U.S. Pat. No. 5,792,440 used carbon dioxide to treat a supernatant liquid after leaching and separation of the solids from lime kiln dust in order to produce high purity precipitated calcium carbonate as a separate product, for treating flue gases exhausted from a lime kiln. This method is only useful as an effluent control.

Gebhardt, in U.S. Pat. No. 6,331,207 moistened the supply of CKD with carbon dioxide to convert the materials to carbonates. During the carbonation cycle, the water in the hydroxides is released to formulate slurry. The soluble alkalis and sulfate are released in the liquid phase with the solids being separated from the liquid. Then, the solids were washed to provide a useful feed to the kiln while, the liquid contains alkali salts.

Prior methods that have been used in the past frequently suffer from the following problems:

1. Only part of the alkalis are readily soluble, often half or less.
2. Typical ratios of water to dust are 10:1 to 20:1, or higher.
3. An effluent, high in pH (>10) and dissolved solids, is discharged.
4. Dissolved solids tend to precipitate in the receiving waters.
5. The high pH effluent is detrimental to the biosphere.
6. The recovered solids are high in water content, often over 70%.
7. Adjustments to kiln feed chemistry may be required when treated dust is returned to the kiln.

These problems are so severe that the leaching methods of the past have been largely banned by Environmental Protection bodies.

Sulfur and SPC

On a different note, another waste by-product which is produced in large amounts is sulfur. Thus, large quantities of by-product sulfur are currently generated by the cleanup of hydrogen sulfide in the up-stream production of petroleum and natural gas and down-stream refinery operations. Such sulfur does have some uses, such as in the manufacture of fertilizers and certain chemicals. However, there has been a noticeable tendency towards an oversupply of sulfur resulting from the ever increasing desulfurization of primary products.

The U.S. Bureau of Mines developed techniques for using by-product sulfur to stabilize toxic and hazardous wastes (Sullivan, T. A. and Mc Bee, W. C., 1976, Development and testing of superior sulfur concretes, BuMines Report No. RI 8160, U.S. Bureau of Mines, Washington, D.C., 30; and Mc Bee, W. C., Sullivan, T. A. and Jong, B. W., 1981, Modified sulfur concrete technology, Proceedings, SULFUR-81 International Conference on Sulfur, Calgary, 367-388). Developments in sulfur polymer concrete (SPC) are in progress to find alternative markets for the excess in elemental sulfur. SPC typically consists of elemental sulfur, sulfur polymer stabilizer, fine filler material, and aggregates which can include waste materials such as sand, blast furnace slag, and fly ash (Kalb P. D., Heiser J. H., Colombo P., 1991, Modified sulfur cement encapsulation of mixed waste contaminated incinerator fly ash, Waste Management, pages 11:147; ACI Committee 548, 1993, Guide for mixing and placing sulfur concrete in construction [ACI 548.2R-93], American Concrete Institute, Farmington Hills, Mich., USA; Mohamed, A. M. O. and El Gamal, M. M., 2006, Compositional control on sulfur polymer concrete production for public works, in: "Sustainable Practice of Environmental Scientists and Engineers in Arid Lands, A. M. O. Mohamed [ed.], A. A. Balkema Publishers, 556 pages; Mohamed, A. M. O. and El Gamal, M., 2007a, "Sulfur based hazardous waste solidification", Environmental Geology, Volume 53, Number 1, pages 159-175; and Mohamed, A. M. O. and El Gamal, M, 2007b, "Development of modified sulfur cement and concrete barriers for containment of hazardous waste in arid lands", Sustainable Development and Climate Change", Feb. 5-7, 2007, Doha, Qatar).

SPC can be produced by a hot mix procedure similar in some respects to that of asphalt. SPC is a construction material with unique properties and characteristics. It can perform well in some aggressive environments and can offer benefits as an alternative construction material, particularly in situations that require a fast setting time, placement in excessive cold or hot climates, corrosion resistance and impermeability.

CKD-Based SPC

SPC with excellent strength properties may be prepared from sulfur and CKD, however, material durability is a problem especially when the SPC is exposed to humid conditions, and failure is immanent. CKD is composed of an assemblage of oxidized and anhydrous phases, which are unstable or highly soluble at earth surface conditions. Undesirable components of CKD can escape from CKD-containing SPC into the surrounding environment and this can cause problems.

SUMMARY OF THE INVENTION

The present invention provides the use of a fluidized bed reactor in the carbonation of a solid, inorganic and alkaline particulate material which contains alkaline metal salts. The present invention also provides a method for treating CKD containing alkaline metal salts, which method comprises (1) a hydration step (2) a drying step and (3) a carbonation step, wherein the carbonation step is carried out in a fluidized bed reactor, and wherein if the hydrated CKD resulting from step (2) comprises particles greater than 10 mm in size at their widest point the method further comprises a fractionating step between steps (2) and (3), which fractionating step involves removing particles greater than 10 mm in size at their widest point. The present invention also provides a fluidized bed reactor apparatus for use in such methods. The present invention also provides treated CKD, which is obtained or obtainable by this treatment method. The treated CKD offers various advantages over untreated CKD as is explained further below. In particular, alkali metals and sulfates are less likely to escape from the treated CKD into the surrounding environment.

The treated CKD has various uses. For instance, it may be used (i) as an aggregate in concrete, (ii) in the neutralization of acid mine drainage or acidic soils, (iii) in a clinker making process, (iv) in the stabilization of soft soils, (v) in the treatment of expansive/swelling soils, (vi) backfilling, (vii) as a sub-base material, (viii) as a pozzolanic activator, or (ix) in asphalt pavement.

In a preferred aspect of the present invention the treated CKD is used as an aggregate in SPC. Accordingly, the present invention also provides a method for producing SPC, which method comprises heating and mixing treated CKD of the present invention, elemental sulfur and modified sulfur to produce a mixture. The SPC can be used as a barrier to restrict permeation of matter, e.g. in a containment construction for storing matter such as hazardous waste.

DESCRIPTION OF THE DRAWINGS

FIG. 8($b$) shows an x-ray diffraction analyses result corresponding to CKD after hydration and carbonation.

FIG. 19 is SEM images for (a) unmodified sulfur (b) modified sulfur.

FIG. 20 is flow diagram illustrating a possible production process for SPC. The raw materials undergo treatment and modification reactions.

FIG. 34$b$ shows the design of a typical hazardous waste containment construction that is for use in arid land.

FIG. 34$c$ shows the design of a new containment construction provided by the present invention.

DETAILED DESCRIPTION OF THE INVENTION

Figure 1:
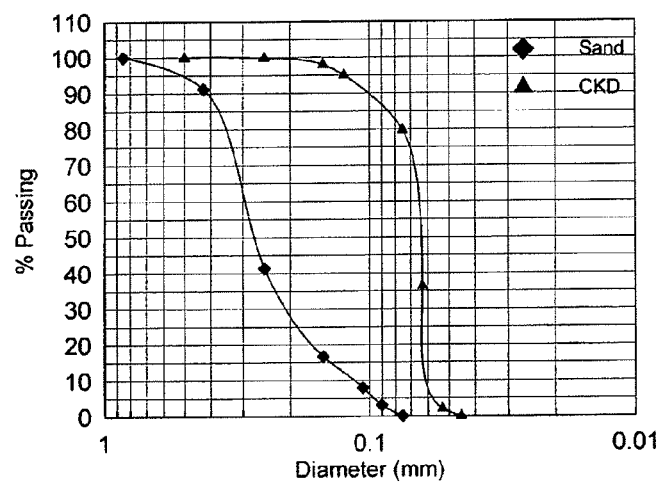
FIG. 1 is a grain size distribution of the used sand and CKD.
Figure 2:
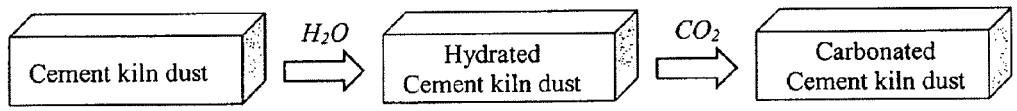
FIG. 2 is a diagrammatic representation of the CKD treatment process of the present invention.

The present invention provides the use of a fluidized bed reactor in the carbonation of a solid, inorganic and alkaline particulate material which contains alkaline metal salts, such as cement kiln dust (CKD) which is (or has been) hydrated. The present invention further provides a method for treating CKD containing alkaline metal salts, which method comprises (1) a hydration step, (2) a drying step and (3) a carbonation step, wherein the carbonation step is carried out in a fluidized bed reactor, and wherein if the hydrated CKD resulting from step (2) comprises particles greater than 10 mm in size at their widest point the method further comprises a fractionating step between steps (2) and (3), which fractionating step involves removing particles greater than 10 mm in size at their widest point.

Any solid, inorganic, and alkaline particulate material can be subjected to carbonation according to the present invention as long as it contains alkaline metal salts. Typically, the particulate material consists of particulates which are no greater than 50 μm, preferably no greater than 20 μm, more preferably no greater than 10 μm at their widest point (maximum diameter). The particulate material is typically a dust. In one embodiment the particulate is a waste material. In a preferred aspect of the present invention the particulate material is hydrated CKD. The hydrated CKD typically contains oxides and sulfates (as well as the alkaline metal salts) and is described further below. The treatment method of the present invention is particularly useful for waste CKD; especially waste CKD which is a by-product of Portland cement manufacture.

CKD which is treatable using the method of the present invention typically has a mean particle size which is greater than 1 μm, more typically greater than 2 μm, more typically still greater than 3 μm. In one embodiment, it is up to 10 or even up to 20 µm, but usually it is less than 8 µm, more typically less than 5 µm. The mean particle size is preferably measured using SEM. The CKD generally has a pH of at least 10, more typically at least 11, such as at least 11.5 or at least 12. Usually, its pH is less than 13, such as less than 12.5. The pH is preferably measured by Cyper Scan 510 PC, as per APHA et al., 1998; Standard Methods for the Examination of Water and Wastewater, 20th Ed.; American Public Health Association, (Eds.), Washington, D.C. Method No. 423. The electrical conductivity of the CKD is typically at least 80 µs, more typically at least 90 µs. Generally it is less than 110 µs, more often less than 100 µs. The electrical conductivity is preferably measured by Cyper Scan 510 PC, as per APHA et al., 1998. Method No. 205. The CKD usually has at least 400, more typically at least 500 mg/l TDS (total dissolved solids), though generally the TDS is less than 700, more often less than 600 mg/l. The TDS is preferably measured by Cyper Scan 510 PC, as per APHA et al., 1998. Method No. 209. The CKD typically has a LOI (loss on ignition) of at least 15, more typically at least 20, generally at least 23% by weight. The LOI is typically less than 35, more typically less than 30, generally less than 27. The LOI is preferably measured by Thermo Gravimetric Analyzer Perkin Elmer TGA7 applying temperature range of the TGA (50-1000° C.) and a scan rate of 20° C./min. The liquid limit of the CKD is typically less than 40%, more typically less than 30%. Generally it is at least 10%, more often at least 20%. The liquid limit is preferably measured by Geogauge™ user Guide; Humboldt MFG; in accordance with ASTM D4318-1984. The plastic limit of the CKD is typically less than 40%, more typically less than 30%. Generally it is at least 10%, more often at least 20%. The plastic limit is preferably measured by Geogauge™ user Guide; Humboldt MFG; in accordance with ASTM D4318-1984. The CEC (cation exchange capacity) of the CKD is typically at least 5, more typically at least 8, most typically at least 10 meq/100 gm of dry material. Generally it is less than 20, more often less than 15, most often less than 13 meq/100 gm of dry material. The CEC is preferably measured by the methods outlined in Soil Survey Investigations Report No. 42, Soil Survey Laboratory Methods Manual. Version 4, November 2004.

CKD which is treatable using the method of the present invention typically leaches at least 1000 mg/l of sulfate, more typically at least 1500 mg/l, when tested according to the British Standard BS EN12457:2002, using the short term (6 hr) test with a ratio of water to CKD of 2 L/kg (this test is used for all leaching measurements referred to below unless stated otherwise). In one embodiment, the CKD leaches more sulfate, e.g. 2500 or 3000 mg/l sulfate, but it generally leaches less than 2000 mg/l. The CKD typically leaches at least 500 mg/l of Cl, more typically at least 1000 mg/l. In one embodiment, it leaches more Cl, e.g. 2000 or 2500 mg/l, but it generally leaches less than 1500 mg/l. The CKD typically leaches at least 4 mg/l of Sr, more typically at least 6 mg/l. In one embodiment, it leaches more Sr, e.g. 15 or 20 mg/l, but it generally leaches less than 10 mg/l. The CKD typically leaches at least 12 mg/l of Cr, more typically at least 15 mg/l. In one embodiment, it leaches more Cr, e.g. 25 or 30 mg/l, but generally it leaches less than 20 mg/l. The CKD typically leaches at least 1000 mg/l of Ca, more typically at least 1200 mg/l. In one embodiment, it leaches more Ca, e.g. 2000 or 2500 mg/l, but it generally leaches less than 1500 mg/l. The CKD typically leaches at least 1500 mg/l of K, more typically at least 2000 mg/l. In one embodiment, it leaches more K, e.g. 3000 mg/l, but it generally leaches less than 2500 mg/l. The CKD typically leaches at least 150 mg/l of Na, more typically at least 200 mg/l. In one embodiment, it leaches more Na, e.g. 300 mg/l, but it generally leaches less than 250 mg/l.

The CKD which is treatable using the method of the present invention typically contains a mixture of various components, the most abundant being calcium oxide (CaO). The amount of CaO is typically 35 to 55%, more typically 40 to 50% by weight. Other possible components (and their typical proportions by weight) include $SiO_2$ (8 to 25%, typically 10 to 20%), $Al_2O_3$ (1 to 10%, typically 2 to 6%), $Fe_2O_3$ (1 to 10%, typically 2 to 6%), MgO (0.2 to 6%, typically 0.5 to 4%), $K_2O$ (1 to 10%, typically 1.5 to 6%), $Na_2O$ (0.1 to 5%, typically 0.2 to 2%), $SO_3$ (1 to 10% typically 1.5 to 6%) and Cl (0.2 to 6%, typically 0.5 to 4%). As already noted above, the amount of CKD loss on ignition (LOI) is typically 15 to 35, more typically 20 to 30% by weight.

The hydration step of the method of the present invention typically involves mixing the CKD with water. A temperature of 25 to 50° C. is preferably used for this, more preferably a temperature of 30 to 45, typically 35 to 40° C. The mixing usually takes place for at least 10 minutes and may continue up to, e.g., 1 hour. Usually, it takes place for at least 20 minutes, and generally it takes place for 40 minutes or less, more often 30 minutes or less. Mixing is suitably carried out at 200 to 1000 rpm, typically 400 to 800 rpm and most preferably at around 600 rpm. In one embodiment, the weight ratio of CKD to water is from 0.1:1 to 10:1, but preferably is from 0.5:1 to 5:1, and most preferably is from 1:1 to 3:1. Typically, it is from 1.1:1 to 2:1.

The hydration step is used to produce hydrated CKD. A drying step is then used to reduce the moisture content of the hydrated CKD. Preferably the drying step reduces the moisture content of the hydrated CKD to 20% by weight or less, typically 15% by weight or less, more typically 12% by weight or less, e.g. around 10% by weight. Generally the moisture content after drying is at least 2, more often at least 5 and typically at least 7% by weight. The moisture content is preferably measured by gravimetric method, oven drying, using BS 1377: Part 2:1990. The reduced moisture content achieved by the drying step is advantageous for the carbonation step.

The drying step is preferably carried out by heating, e.g. in an oven. In this case the drying temperature and time will obviously depend on the amount of water present following the hydration step. For instance, a typical drying step could be carried out using a temperature of 60 to 100° C., or 70 to 90° C., e.g. around 80° C. In one embodiment, the drying step lasts for 12 to 48 hours, typically around 24 hours.

It is also advantageous for the carbonation step if the hydrated CKD does not contain larger size particles. Thus, if the hydrated CKD comprises particles greater than 10 mm in size at their widest point after the drying step, then a fractionating step is carried out prior to the carbonation step. In one embodiment, fractionation is done using standard methods, e.g. by using a sieve with appropriately sized holes. For instance, if the hydrated CKD comprises particles greater than 10 mm at their widest point after the drying step, the fractionating step typically comprises passing the particles through a mesh sieve with 10 mm sized holes. In a preferred aspect of the present invention, the fractionating step is carried out if the hydrated CKD comprises particles greater than 8 mm in size, and in a more preferred embodiment the fractionating step is carried out if the hydrated CKD comprises particles greater than 4 mm in size, and more preferably still the fractionating step is carried out if the hydrated CKD comprises particles greater than 2 mm in size. In each of these cases the fractionating step employed in the method is of course used to remove particles larger than the relevant size.

Thus, the method of the present invention typically includes a fractionating step to remove particles greater than 8 mm at their widest point. More typically all particles greater than 4 mm are removed, and most typically all particles greater than 2 mm or $\frac{1}{16}$-inch are removed. Preferably the fractionating step is carried out by sieving.

As noted above, the present invention provides the use of a fluidized bed reactor in the carbonation of a solid, inorganic and alkaline particulate material containing alkaline metal salts. Preferably the material is hydrated CKD as defined above. Generally the hydrated CKD is obtained or obtainable according to the above-described steps, preferably including the drying and fractionating steps. For instance, in a particularly preferred embodiment of the present invention the hydrated CKD preferably has a moisture content of 7 to 12% by weight and preferably has no particles greater than 2 mm at their widest point. If a solid, inorganic and alkaline particulate material other than hydrated CKD is being carbonated, the preferred moisture contents and maximum particle sizes indicated above for hydrated CKD still apply.

Some preferred aspects of the carbonation step of the method of the present invention and preferred aspects of the treated CKD obtained or obtainable using the method of the present invention are set out below. These preferred aspects are also relevant to the use of the present invention as defined above, namely the use of a fluidized bed reactor in the carbonation of a solid, inorganic and alkaline particulate material containing alkaline metal salts.

The carbonation step of the method of the present invention is carried out in a fluidized bed reactor. A more detailed description of the fluidized bed reactor is given further below. Typically, the carbonation step involves exposing the hydrated CKD to a source of carbon dioxide in the fluidized bed reactor. Generally the source of carbon dioxide is simply carbon dioxide gas. Useful sources of carbon dioxide gas are the gases from power plants, recovery kilns or lime kilns.

In one embodiment, the carbonation step is carried out at 20 to 30° C., e.g. at around 25° C. In one embodiment, it lasts from 5 or 10 minutes up to 2 or 4 hours, but preferably lasts 20 to 60 minutes, e.g. around 40 minutes. It is preferred that the gas used is at least 50% carbon dioxide by weight, typically at least 70% such as at least 80 or 90%. Other components which do not disrupt carbonation (e.g. inert components) may also be present in the gas, but generally it is preferred to use only carbon dioxide, i.e. gas which is approximately 100% carbon dioxide. It is important that the flow rate of the gas fed into the fluid bed reactor is at least as high as the minimum fluidization velocity. A flow rate of at least 1, typically at least 2 liter/min is normally used. Higher flow rates such as 5 or 10 liter/min can be used, but generally a flow rate of around 3 liter/min is preferred. The pressure of carbon dioxide is preferably around 1 to 2 bar, more preferably 1.3 to 1.7 bar, and typically around 1.5 bar. Typically the gas is injected into the base of the reactor chamber of the fluidized bed reactor via one or more inlets located around a conical distributor in the base of the reactor chamber. Typically the gas is supplied to the reactor via a feeding tube. Preferably the conical (or inverted cone-shaped) distributor has a truncated apex. Other preferred aspects of this feature of the invention are described below.

In the carbonation step it is preferred that at least 20 g of $CO_2$ is consumed in carbonation for each 100 g of hydrated CKD. More preferably at least 25 g and most preferably at least 27 g of $CO_2$ is consumed for each 100 g of hydrated CKD. The amount of $CO_2$ consumed in carbonation is typically measured using thermo-gravimetric analyser (TGA 7 Perkin-Elmer); a temperature range of 50 to 1000° C. is preferably used, and the heating rate is preferably 20° C./min. The decomposition of calcium carbonate between 500 and 900° C. is considered to be the carbonate content of the samples. Details of a suitable procedure are set out below in Example 5. The measured amount of $CO_2$ consumed in the carbonation preferably represents at least 85%, more preferably at least 90% of the theoretical maximum amount. In this regard the theoretical amount is typically calculated as indicated below in Example 2, in particular see equation (15). A worked example of calculating the percentage (also referred to as carbonation efficiency) is given in Example 5.

Typically the fluidized bed reactor for use according to the present invention is a solid-gas fluidized bed reactor. During use the solid component preferably comprises hydrated CKD as its main component and the gas component preferably comprises $CO_2$ as its main component. Typically, $CO_2$ gas (usually under pressure) is injected into the base of the reactor through a feeding tube.

Figure 3:
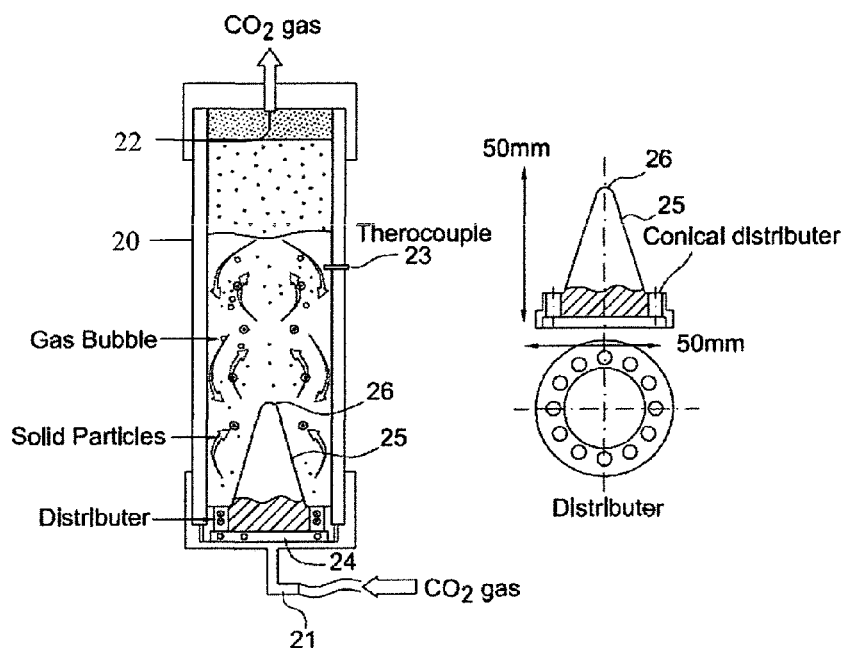
FIG. 3 is a diagrammatic representation of a fluidized bed reactor adapted for use in the carbonation process used in treating CKD in accordance with the present invention.
Figure 4:
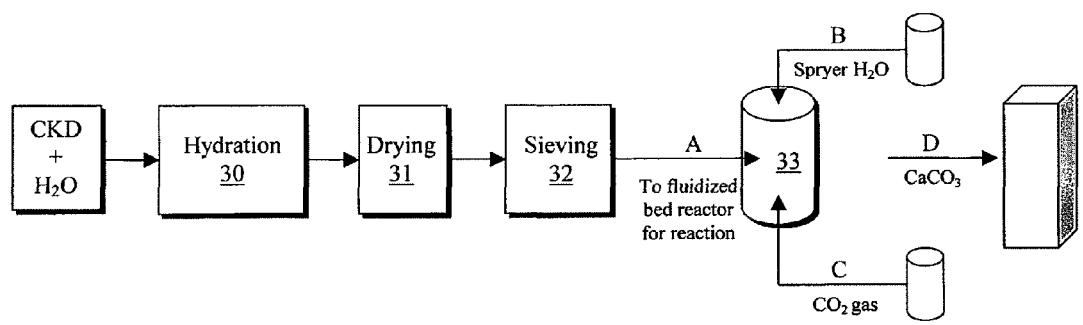
FIG. 4 is a diagrammatic representation of a method for treating CKD in accordance with a preferred aspect of the present invention.

The fluidized bed reactor for use according to the present invention of course comprises a reactor chamber, and the base of the reactor chamber preferably comprises a conical distributor. The conical distributor in the base of the apparatus typically has the shape of an inverted cone with a truncated apex. As depicted in FIG. 3 the apex is preferably truncated with a rounded top, i.e. with no edges. The conical distributor in the base of the reactor chamber is typically located in the centre of the base.

The gas typically enters the reactor chamber of the fluidized bed reactor through one or more inlets in the lower half of the reactor chamber, the inlets being located around the conical distributor in the base of the reactor chamber. It is preferred that the inlets are 2 to 4 mm in diameter, typically around 3 mm. Preferably the inlets are located in the base of the reactor chamber. More preferably, the reactor chamber has a distributor plate at its base, and said inlets are holes in the distributor plate. More preferably, the distributor plate is supported by a porous plate. The distributor plate is typically located directly on top of the porous plate. Preferably, the fluidized bed reactor is cylindrical in shape, i.e. with a circular top and base.

In one embodiment the distributor plate is an integral part of the conical distributor, as is the case in FIG. 3. In any case, the holes in the distributor plate are preferably found around the outside of the base of the reactor chamber, which is typically approximately flat (aside from the holes). For instance, the distributor may have 12 holes spaced evenly apart around the outside of the base. The inverted cone-shaped-section is then located in the central area of the base—it extends up from the base with the apex pointing upwards, and is usually surrounded by the flat outer section with the inlet holes. A Plexiglas column reactor can be used for the reactor chamber. A suitable apparatus is depicted in FIG. 3 and is also described further below.

As noted above, the present invention also provides a fluidized bed reactor apparatus suitable for use in the carbonation step of the present invention as defined herein, wherein the fluidized bed reactor has a reactor chamber, and in the lower half of the reactor chamber there are one or more inlets for entry of gas into the reactor chamber, the inlets being located around a conical distributor in the base of the reactor chamber. The above-mentioned preferred aspects of the fluidized bed reactor for use according to the present are also relevant to the fluidized bed reactor of the present invention.

By virtue of the conversion of alkali metal salts to alkali carbonate and the removal of sulfates, CKD which has been treated according to the method of the present invention (hereafter "treated CKD") has various uses for which untreated CKD would not be suitable.

Thus, in one aspect, the present invention provides treated CKD obtained or obtainable by the CKD treatment method of the present invention as described herein. Preferred properties of the treated CKD are as follows. Unless stated otherwise, it is preferred to use the same techniques for measuring the properties as indicated above for untreated CKD.

Preferably, the treated CKD has a mean particle size of less than 5 μm, more preferably less than 3 or less than 2 μm, most preferably less than 1 μm. The pH of the treated CKD is preferably 10 or less, more preferably 9.5 or less. Generally it is at least 8, more often at least 8.5. The electrical conductivity of the treated CKD is preferably less than 50 μs, more preferably less than 40 μs. Generally, it is at least 20, more often at least 25 or at least 30 μs. The TDS of the treated CKD is preferably less than 400 mg/l, more preferably less than 300, most preferably less than 250 mg/l. Typically, the TDS is at least 100, more typically at least 150 mg/l. The LOI is preferably at least 25, more preferably at least 30, most preferably at least 34% by weight. Typically, it is less than 50, more typically less than 40% by weight. The liquid limit of the treated CKD is preferably at least 30, more preferably at least 40, most preferably at least 45% by weight. Typically it is less than 60, more typically less than 50% by weight. The plastic limit of treated CKD is preferably at least 30, more preferably at least 40%. Typically, it is less than 60, more typically less than 50%. The CEC is preferably at least 12, more preferably at least 15, most preferably at least 20 meq/100 gm of dry material. Typically, it is less than 30, more typically less than 25 meq/100 gm of dry material.

Preferably, CKD, which has been treated according to the present invention, leaches less than 200 mg/l, more preferably less than 150 mg/l of sulfate. Preferably, it leaches less than 800, more preferably less than 700 mg/l Cl. Preferably, it leaches less than 1, more preferably less than 0.6 mg/l Sr. Preferably, it leaches less than 15, more preferably less than 12 mg/l Cr. Preferably, it leaches less than 300, more preferably less than 250 mg/l Ca. Preferably, the treated CKD leaches less than 1000, more preferably less than 700 mg/l of K. Preferably, the treated CKD leaches less than 150, more, preferably less than 120 mg/l of Na. Thus, in one embodiment, the present invention provides treated CKD with one or more of the aforementioned leaching properties.

Typically, the amount of leached sulfate in the treated CKD is reduced by at least 90% compared to untreated CKD. The amount of leached Cl is typically reduced by at least 40%, leached Sr by at least 95%, leached Cr by at least 30%, leached Ca by at least 80%, leached K by at least 60% and/or leached Na by at least 50%. The carbonation efficiency (see Example 2) is preferably at least 80%, more preferably at least 85%, and typically at least 90%. Preferably, two forms of $CaCO_3$ are produced, namely (i) well defined rhombohedra calcite particles, and (ii) uniform needle-like aragonite particles. Both forms typically have a mean particle size of around one micron.

As noted above, the treated CKD has various advantages. For instance, it has good resistance to solubility, mobility and leachability in various environments. In one preferred embodiment, the treated CKD is used in a method for manufacturing lime cement. In this regard the present invention also provides lime cement, which is obtained or obtainable from such a method.

CKD-Based SPC

In another preferred embodiment, the treated CKD is used as an aggregate in sulfur polymer concrete (SPC), wherein the SPC is obtained or obtainable from a mixture comprising treated CKD of the invention, elemental sulfur and modified sulfur, and preferably also glass fiber. This embodiment of the present invention offers the advantage that two industrial waste products are being used up, namely CKD and sulfur. Further, the treated CKD brings advantages when used as an aggregate. Thus, the resulting SPC has good mechanical properties, high resistance to moisture flow (i.e., impermeable), good resistance to aggressive chemical environment, very low absorbability to moisture, a short time period for both formation and the achievement of an acceptable nominal strength for design purpose. It is also particularly useful in circumstances where salt corrosion is a potential problem. These properties could be modified and improved further, by including, e.g., a chemical modifier to the sulfur and/or a physical modifier to the SPC composition. The SPC provided by the present invention is more durable than Portland cement concrete, has high resistance to alkalis and, is a thermoplastic, and enables future recycling. Moreover, using treated CKD as an aggregate (i.e., quality physical filler) improves the density and durability of the SPC. The durability of products manufactured from the SPC of the present invention over long periods of time can play an important role in ensuring the continued isolation of pollutants. The present invention also provides the advantage that using treated CKD in the preparation of SPC can be used to simulate the use of calcites in construction materials (modern constructions use calcite in the form of limestone to produce cement and concrete, and it is increasingly being used as quality filler in concrete applications).

Accordingly, the present invention also provides a method of producing SPC, which method comprises heating and mixing treated CKD of the present invention, elemental sulfur and modified sulfur to produce a mixture.

SPC is a type of concrete which is generally composed mainly of sulfur, but the presence of treated CKD and modified sulfur (in the precursor mixture from which the SPC is formed) imparts important properties to the SPC. This is explained further below.

As elemental sulfur for use in the present invention, standard elemental sulfur of any particular form may be used. The elemental sulfur may be commercial grade, crystalline or amorphous. Particle size is generally not significant and the sulfur may be used as either solid or liquid (molten) form, since the sulfur is melted during the preparation of sulfur cement.

The use of sulfur is advantageous as it provides a beneficial use for by-products of other industries which are produced at a rate which exceeds the current market demand. For instance, in the United Arab Emirates (UAE) large quantities of by-product sulfur are currently generated by the cleanup of hydrogen sulfide in the production of petroleum and natural gas. This sulfur may be used in accordance with the present invention.

The elemental sulfur used according to the present invention typically has a granular shape and a purity of 99.9%. It is obtainable from, for instance, Al Ruwais refinery, UAE.

The term "modified sulfur" refers to sulfur in which either (a) the amount of sulfur in the α-phase (i.e., the orthorhombic form) is lower than that which would be observed if molten elemental sulfur was allowed to cool to room temperature on its own, or (b) the amount of sulfur in the α-phase which is present in the form of micro crystals is lower than that which would be observed if molten elemental sulfur was allowed to cool to room temperature on its own. Typically, in the modified sulfur the proportion of the sulfur that is not present in the α-phase is at least 5%, such as at least 10% or at least 20%. More typically it is at least 30% or at least 40%. Preferably, in the context of the present invention, the modified sulfur satisfies both (a) and (b), and the proportion of the sulfur that is not present in the α-phase (i.e., the orthorhombic form) is present predominantly as polysulfide instead. Thus, preferably the degree of polymerisation in the modified sulfur is at least 10%, such as at least 20 or 30. Typically it is at least 40%.

The modified sulfur for use according to the present invention is made by introducing additives to elemental sulfur, which additives effect the requisite modification. The resulting modified sulfur typically comprises at least 90%, preferably at least 95%, typically less than 98% by weight of sulfur. Preferably, it comprises 95-97.5% by weight of sulfur. Typically it comprises 0.01-0.05% by weight of a non-ionic surfactant, preferably 0.02-0.04% such as 0.02-0.03% or around 0.025%. The modified sulfur also typically comprises 1-5% by weight of a mixture of oligomeric hydrocarbons (such as bitumen), preferably 2-4% such as 2-3% or around 2.5%.

Preferably, the modified sulfur for use according to the present invention comprises 95-97.5% by weight of sulfur, and 2.5-5% by weight of the total of bitumen and non-ionic surfactant components, based on the total weight of the modified sulfur.

To produce modified sulfur, the preferred amounts of starting material to use essentially correspond to the amounts that are preferably present in the resulting modified sulfur. For example, in a preferred aspect, modified sulfur is made by mixing elemental sulfur, bitumen and a non-ionic surfactant wherein the elemental sulfur accounts for 95-97.5% by weight of the mixture and the total of the bitumen and surfactant components accounts for 2.5-5% by weight of the mixture. The reaction time for producing the modified sulfur is usually at least 30 minutes, though typically, is less than 3 hours, more typically less than 2 hours. Preferably, the reaction time ranges from 45-60 minutes. Reaction temperatures of 120-150° C. are generally used, preferably 130-140° C. Typically temperatures of 135-140° C. are used. Most preferably, a temperature of around 140° C. is used. After heating and mixing, the process preferably comprises cooling the mixture. The cooling can be carried out by simply leaving the mixture to cool to the surrounding temperature of its own accord or by actively inducing and/or controlling the cooling in some way. Typically, a cooling rate of less than 5° C. per minute, such as less than 2 or 3° C. per minute, preferably around 1° C. per minute is employed. Generally, this cooling rate is used throughout the entire cooling process. The temperature measured to calculate the cooling rate is the mean temperature for the whole of the concrete.

The modified sulfur for use in the present invention is preferably obtained or obtainable by a method as described above.

Preferably a non-ionic surfactant is used in making the modified sulfur, and the resulting modified sulfur comprises said non-ionic surfactant. Such a surfactant, when used in combination with a mixture of oligomeric hydrocarbons, enables the production of modified sulfur that is particularly useful in the preparation of SPC. Thus, SPC, which is obtained or obtainable using such modified sulfur, has been found to possess excellent properties in terms of strength, durability and leachability, including a very low hydraulic conductivity. The use of such SPC is particularly advantageous in arid areas, where materials such as clay and other fine-grained soils are not readily available and are therefore usually expensive because they must be transported from remote locations. The excellent properties of the SPC of the present invention are also advantageous for waste containment, e.g., for containing hazardous chemical or radioactive waste.

By "non-ionic" it is meant that the surfactant does not contain a head with a formal net charge. The non-ionic surfactant is preferably an alkylaryloxy polyalkoxy alcohol.

The alkyl group in the alkylaryloxy polyalkoxy alcohol typically has up to 12 carbon atoms, such as 2 to 10, or 4 to 8 carbon atoms. It can be straight, though preferably, it is branched. Preferably, it is unsubstituted. Typically, it is octyl, more typically iso-octyl.

The aryl group in the alkylaryloxy polyalkoxy alcohol typically contains from 6 to 10 carbon atoms. It can be a monocyclic ring, for example phenyl, or, unless otherwise specified, may consist of two or more fused rings, for example naphthyl. Preferably, it is unsubstituted. Typically it is phenyl.

The alkoxy group in the alkylaryloxy polyalkoxy alcohol, typically, contains 1 to 4 carbon atoms, such as 2 or 3 carbon atoms. Preferably, it is ethoxy.

The terminal alcohol moiety in the alkylaryloxy polyalkoxy alcohol, typically, has the same number of carbon atoms as the repeated alkoxy group. Preferably, it contains 1 to 4 carbon atoms, such as 2 or 3 carbon atoms. Most preferably, it is has 2 carbon atoms.

The polyethoxy section typically contains an average of 7 to 40 ethoxy units, preferably less than 30, more preferably less than 20, such as less than 10. In one embodiment, the average number of ethoxy units is 9. In another embodiment, the polyethoxy section contains an average of 5 to 15 ethoxy units.

In one embodiment, the alkylaryloxy polyalkoxy alcohol is a copolymer containing different types of alkoxy units, e.g., it may comprise a mixture of ethoxy and propoxy units.

Typically, the alkylaryloxy polyalkoxy alcohol is an alkylphenoxy polyethoxy ethanol. Preferably, the alkylphenoxy polyethoxy ethanol has the average formula $C_rH_{2r+1}(C_6H_4)O(CH_2CH_2O)_sCH_2CH_2OH$, wherein r is from 4 to 12 and s is from 7 to 40. r is preferably from 5 to 10, such as 7 to 9. In one embodiment r is from 4 to 8. Typically, r is 8. s is preferably less than 30, more preferably less than 20 and typically less than 10. In one embodiment, s is 9.

In one preferred embodiment, the surfactant is iso-octylphenoxy polyethoxy ethanol. The non-ionic surfactant may, for instance, be Triton X-100®, which is manufactured by Rohm and Haas Company, Philadelphia, Pa.

Preferably, a mixture of oligomeric hydrocarbons is used in making the modified sulfur, and the resulting modified sulfur comprises said oligomeric hydrocarbons.

Various species may be present as oligomeric hydrocarbons. The mixture of oligomeric hydrocarbons typically comprises one or more polycyclic aromatic hydrocarbons. Thus, in one embodiment, the mixture of oligomeric hydrocarbons is a composition comprising one or more polycyclic aromatic hydrocarbons.

The polycyclic aromatic hydrocarbons, for use in accordance with the present invention, include, for instance, naphthalene, anthracene, phenanthrene, fluoranthene, naphthacene, chrysene, pyrene, triphenylene, benzofluorathene, perylene, pentacene, corannulene, benzo[a]pyrene, coronene and ovalene. Typically, the polycyclic aromatic hydrocarbons are one or more selected from naphthalene, anthracene, phenanthrene, fluoranthene, chrysene, pyrene, benzofluorathene, perylene and benzo[a]pyrene. In one embodiment phenanthrene and pyrene are used. Typically, phenanthrene is used.

The polycyclic aromatic hydrocarbons, for use in accordance with the present invention, are unsubstituted or substituted. When substituents are present they are, typically, hydrocarbon substituents, such as alkyl, alkenyl and alkynyl substituents, though typically, they are alkyl. The hydrocarbon substituents, generally, have 1-10 carbon atoms, typically, 1-6 or 1-4 carbon atoms. The hydrocarbon substituents may be straight or branched. Preferred examples of the hydrocarbon substituent are methyl, ethyl, n-propyl, i-propyl, n-butyl, i-butyl, s-butyl and t-butyl. More preferred are methyl and ethyl. Most preferred is methyl.

The mixture of oligomeric hydrocarbons typically comprises one or more asphaltenes. Thus, the mixture of oligomeric hydrocarbons can be a composition comprising one or more asphaltenes.

The asphaltenes for use in accordance with the present invention are typically alkylated condensed aromatic rings. The asphaltenes are, typically, insoluble in n-heptane but soluble in toluene. The asphaltenes, typically, have a range of molecular masses from 400 to 1500 units. The most common molecular mass is, typically, around 750 units. A suitable method for checking molecular mass is ESI FT-ICR MS.

The mixture of oligomeric hydrocarbons, typically, comprises one or more alkanes. Thus, the mixture of oligomeric hydrocarbons can be a composition comprising one or more alkanes.

The alkanes, for use according to the present invention, can have varying numbers of carbon atoms, e.g., alkanes with up to 20 carbon atoms, 20-35 carbon atoms and/or 35 carbon atoms and above. The alkanes can be straight. Alternatively, they can be branched, e.g., iso-alkanes.

In one embodiment, the alkanes can be or include cycloalkanes, i.e., naphthenes. Naphthenes can be present instead of acyclic alkanes though typically both are present. The naphthenes can contain, for instance 3 or more rings, such as 4 or more, or 5 or more. In one aspect of the invention, they contain less than 40 rings, such as less than 30, less than 20 or less than 10. The naphthenes can be unsubstituted or substituted with alkyl groups, wherein the alkyl substituents are the same as described above for the polycyclic aromatic hydrocarbons.

The mixture of oligomeric hydrocarbons, typically, comprises one or more resins. Thus, the mixture of oligomeric, hydrocarbons can be a composition comprising one or more resins.

The mixture of oligomeric hydrocarbons may or may not comprise traces of metals such as iron, nickel and vanadium, and/or traces of non-metal elements, such as, oxygen, nitrogen, sulfur, phosphorous and halogens. When these non-metal elements are present, they can appear at appropriate places within the hydrocarbon structures of the mixture of oligomeric hydrocarbons.

Preferably, the mixture of oligomeric hydrocarbons has an average degree of polymerization of 8 to 12, typically around 10. It is, also, preferred that the mixture of oligomeric hydrocarbons is a composition comprising one, more than one or all of polycyclic aromatic hydrocarbons, asphaltenes, alkanes (typically both acyclic and cyclic) and resins. Typically, the mixture of oligomeric hydrocarbons is a composition comprising all of these, such as bitumen.

Bitumen is a black, oily, viscous material that is a naturally-occurring organic by-product of decomposed organic materials. It is obtainable from the bottom most fractions obtainable from crude oil distillation. It is too thick and sticky to flow, wholly soluble in carbon disulfide, and mostly made up of highly condensed polycyclic aromatic hydrocarbons.

It is preferred to use the above-mentioned non-ionic surfactant and mixture of oligomeric hydrocarbons in the process of producing modified sulfur, because these components physically modify the sulfur by inducing sulfur polymerization. Thus, the resulting modified sulfur comprises polymerized sulfur. When polymerized sulfur is present, the sulfur phase transformation ($\beta$ to $\alpha$) still occurs during cooling, but the polymerised sulfur acts as a compliant layer between the sulfur crystals, and so serves to mitigate the effect of the phase transformation.

In a preferred embodiment of the present invention, the modified sulfur comprises 45-65%, preferably 50-60% and typically around 55% by weight of monoclinic sulfur and 35-55%, preferably 40-50% and typically around 45% by weight of polysulfide, based on the total weight of the sulfur component.

The degree of polymerization can be confirmed by analyzing the fraction of the product that is insoluble in carbon disulfide ($CS_2$) by column chromatography (HPLC Agilent 1100; column PLgel Mixed C, 300*7.5 mm*5 µm, flow rate of 1 ml/min in chloroform, at room temperature 24° C.).

Typically, both low and high molecular weight fractions of polysulfides are present in the modified sulfur. The weight average molecular weight of the polysulfides is preferably from 10,000-30,000, typically 15,000-20,000. The average number molecular weight of the polysulfides present in the modified sulfur is typically 200-500, preferably 300-400. The poly-disperseability index of the polysulfides present in the modified sulfur, which is a reflection of the product molecular weight distribution, is preferably from 3-7, more preferably from 4-6, and typically around 5.

In preparing the modified sulfur, the reaction between the non-ionic surfactant and the mixture of oligomeric hydrocarbons with the elemental sulfur (i.e., the degree to which they can disperse in each other) depends on how they interact. Types of interaction are: pi-pi bonding, polar or hydrogen bonding (polar interactions of hetero atoms) and Van Der Waals forces. Preferably, the non-ionic surfactant is used in combination with bitumen, which when combined with sulfur allows the production of a homogeneous, self-compatible mixture consisting of a variety of molecular species that are mutually dissolved or dispersed. Typically, this combination contains a continuum of polar and non-polar material. This leads to areas of order or structure of polysulfides in the modified sulfur, depending on the amount of the polymer present, the reaction time, the reaction temperature, and the cooling rate.

Figure 33:
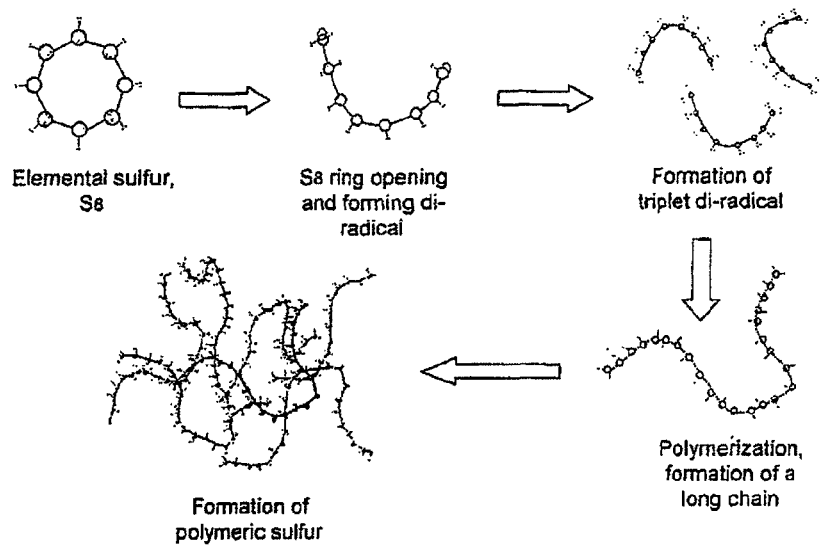
FIG. 33 illustrates a mechanism for sulfur polymerisation.

At heating temperature less than 140° C., elementary sulfur forms polysulfides. The mechanism believed to explain this process is depicted in FIG. 33. Essentially it takes place through initiation and propagation steps.

$$\text{Initiation: cyclo-}S_8 \rightarrow \text{chain-}S_8\text{:} \qquad (1)$$

$$\text{Propagation: chain-}S_8\text{:} \rightarrow S_{poly}\text{:} \qquad (2)$$

Sulfur undergoes a liquid-liquid transition, usually interpreted as the ring opening polymerization of elemental sulfur $S_8$. An increase in temperature is accompanied by an increase in motion and the bond within the ring becomes strained and finally breaks. The covalent bond breaks equally in half, so a di-radical is formed. Ring opening gives rise to triplet di-radical chains. Polymerization then occurs to form long chains.

The SPC, of the present invention, is made from treated CKD, elemental sulfur and modified sulfur. The treated CKD is used as an aggregate in the SPC. However, further aggregates may also be present. This can further improve the strength and extends the utilization of the modified sulfur cement. Thus, in one embodiment, the aggregates act as physical stabilizers. The further aggregates typically account for 20 to 50, more preferably 30 to 40% by weight of the SPC. The weight ratio of sulfur binder to aggregates is preferably 0.6 to 1, more preferably 0.7 to 0.9, most preferably around 0.8. In this regard, "sulfur binder" refers to the sulfur matrix that derives from both the elemental sulfur and the modified sulfur.

Such further aggregates are, typically, strengthening materials. Generally, any material may be used as an aggregate so long as it does not adversely react with any of the other components of the SPC. Appropriate sizes for further aggregates are 0.01 to 1 mm, preferably 0.05 to 0.5 mm.

One possible type of aggregate is a waste material. This brings the extra advantage of finding a beneficial use for by-products of other industries that are generally unwanted and may otherwise require disposal. Examples include fly ash, slags from iron and steel making, non-ferrous slags, domestic refuse incinerator ash, overburden materials, dredged silts, construction rubble, waste water treatment sludges, and paper mill sludges. As these materials may include trace elements of potential pollutants and/or heavy metals (that can pose various environmental risks), care should be given before using them to assess the possible hazard expected during infiltration conditions.

The present invention has the advantage that there may be no need to control the gradation of the further aggregates. Thus, cheaper starting materials such as waste material can be used. Also, it can add strength to the SPC as the further aggregates may promote the formation of a grain structure.

In one embodiment, fly ash is used as a further aggregate, i.e., the further aggregates comprise fly ash. Fly ash is the ashy by-product of burning coal, also well-known as coal ash. Fly ash superior waste, which is a waste product of the nuclear industry, may also be used. Physically, fly ash is a very fine, powdery material. It is predominantly silica, with particles in the form of tiny hollow spheres called ceno-spheres. Type C fly ash is typically used, though other types such as type F may also be used. These two types of fly ash have pozzolanic properties, but type C fly ash is preferred because in the presence of water it hardens and gains strength over time. If the aggregate comprises fly ash, the fly ash typically accounts for at least 30%, preferably at least 40%, typically at least 50% of the further aggregates.

Preferably, the further aggregates comprise sand. Sand is naturally occurring, finely divided rock, comprising particles or granules. The most common constituent of sand is silica (silicon dioxide), usually in the form of quartz, which because of its chemical inertness and considerable hardness, is quite resistant to weathering. If the aggregate comprises sand, the sand typically accounts for at least 25%, preferably at least 35%, typically at least 45% by weight of the further aggregates. In some cases, the sand can account for a higher proportion of the further aggregates, such as at least 60% or at least 70, 80 or 90%.

As is evident from the above discussion, many different types of compound may be used as aggregate, provided they do not interfere with the SPC formation process. To this end, the present invention has the advantage that it allows the use of undesirable materials, which are both cheap and may also otherwise require disposal, with an associated environmental and economical cost.

In one embodiment, the present invention provides SPC wherein the further aggregates comprise hazardous waste. Thus, the SPC, once set, has the hazardous waste embedded within it, i.e., the waste is contained by solidification.

In the SPC of the present invention, the total amount of aggregates, including the treated CKD, is generally at least 30%, preferably at least 40%, more preferably at least 50%, more preferably still at least 60% by weight based on the total weight of the resulting SPC. The total amount of aggregate may be up to 85% or even up to 90 or 95% by weight based on the total weight of the resulting SPC. However, typically the total amount of aggregate is less than 85%, preferably less than 80%, more preferably less than 75%, more preferably still less than 70% by weight based on the total weight of the SPC. Typically, the total amount of aggregate is 50 to 85%, more preferably 60 to 70% based on the total weight of the SPC.

Preferably, the SPC of the present invention further comprises glass fibre. The glass fibre preferably account for 0.1 to 1.5%, more preferably 0.1 to 1.0% by weight of the total weight of the SPC, more preferably still 0.2 to 0.6% by weight, and most preferably around 0.3% or 0.35% by weight. The use of glass fibre improves the structural integrity of the SPC. The glass fibre is preferably added during the mixing step. Alternatively, they can be added before the mixing step, e.g., by combining them with aggregates.

Incorporating glass fibre can lead to reinforced composite SPC with high strength glass fibre embedded in a cementitious matrix. In this form, both the glass fibre and the matrix retain their physical and chemical identities, yet they produce a combination of properties that cannot be achieved with either of the components acting alone. In general, fibre provides the principal load-carrying members, while the surrounding matrix has the following properties: (a) it keeps the fibres in the desired locations and orientation, (b) it acts as a load transfer medium between the fibres, and (c) it protects the fibres from environmental damage. The presence of glass fibre can help eliminate material cracking under saturated conditions.

Figure 23:
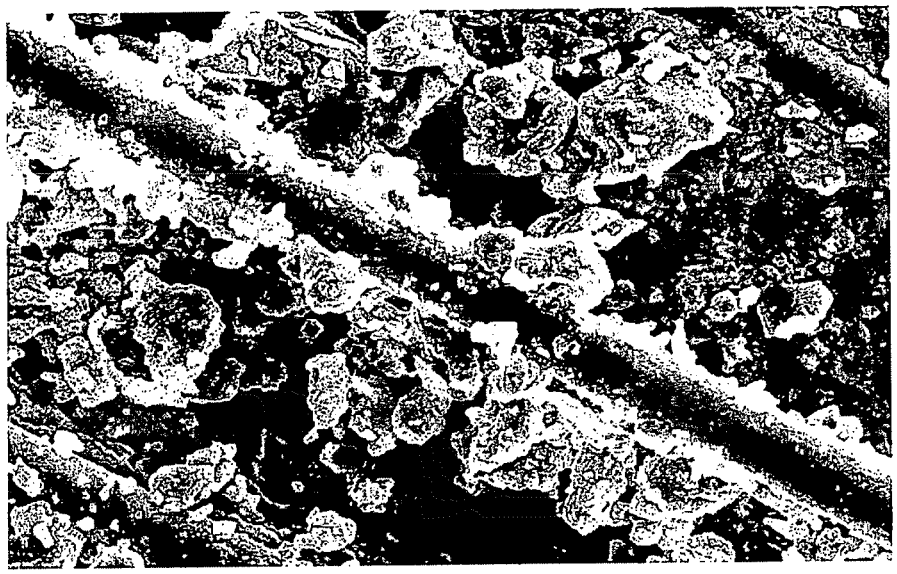
FIG. 23 is a SEM image of CKD-based SPC reinforced with glass fibre, displaying the compatibility of glass fibre with sulfur and the aggregate.
Figure 24:
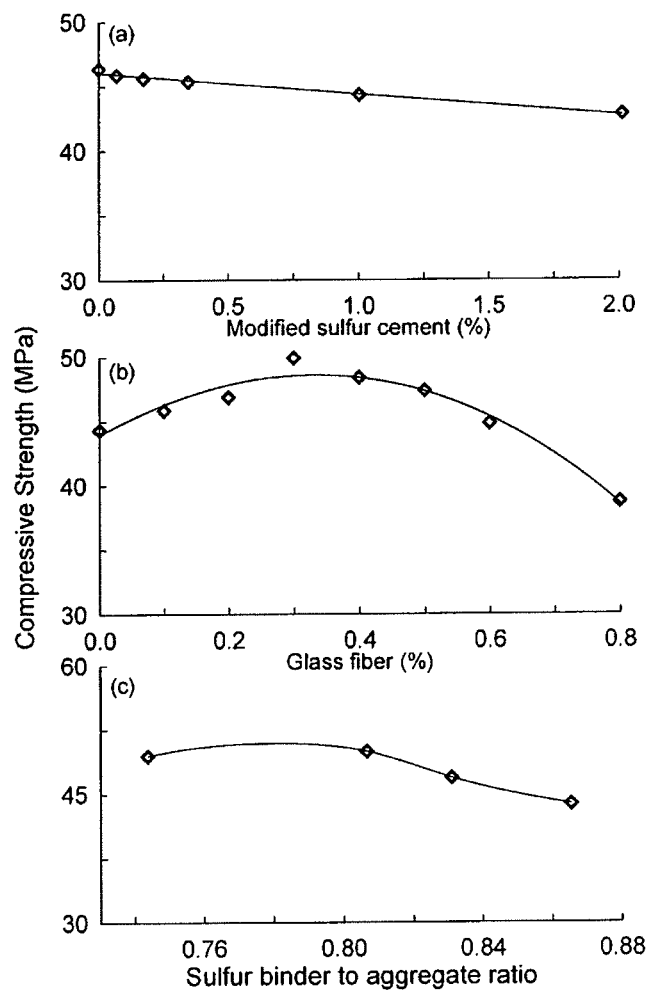
FIG. 24 illustrates how the compressive strength of the CKD-based SPC varies depending on (i) the amount of modified sulfur, (ii) the amount of glass fibre, and (iii) the sulfur binder to aggregate ratio.

The glass fibre can be in the form of continuous lengths or discontinuous (chopped) lengths. The latter is preferred. It was found that incorporating glass fibre into SPC as shown in FIGS. 23 and 24(b) leads to an increase in the strength of the SPC and prevents chipping and flaking. In one embodiment the glass fibre is chopped strand glass fibre Canada ranging from 0.6 to 1.4 cm.

In the SPC of the present invention, the amount of elemental sulfur is generally at least 20%, preferably at least 25%, more preferably at least 30% by weight based on the total weight of the SPC. The amount of elemental sulfur is generally less than 50%, preferably less than 45%, more preferably less than 40% by weight based on the total weight of the SPC.

The modified sulfur, for use in preparing the SPC of the present invention, will inevitably contain a certain amount of "unmodified" (i.e., orthorhombic) sulfur. However, when the amount of elemental sulfur in the SPC is referred to herein, it refers to the amount of sulfur derived from the elemental sulfur starting material rather than from the modified sulfur starting material.

In the SPC of the present invention, the amount of modified sulfur is generally at least 0.1%, preferably at least 0.25%, more preferably at least 1% by weight based on the total weight of the SPC. The amount of modified sulfur is generally less than 3%, preferably less than 2%, more preferably less than 1.5% by weight based on the total weight of the SPC.

In one preferred embodiment, the present invention provides SPC which comprises 30-40% by weight of sand, 20-25% by weight of treated CKD, 40-45% by weight of elemental sulfur and 0.2-2% by weight of modified sulfur.

Of course, the SPC of the present invention and the process for its preparation should comply with the international standards ACI 548.2R (Guide for Mixing and Placing Sulfur Concrete in Construction) and C1159-98R03 (Specification for Sulfur Polymer Cement and Sulfur Modifier for Use in Chemical-Resistant, Rigid Sulfur Concrete).

In the process of producing the SPC of the present invention, the preferred amounts of starting material to use essentially correspond to the amounts that are preferably present in the SPC product. For example, the process of producing SPC preferably comprises mixing 40-45% by weight of the elemental sulfur, 30-40% by weight of sand, 20-25% by weight of treated CKD and 0.2-2% by weight of modified sulfur, based on the total weight of the SPC. In a more preferred aspect, the SPC further comprises 0 to 1% by weight of glass fibre.

In the process of producing the SPC of the present invention, the mixture of elemental sulfur, modified sulfur, treated CKD and any other components is preferably heated to a temperature of 130-150° C., typically around 140° C., for 30 minutes to 2 hours, typically 1 to 1.5 hours.

In another embodiment the process of producing the SPC of the present invention comprises mixing together (i) sand, which has been pre-heated to a temperature of 170-180° C., typically around 175° C., (ii) the treated CKD, which has been pre-heated to a temperature of 90-110° C., more preferably 95-105° C. and typically around 100° C., and (iii) a mixture of the elemental sulfur and modified sulfur, which mixture has been pre-heated to a temperature of 130-150° C., typically around 140° C., and then subjecting the mixture of (i), (ii) and (iii) to a temperature of 130-150° C., typically around 140° C., for 20-40 minutes. The resulting mixture is then typically cast into one or more moulds and allowed to cool. Temperature control is important because the SPC mixture typically melts at 119° C. but above 149° C. its viscosity rapidly increases to an unworkable consistency.

The process of producing the SPC of the present invention can involve mixing the components in different orders. Preferably, the elemental sulfur and modified sulfur are mixed first, and the treated CKD and any other aggregates are added subsequently. If sand and fly ash are to be used as aggregates, the fly ash is preferably added before the sand.

Preferably, the SPC of the present invention is obtainable by one of the aforementioned processes. In one preferred embodiment, the mixture is cast into a particular shape before being cooled, which shape produces a block of SPC which is suitable for use a barrier, which barrier is suitable for restricting permeation of matter.

In the casting step, the temperature of the mould is preferably higher than or equal to the temperature of the mixture being placed in it. Typically, the temperature of the mould is higher than or equal to the most recent mixing temperature. In another preferred embodiment, vibration of the mixture can be used to produce a high density SPC. A curing time of 1 day is generally required before the SPC is suitable for contact with water and/or, e.g., any waste that it is intended to restrict permeation of.

When a preparation temperature of 130-140° C. is used to produce the SPC of the present invention, this has the advantage that moisture and other volatile compounds contained in the waste are driven off. Thus, small quantities of moisture can be effectively volatilized during the process. Accordingly, in a preferred embodiment, the SPC of the present invention is SPC that is obtained or obtainable using a preparation temperature of 130-140° C.

The SPC of the present invention is a high strength, essentially impermeable, acid and salt resistant material that is suitable for use in very aggressive environments. It provides a long-term, cost effective alternative to Portland concrete where protection by acid brick, coatings, linings or other protective systems is required in highly corrosive environments. A further advantage of the SPC of the present invention is that it has thermoplastic properties. Thus, when it is heated above its melting point it becomes liquid and other aggregates such as soil or wastes can be mixed in with it and then on cooling the mix re-solidifies to form a solid monolith in which the newly added aggregates are immobilized.

Another advantage of the SPC of the present invention is that when it is formed (from a heated mixture of the components) full strength is achieved in hours rather than weeks as compared to hydraulic cements. Further, no chemical reaction is required for setting as in hydraulic cements. This minimizes incompatibilities between binder and aggregate. In arid lands, where evaporation is very high, the use of hydraulic cement (for which the use of water is needed to hydrate the cement and produce a solid matrix) is hindered by the lack of water. As a result public works suffer from excessive shrinkage and loss of strength. However, SPC production does not require water.

The present invention, also, provides the use of the SPC of the present invention as a barrier to restrict permeation of matter, and a barrier suitable for restricting permeation of matter, which barrier comprises the SPC of the present invention.

The present invention also provides a containment construction suitable for containing matter over a long time period, which construction comprises one or more barriers of the present invention.

The use of SPC of the present invention as a barrier to restrict permeation of matter, e.g., in a containment construction, is particularly advantageous in arid land because of the high temperature environment. It is, also, advantageous in view of the fact that clay materials are poorly available and subsurface soils in arid lands have a high hydraulic conductivity (in the order of $10^{-5}$ m/s). In addition, it is advantageous because synthetic materials are expensive, particularly in view of the quality control that would be needed, and the risk of accidents (e.g., material puncture) during construction that could lead to the escape of polluting leachetes.

Containment constructions of the present invention may be produced by housing one or more barriers of the invention in a containment unit, with appropriately strong support and foundations. Preferably, the containment construction of the present invention is suitable for use in arid land.

The barriers of the present invention are typically suitable for containing matter, such as hazardous waste, over a long time period. In this context, "long time period" is intended to reflect the fact that the permeation of matter through the barrier is not expected to be a limiting factor on the lifetime of the barrier. It is, also, intended to reflect the fact that disintegration of the barrier into its surrounding environment is not expected to be a limiting factor of the barrier. In other words, when the barrier is put in place, the functions of restricting permeation and minimal disintegration into the surrounding environment are expected to continue indefinitely for the lifetime of the barrier or for as long as the use is continued.

The long time period may, for instance, be at least 20 years, more preferably at least 50 years, more preferably still at least 100 years, such as at least 250, 500 or 1000 years. In one preferred embodiment the long period is essentially indefinite. Thus, typically the structure or construction of the present invention is arranged such that it is suitable for restricting permeation indefinitely.

The barrier of the present invention is suitable for containing matter such as hazardous waste. The term "suitable for containing matter" is intended to reflect the shape and dimensions of the barrier. Thus, the barrier of the invention should not have a shape that includes holes or gaps that would let matter escape and so defeat the object of containing matter. Typically, a barrier of the present invention will be arranged and shaped so as to surround the matter to be held, with no gaps or holes in the structure in the parts of the barrier that are expected to come into direct contact with the matter to be contained. For instance, a barrier of the present invention may be shaped like a cup, flask or bowl, i.e., the sides and base have no gaps or holes and the top has an opening to allow insertion/removal of the matter to be contained. Alternatively it could be shaped like a box, cylinder, rod or flat sheet. However, a barrier of the present invention might feature a hole or gap in it if, for instance, it is intended to restrict permeation in one or more particular direction(s), in order to direct the fluid matter in another direction.

If the barrier of the present invention is to contain an aggregate which itself is hazardous waste (i.e. permeation out of the concrete is being restricted) then the shape of the barrier is not important, so long as the waste aggregates are effectively encompassed within the SPC. Of course, if the barrier of the invention is also to restrict permeation of material which is not part of the barrier itself (i.e. permeation both into and out of the concrete is being restricted) then the barrier is preferably arranged and shaped as described above.

Typically, the barrier of the present invention is SPC which is obtainable or obtained by a controlled process that allows the formation of the SPC mixture into a predetermined shape. The shape formed in this way must have sufficient structural integrity to permit its handling in the subsequent operations without collapse.

Typically, a barrier of the present invention is less than 1 m thick, in view of the extremely low hydraulic conductivity of the SPC of the present invention. Preferably the barrier is 0.3-0.9 m, more preferably 0.5-0.7 m thick.

Typically a barrier of the present invention is a monolith, i.e. a single solidified block. A containment construction of the present invention may comprise one or more barriers of the present invention, though typically just comprises one.

Preferably the barrier of the present invention serves to restrict permeation across the barrier of matter contained by the barrier. Thus, the barrier protects the surrounding environment from the matter it contains. However, as well as or instead of this, the barrier may serve to restrict permeation across the barrier of matter from the surrounding environment. Thus, the barrier can protect the matter it contains from the surrounding environment.

The barriers of the present invention are suitable for restricting permeation of matter such as hazardous waste. By "hazardous waste", it is meant to refer to matter that could pose a danger due to being, e.g., toxic, flammable, and reactive (e.g., oxidising or reducing), an irritant, carcinogenic, corrosive, infectious, teratogenic, mutagenic, explosive or radioactive, or could also refer to matter which has the potential to easily form hazardous waste. The waste could have a pH ranging from, e.g., 2-13. The barriers of the present invention are, also, suitable for exposure to a marine environment.

It will be clear from the context in which a given barrier or containment construction exploits the ability of the modified sulfur concrete of the present invention to restrict permeation whether or not that barrier or construction is suitable for containing matter over a long time period. For instance, a containment unit intended to house hazardous waste for an indefinite period (until or unless some other means of using or disposing of it may be found) will be built in such a way that reflects its potential permanent existence. For instance, it would probably be heavy duty and permanently set in position with very solid foundations. Such a containment unit would be classed as suitable for use in containing matter over a long time period.

On the other hand, a vat or reaction vessel employed in a factory for producing chemicals, or a storage tank for temporarily holding a chemical, for instance, would not be classed as suitable for containing matter over a long time period. This would be evident from, e.g., the fact that they are not permanently set in position (as they would be expected to be replaced at some point) and would not have foundations built to last indefinitely (which would be unnecessary over-engineering given the purpose). Thus, they would not be built in a manner indicative that they could potentially be used indefinitely, so would not be suitable for indefinite use.

Figure 34A:
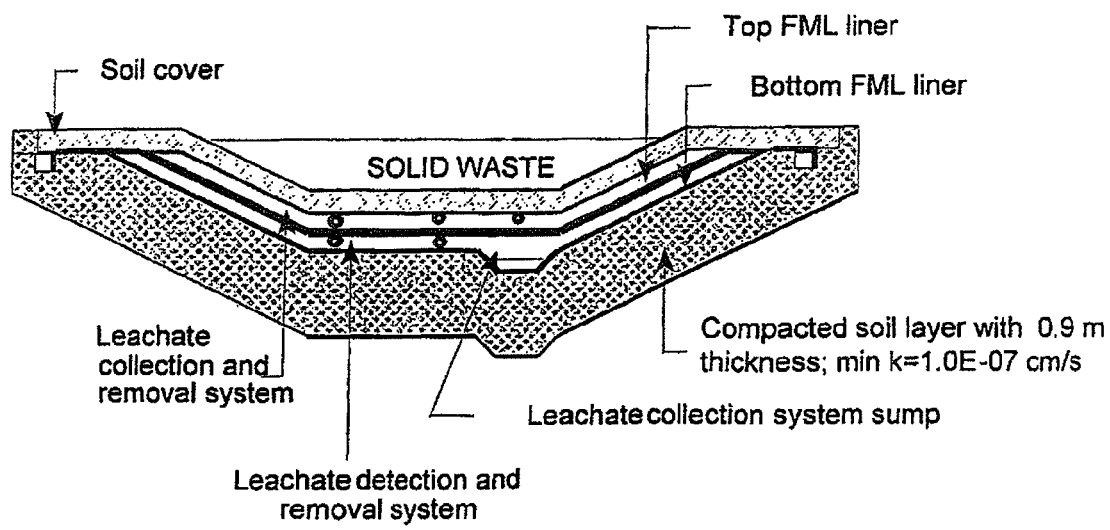
FIG. 34$a$ shows the design of a typical hazardous waste containment construction.
Figure 34B:
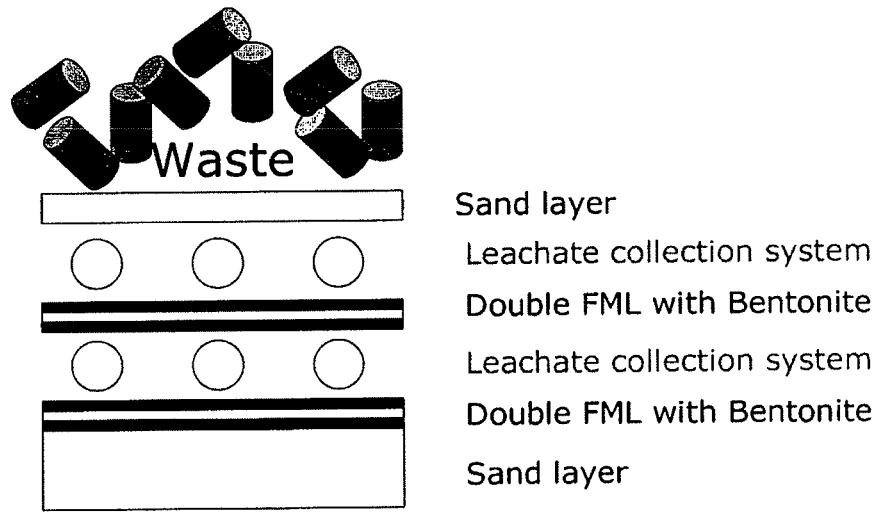
Figure 34C:
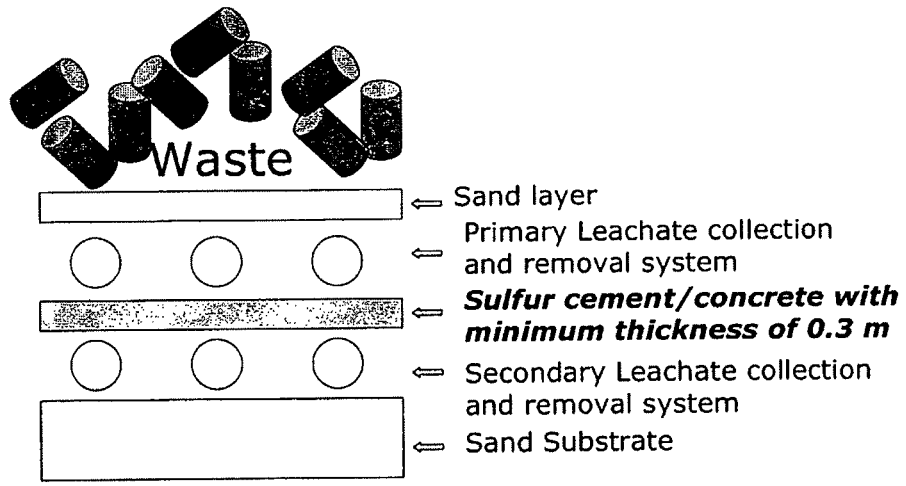

As already noted, the barriers of the present invention may be used in the containment of hazardous waste. FIG. 34$a$ shows the design of a typical hazardous waste containment construction. The US Environmental Protection Agency (EPA), for example, requires that the compacted clay liner be at least 0.9 m thick and have a hydraulic conductivity less than or equal to $10^{-9}$ m/s. Drainage layers are typically required to have a hydraulic conductivity greater than or equal to 1 cm/s, and a leak detection system capable of detecting a leak within 24 hours. Flexible membrane liners (FMLs) must be at least 0.76 mm thick.

FIG. 34$b$ shows the design of a typical hazardous waste containment construction that is for use in arid land. The liner consists of a thin layer of clay sandwiched between two geotextiles or glued to a geomembrane. Various terms have been used to describe this material in the literature. The general term is double flexible membrane liner (DFML). The design mandates that in arid lands, two layers of DFML must be used to protect the ground water beneath the sand substrate. It is worth noting that synthetic materials are expensive, particularly with all the quality control/quality assurance required during construction. Also there is the risk of material puncture leading to the escape of hazardous leachetes, which could, e.g., pollute the ground water bodies.

FIG. 34$c$ shows the design of a new containment construction provided by the present invention, which is suitable for the containment of hazardous waste in arid lands. The liner consists of a layer of modified sulfur cement/concrete with a minimum thickness of 0.3 m. Such material shall have a hydraulic conductivity in the order of $10^{-13}$ m/s, which is far less than the $10^{-9}$ m/s that specified by the US EPA. The liner (modified sulfur cement/concrete) is an inert material with a very low leaching rate in different environments such as neutral, acidic or alkaline media. It has a good resistance to chemical and physical degradation, so retains its strength in different environmental conditions. The use of this design will incur large savings and protect the human health and the environment in arid lands. Thus, the present invention provides a containment construction comprising one or more liner layers for restricting the permeation of matter (typically hazardous waste), said liner layers being less than 0.9 m thick, typically, less than 0.8 m thick, such as less than 0.7, 0.6 or 0.5 m thick. The minimum thickness is generally 0.3 m.

As has been explained above, the SPC of the present invention is particularly advantageous for use in arid land. In this context arid land refers to a land which is temperate, warm or hot, and has a ratio of annual precipitation to potential evapotranspiration of less than 0.65. The SPC of the present invention is also advantageous for use in lands where the average amount of rainfall recorded is 10 days or less per year.

Returning now to the method of treating CKD, the following numbered clauses describe one particular preferred embodiment of the present invention.

(1) A method for treating waste CKD containing alkaline metal salts comprising the steps of:
   a.) providing a mass of CKD containing alkaline metal salts and a mass of water;
   b.) mixing the kiln dust and water to form a mixture containing calcium hydroxide by the hydration process;
   c.) drying the mixture from step b;
   d.) fractionating the dried mixture from step c by sieving;
   e.) providing a fluidized bed reactor; and
   f.) carbonation the dried fractionated and hydrated mixture from step d with cement kiln exhaust gas containing a pollutant selected from the group consisting of acidic oxides of sulfur, nitrogen, carbon, halogen compounds and mixtures thereof in the fluid bed reactor to form a stable material.

(2) A method for treating CKD according to the above (1) in which the CKD/water weight ratio is about 2 to about 1.1, the water temperature is about 35° to about 45° C., and in which mixing is done at about 600 rpm for about 30 minutes.

(3) A method for treating CKD according to the above (1) wherein an unstable compound of hydrated lime is formed, the pH rises to 12.3 and stable compounds including calcium silicate hydrates and calcium aluminate hydrates are formed.

(4) A method for treating CKD according to the above (1) in which the drying step c is done at less than 80° C. for a period of about 24 hours.

(5) A method for treating CKD according to the above (1) in which the mixture from step b is sieved through a 1/16th inch mesh sieve.

(6) A method for treating waste CKD according to the above (1) which includes an apparatus and step for reacting carbon dioxide with hydrated CKD.

(7) A method for treating waste CKD according to the above (6) in which the apparatus and step are in a fluidized bed reactor chamber including gas feeds, a flue gas outlet, sampling feature, temperature measurement and a pressure gauge.

(8) A method for treating waste CKD according to the above (7) in which gas is injected through a feeding tube into the bottom of the reactor through a conical distributor.

(9) A method for treating waste CKD according to the above (8) in which a gas flows upwardly causing solid particles of CKD to be suspended and swirl around to maximize carbonation.

(10) A method for treating waste CKD according to the above (1) in which the moisture content of hydrated CKD ranges between about 7 to 12% by weight of CKD, at a temperature of the CKD at about 25° C., a flow gas concentration of 100% and a flow rate of 3 liters per minute, a gas pressure at an inlet of 1.5 bars and a residence time of between about 20 to about 60 minutes.

(11) A method for treating waste CKD according to the above (1) in which the particle size of the treated cement kiln dust is decreased from about 5 to less 1 μm as indicated from SEM, the pH is decreased from 12.5 to about 9, the electrical conductivity is decreased from about 94.1 to about 33.3 μs, the total of dissolved solids of treated cement kiln dust is decreased from about 560 to about 201 mg/l and the loss on ignition of the treated cement kiln dust is increased from about 25.17 to about 35.57.

(12) A method for treating waste CKD according to the above (1) in which the carbonation efficiency defined as the ratio between the carbon uptake from experiments to the calculated theoretical of about 91% is achieved, two forms of $CaCO_3$ morphology; well defined rhombohedra calcite particles and uniform needle-like aragonite particles with mean particle sizes of one micron are defined, the sulfate concentration are decreased from about 1736 to about 112 mg/l and from about 576 to about 150 mg/l during short and long term experiments, the chloride concentration decreases from about 1286 to about 673 mg/l and from about 376 to about 338 mg/l during short term and long term experiments, the strontium concentration decreases from about 7.5 to 0.5 mg/l and from about 12 to about 0.3 mg/l during short and long term experiments and the chromium concentrations are decreased from about 17 to about 11 mg/l and from 11 to about 5 mg/l during short and long term leaching experiments respectively.

(13) A method for manufacturing lime cement from treated CKD wherein the CKD is treated by the method of the above (1).

(14) A method for treating CKD according to the above (1) in which soluble alkalies and sulfates are chemically fixed and/or stabilized.

(15) A method for treating CKD according to the above (1) in which leached metal concentration in effluent discharges is reduced.

(16) A method for treating CKD according to the above (1) wherein the treated CKD is used in a clinker maker process as a raw material.

(17) A method for treating CKD according to the above (1) in which the treated CKD is used for solidification/stabilization of hazardous waste.

(18) A method for treating CKD according to the above (1) in which the result product is used for neutralization of acid mine drainage.

(19) A method for treating CKD according to the above (1) in which the emissions of carbon dioxide are eliminated.

(20) A method for treating CKD according to the above (1) in which the carbon dioxide is stored in solid form as $CaCO_3$ for future use.

(21) A stable material made in accordance with the method of the above (1).

The following comments and Examples 1 to 9 which come directly after them, and also FIGS. 3 to 18 are especially relevant to this particular embodiment (namely the embodiment defined in the above clauses (1) to (21)) but are also relevant to the invention in general.

Thus, the present invention provides a new technique for producing treated CKD through reduction of the solubility of alkali metals and sulfates by conditioning the dust so that it is compatible with the process to which it will be introduced. The highly alkaline waste kiln dust found in the forms of oxides and hydroxide of calcium, potassium and sodium is converted to mildly alkaline calcium carbonate, and potassium and sodium bicarbonates.

It is an object of the present invention to encapsulate the heavy metals in a treated formulate, not only to lessen the dissolution of the leaching, but also to reach stabilization. The treatment of this invention is fixation through precipitation (or stabilization) and it addresses the use of $CO_2$ as a stabilizing agent. However; stabilization or chemical fixation may be achieved by using combinations of $CO_2$ and a hydrated form of CKD. $CO_2$ used alone or in combination with water promotes stabilization of many inorganic constituents in CKD through a variety of mechanisms. These mechanisms include stabilization as (or conversion to) carbonates (e.g. by precipitation), and so forth; microencapsulating of the waste particles through pozzolanic reactions; formation of metal carbonates or bicarbonates, and also utilizes $CO_2$ gas that would otherwise be emitted to the atmosphere.

It is another objective of the invention to transform hazardous wastes to nontoxic waste and/or reduce the release of toxic materials into the environment. It is a further objective of the invention to provide a highly effective and inexpensive method for reducing or moderating the high alkalinity of CKD. It is a still further objective of the invention to provide a process that does not generate a liquid effluent discharge.

In essence the present invention contemplates a method for treating waste CKD containing alkaline earth metal salts for reducing or moderating the high alkalinity of the kiln dust by converting the oxides and hydroxides of calcium, potassium and sodium to mildly alkaline calcium carbonate and potassium and sodium bicarbonates.

The method includes the step of providing a mass of CKD and an amount of water wherein the kiln dust contains alkaline earth metal salts and wherein the CKD/water weight ratio is preferably about 2 to about 1.1. The water temperature is preferably between 35° to about 45° C. and the mixing is preferably done at about 600 rpm for about 30 minutes. The mixture of CKD and water is then dried preferably at a temperature of 80° C. or less for a period of about 24 hours. The dried mixture is then fractionated as for example by passing through a sieve with 1/16th inch openings. The method also incorporates a fluidized bed reactor to carbonate the moist fractionated CKD, using pressurized $CO_2$.

As has been indicated above, in this invention a gas fluidized bed is used to aid in the long-term stabilization of CKD. A fluidized bed is formed when a quantity of a solid particulate substance is forced to behave as a fluid; usually by the forced introduction of pressurized gas through the particulate medium. This results in a medium that has many properties and characteristics of normal fluids; such as the ability to free-flow under gravity, or to be pumped using fluid type technologies. It reduces the density of the medium; without affecting its elemental nature.

The principle of fluidization is simple and can be described as follows: When solid particles have the right size, shape and are sufficiently light (porous), a gas flow with a low flow rate (a few cm/s) will fluidize the powder. In gas solid systems, an increase in gas flow rate beyond minimum fluidization leads to instabilities with bubbling and channeling of the gas. At higher flow rates, fluidization becomes more violent and the movement of solids becomes more vigorous. This type of bed is referred to as an aggregative fluidized bed, a heterogeneously fluidized bed, a bubbling fluidized bed or simply a gas fluidized bed.

It is a particular feature of the process of the invention that such improvements may be experienced because:
1. The apparatus and method of the present invention have contributed to:
    a. Economically capturing flue gas $CO_2$ emitted by the cement industry and converting these greenhouse emissions into beneficial products;
    b. Stabilizing carbonated dust, which is intended for safe land disposal;
    c. Immobilizing contaminants at hazardous waste disposal sites;
    d. Reclamation of acidic soils;
    e. Minimizing emissions of $CO_2$; and
    f. Protecting human health and the environment.
2. Waste materials provide an inexpensive source of calcium mineral matter, and the environmental quality of the waste materials may be improved through pH-neutralization and mineral transformation.
3. High sulfates reduction after treatment of CKD. The percent of water soluble sulfate for untreated and treated CKD, resolved from short term anion leached test, was determined to be 93% and 7%, respectively. This in turn will greatly reduce the formation of syngenite [$K_2Ca(SO_4)_2 \cdot H_2O$], gypsum [$CaSO_4 \cdot 2H_2O$], ettringite [calcium aluminate trisulfate hydrate, [$C_6AS_3H_{32}$], and monosulfate [calcium aluminate monosulfate hydrate, [$C_4ASH_{18}$] precipitates.
4. The carbonation process contributes to the precipitation of $CaCO_3$ and ties up the available calcium present in the dust. High percent reduction of leached $Ca^{++}$, as indicated from ICP analysis for short- and long-term leaching tests, since the calcium originally present in the dust is tied up and retained as a solid in the form of a carbonate.
5. Most of calcium carbonate particles produced had a defined and fine shape, with diameter (or particle sizes) of less than 1 μm. However, much finer particles of different morphologies can be produced, which provides a suitable particle size of $CaCO_3$ as used for industrial applications.

Other advantages of the invention may include:
1. The treated CKD includes pure lime stone ($CaCO_3$) with specific morphology, structure, and particle size.
2. Ability to manufacture lime cements from the treated CKD.
3. Fixation of soluble alkali metals and sulfates by carbonation.
4. Reduction of pH from 12 to about 9.
5. No effluent discharges.
6. Ability to use treated CKD in clinker making process as a raw material.
7. Ability to use treated CKD in waste management for solidification/stabilization of hazardous wastes and neutralization of acid mine drainage.
8. Use of treated CKD in civil engineering such as stabilization of soft soils, treatment of expansive/swelling soils, backfilling, and sub-base materials.
9. Ability to use treated CKD in agriculture practices such as neutralization of acidic soils.
10. Ability to maximize the use of natural resources.
11. Ability to utilize waste materials such as $CO_2$ and CKD for the production of useful products.
12. Reduction of emission of greenhouse gases.

Fluidized Bed Reactor Apparatus

The fluidized bed reactor chamber (FIG. 3) is typically a Plexiglas column reactor (20). Such a fluidized bed reactor chamber with an internal diameter of about 50 mm and an overall height of about 500 mm was designed and built for a method in accordance with a preferred embodiment of the present invention. The reactor (20) includes a gas feed, a flue gas outlet (22), sampling temperature measurement means such as a thermo couple (23), and a pressure gauge (not shown). Carbon dioxide gas was injected through a special feeding tube (21) that extended into the bottom of the reactor (20) and connected to an inverted cone-shaped gas distributor (25) having a truncated apex (26). The gas is delivered to the distributor (25) by means of a distributor plate (24). The distributor plate (24) has several openings (12 symmetrical holes with a diameter of 3 mm). Commonly, the fluidizing gas is distributed via a plate located at the base of the reactor through which an ascending current of fluidizing gas passes, and on which base the particles rest when the reactor is shut down.

Fluidized Bed Reactor Principles

In a fluidized bed reactor the gas flows upward through the bed causing the solid particles of CKD to be suspended. The gas is then forced through the distributor up through the solid material. At lower gas velocities, the solids remain in place as the gas passes through the voids in the material. As the gas velocity is increased, the reactor reaches a stage where the force of the gas on the solids is enough to balance the weight of the solid material. This stage is known as incipient fluidization and occurs at this minimum fluidization velocity. Once this minimum velocity is surpassed, the contents of the reactor bed begin to expand and swirl around much like a boiling pot of water. Stable expansion of a CKD bed occurs over a finite interval of $CO_2$ gas flow beyond the point of minimum fluidization.

Bed of solid particles with a stream of air or gas passing upward through the particles at a rate great enough to set them in motion establishes a fluidized bed. An expanded bed is formed when the gas or airflow rate increases and particles move apart. A few visibly vibrate and move about in restricted regions. At still higher velocities of airflow, all the particles become suspended. At this point, the frictional force between a particle and gas balances the weight of the particles, the vertical component of the compressive force between adjacent particles disappears, and the pressure drop through any section of the bed approximates the weight of $CO_2$ gas and particles in that section. The bed is referred to as an incipiently fluidized bed or a bed at minimum fluidization. With an increase in gas flow rates beyond minimum fluidization, large instabilities with bubbling and channeling of air create different types of beds.

CKD Treatment Process

The invention consists of the combinations and arrangements of steps which will be exemplified in the following descriptions. The different treatment processes (FIG. 4) are: hydration (30) (formation of calcium hydroxide); dehydration, i.e. drying (31); fractionation via sieving (32); and carbonation (33) (reaction of hydrated CKD with $CO_2$ gas in a fluidized bed reactor).

EXAMPLES

Example 1

Hydration of CKD

The CKD samples were supplied by a cement factory in Al Ain, United Arab Emirates. Samples were taken from open storage piles in a weathering area. The CKD consisted of 46% CaO, 12.63% $SiO_2$, 2.26% $Al_2O_3$, 2.08% $Fe_2O_3$, 0.89% MgO, 1.78% $K_2O$, 0.25% $Na_2O$, 1.56% $SO_3$, and 0.52% Cl (% values are by weight). The cumulative grain size of the CKD is depicted in FIG. 1 (along with that for sand).

When water is added to the CKD, the following set of reactions take place.

1. Quick lime is hydrated to form hydrated lime [calcium hydroxide, $Ca(OH)_2$] which is not stable in water. The chemical reaction is expressed by equation 1 as:

$$CaO(s) + H_2O(l) \rightarrow Ca(OH)_2(s) \Delta H(35°C.) = -65.47 \text{ KJ/mol.} \quad (1)$$

2. Ionization of calcium hydroxide; pH rises to 12.3 as demonstrated by equation 2.

$$Ca(OH)_2 \rightarrow Ca^{2+} + 2(OH)^- \quad (2)$$

3. When a pozzolan (reactive silica) is present in the system, the calcium silicate hydrates [$C_3S_2H_3$] formed as a result of the reaction between lime and pozzolan that are stable in water. The relevant chemical reactions may be expressed as equation 3:

$$3CaO + 2SiO_2 + 3H_2O \rightarrow 3CaO.2SiO_2.3H_2O \quad (3)$$

$(C_3S_2H_3)$

4. Similarly, when a pozzolan (reactive alumina) is present in the system, the calcium aluminate hydrates [$C_3AH_6$] formed as a result of the reaction between lime and pozzolan that are stable in water. The relevant chemical reactions may be expressed as per equation 4:

$$3CaO + Al_2O_3 + 6H_2O \rightarrow 3CaO.Al_2O_3.6H_2O \quad (4)$$

$(C_3AH_6)$

5. Dissolution of sulfate minerals as demonstrated by equation 5.

$$MxSO_4^- \cdot nH_2O \rightarrow xM^{y+} + SO_4^{2-} + nH_2O; x=1, y=2 \text{ or } x=2, y=1 \quad (5)$$

6. Depending on the concentration of aluminate and sulfate ions in the solution, the precipitating crystalline products are either calcium aluminate trisulfate hydrate or the calcium aluminate monosulfate hydrate. In solutions saturated with calcium and hydroxyl ions, the former crystallizes as short prismatic needles and is also referred to as high-sulfate or by the mineralogical name, ettringite. The monosulfate is also called low-sulfate and crystallizes as thin hexagonal plates. The relevant chemical reactions may be expressed as per equations 6 and 7:

Ettringite $$6[Ca]^{2+} + [AlO_4]^- + 3[SO_4]^{2-} + aq. \rightarrow C_6AS_3H_{32} \quad (6)$$

Monosulfate $$4[Ca]^{2+} + [AlO_4]^- + [SO_4]^{2-} + aq. \rightarrow C_4ASH_{18} \quad (7)$$

Ettringite is usually the first to crystallize because of the high sulfate/aluminate ratio in solution phase during the first hour of hydration. Precipitation of ettringite contributes to stiffening (loss of consistency), setting (solidification of the paste), and early strength development, shrinkage upon drying and swelling upon hydration. Later, after the depletion of sulfate, ettringite becomes unstable and is gradually converted into a monosulfate phase.

Theoretical Extent of Hydration Process of CKD

Figure 5:
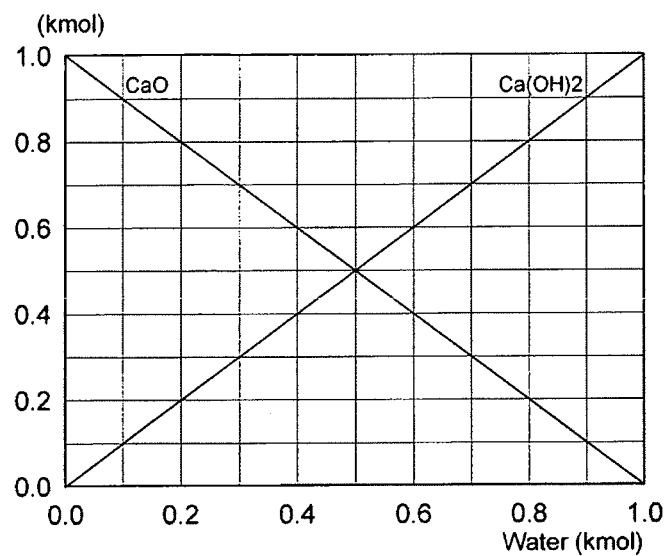
FIG. 5 is an equilibrium composition diagram for hydration process modeling using HSC software, depending on the amount of $H_2O$.

To evaluate the effect of the amounts of moisture content on product composition, the hydration process was modeled using HSC-4 chemistry software. The hydration of CaO, commercially referred to as quick lime, is an exothermic process releasing a great quantity of heat. The equilibrium composition curve of calcium hydroxide formation is shown in FIG. 5. The results indicate that the reaction is stoichiometry, i.e. one mole of calcium oxide reacts with one mole of water to produce one mole of calcium hydroxide. Therefore, 56 units (1 mole) of CaO plus 18 units (1 mole) of $H_2O$ results in 74 units (1 mole) of $Ca(OH)_2$. The ratio of $Ca(OH)_2$ to CaO is 74/56=1.32. This means that 1 kg of CaO and 0.32 kg of water will produce 1.32 kg of $Ca(OH)_2$ which is the minimum water required for the chemical reaction. Therefore, the formed $Ca(OH)_2$ contains 75.7% CaO and 24.3% $H_2O$.

To calculate the amount of water needed for hydrating the CKD, one needs to know the amount of CaO that exists in the CKD. Since the CKD contains 46% CaO, the amount of water needed to hydrate one Kg of CKD is 0.147 Kg of water. Such an amount of water will not be enough to hydrate the CKD because CKD contains additional amounts of oxides in the forms of alumina, silica, iron, potassium, etc. Therefore, the amounts of different oxides were measured and the required amounts of water were calculated according to their chemical reactions.

Factors Controlling the Hydration Process

Since the major oxide in CKD is CaO, hydration tests on the pure lime were investigated to evaluate the effect of lime to water ratio, degree of agitation, hydration time, temperature, and water chemistry. For optimizing hydration conditions, experiments on small patches were performed using 100 g of CaO with different distilled water ratios (1:1, 1:1.5, 1:2, 1:2.5, 1:3), at different temperatures (30, 40, and 50° C.), and different agitation rates (200; 400, and 600 rpm).

The process of adding water to calcium oxide is referred to as a hydration process or lime slaking. When the hydration process is done with just the right amount of water, the hydrate material is a dry powder and the process is called "dry hydration." On the other hand, when excess water is used for hydration, the resultant hydrate is a slurry form, and the process is called "slaking." It is further recommended to add quicklime to water, not the other way around, to avoid explosion.

Results from quick lime hydration experiments indicated that the hydration process depends on the following factors:
1. Lime to water ratio: It affects slaking time by affecting the slaking temperature. Temperature will vary due to variation in water temperature, lime reactivity, and quality of water. A better way to maintain a correct lime to water ratio is to control the slaking temperature.
2. Slaking water temperature: It has a great influence on the slaking process and specific surface of the hydrate particles. Cool slaking water should not contact the dry lime. If cool water and lime come in contact, a condition called drowning takes place. Particles of hydrate formed under drowning conditions are very coarse and not very reactive.
3. Water chemistry: It is a major factor in the slaking process; presence of certain chemicals in the slaking water will accelerate or hinder the slaking process. Water with high dissolved solids generally causes excessive foaming, which results in operational problems. Sea water can effectively be used for slaking. However, the material of construction must take into consideration corrosion caused by chlorides.
4. Slaking time: It is the time required to complete hydration. This time varies from lime to lime. A high reactive lime will hydrate completely in 2 to 3 minutes. Medium reactive limes will hydrate completely in 5 to 10 minutes. Low reactive limes, hard-burned limes, and magnesium limes will hydrate in 15 to 30 minutes.
5. Degree of agitation: has an impact on the end product during the slaking process. Too little agitation will result in uneven temperature within the slaking chamber resulting in hot and cold spots.

Optimum Operating Conditions for CKD Hydration Process

To evaluate the optimum operating conditions for CKD hydration, different weights of water (0.33, 0.50, 0.67, 0.83, 1 and 1.17 Kg), at 35±2° C., were added to 1 kg of CKD, then stirred mechanically at 600 rpm for 30 minutes. The mixture was then oven dried at a temperature of less of than 80° C.; for 24 hrs. The dried CKD was then sieved through a 1/16-inch (2 millimeter) grid, to decompose to the initial sized dust particles. The optimum operating conditions are summarized in Table 1.

TABLE 1

Optimization hydration parameters for CKD

| Parameters | Optimized results |
|---|---|
| CKD/water weight ratio | 2/1.1 |
| Water temperature | 35-40° C. |
| Mixing speed | 600 rpm |
| Mixing time | 30 minute |
| Drying temperature | <80° C. |

TABLE 1-continued

Optimization hydration parameters for CKD

| Parameters | Optimized results |
|---|---|
| Drying time | 24 hrs |
| Sieving size | 1/16-inch |

Example 2

Carbonation of CKD

Carbonation Stages

Figure 6:
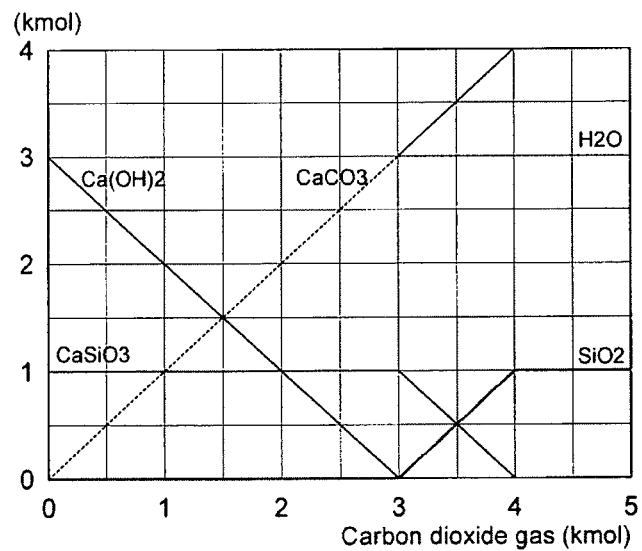
FIG. 6 is an equilibrium composition diagram for a carbonation process using HSC software, depending on the amount of $CO_2$.

In order to determine the feasibility of possible calcium carbonate production, the processes were modeled using HSC-4 chemistry software and the results are shown in FIG. 6. Carbonation of concrete kiln dust is often described as two stage reactions. Based on thermodynamic analysis of the two reactions expressed by equations 8, and 9, it is clear that both reactions are spontaneous and exothermic.

$$Ca(OH)_2(s)+CO_2(g) \rightarrow CaCO_3(s)+H_2O(l) \Delta H(35° C.)=-112.48 \text{ kJ/mol} \quad (8)$$

$$CaSiO_3+2CO_2+4H_2O \rightarrow Ca^{2+}+2HCO_3^-+SiO_3^{2-} \rightarrow CaCO_3+SiO_2.H_2O+H_2O+CO_2 \Delta H(35° C.)=-41.84 \text{ kJ/mol} \quad (9)$$

The first reaction [$CO_2$—$Ca(OH)_2$] has more negative Delta G (−112.48 KJ/mol) than the second one [$CO_2$—$CaSiO_3$], where Delta G equals −41.84 KJ/mol. Hence, the first reaction will take place first. The second reaction will not proceed as long as there is some $Ca(OH)_2$ in equilibrium. This can be clearly seen from the results shown in FIG. 6. Because of the exothermic nature of the carbonation process of calcium hydroxide, higher temperatures could speed up carbonation of calcium silicate. As the carbonation reaction occurs, the water combined in hydroxides is released as free water. The maximum attainable conversion of calcium ions from the calcium silicate drops with limited $CO_2$ equilibrium composition as shown in FIG. 6. This means that the occurrence of the second reaction may be limited by limiting the stoichiometry amount of $CO_2$.

Degree of Sequestration

The degree of sequestration refers to the amount of $CO_2$ captured as a carbonated mineral mass compared to the mass of $CO_2$ that would be consumed if all available oxides were carbonated. For this study the degree of sequestration was determined by comparing the observed mass of $CO_2$ sequestered via thermo-gravimetric analysis (TGA) to the amount theoretically possible based on the elemental and phase composition of the pre-carbonated CKD. For pure oxides (e.g., CaO and $Ca(OH)_2$) the theoretical extent of carbonation is a function of basic stoichiometry:

$$CaO(S)+CO_{2aq} \rightarrow CaCO_3(s) \quad (10)$$

Thus, every ton of CaO can potentially sequester up to 0.785 tons of $CO_2$. For CKD, the theoretical extent of carbonation can still be calculated as a function of stoichiometry. However, the extent also depends on the availability of those oxides for reaction. CKD can host a number of reaction pathways to the capture of $CO_2$ in addition to equation 10:

$$Mg(OH)_2+CO_2 \rightarrow MgCO_3+H_2O \quad (11)$$

$$Ca(OH)_2+CO_2 \rightarrow CaCO_3+H_2O \quad (12)$$

$$2KOH+CO_2 \rightarrow K_2CO_3+H_2O \quad (13)$$

$$2NaOH+CO_2 \rightarrow Na_2CO_3+H_2O \quad (14)$$

Potassium and sodium oxides can also react with $CO_2$ to form bicarbonates. The amount of free oxide in CKD available for reaction depends on the type of kiln, source material, fuel type used, and the manner in which CKD was recovered from the system. Because of the wide range in CKD composition, it is difficult to specify a theoretical extent of carbonation. Nevertheless, estimates of $CO_2$ consumption can be made by talking into consideration the amount of calcite present in the pre-carbonated CKD, along with the CaO bound in anhydrite. Similar to estimates of $CO_2$, an estimate of the theoretical extent of carbonation in given CKD can be calculated as follows:

$$\% \ CO_2 = 0.785(CaO - 0.56 CaCO_3 - 0.7 SO_3 + 1.091 MgO + 0.71 Na_2O + 0.468(K_2O - 0.632 KCl) \quad (15)$$

Where the % $CO_2$ refers to the mass of $CO_2$ consumed in the carbonation reactions compared to the original, un-reacted mass of the sample. The stoichiometry mass factors shown in equation 15 assume that all of the CaO (except that bound in $CaSO_4$ and $CaCO_3$ will react to form $CaCO_3$ all the MgO will react to form $MgCO_3$ and all of Na and will convert to Na and $K_2CO_3$. The mass factors for Na and K will be doubled if bicarbonates form instead of carbonates.

$$\% \ CO_2 = 0.785(46.47 - 0.56 \times 17.7 - 0.7 \times 1.56) + 1.091 (0.89) + 0.71(0.25) + 0.468(1.78 - 0.632 \times 1.25) = 29.45$$

Therefore, the amount of $CO_2$ consumed in the carbonation reaction is 29.45% of the weight of the CKD.

Experimental Evaluation

After the hydration process described in example 1, the CKD was dried and sieved. The solid substrate material of CKD, with optimum moisture content, was then deposited in the fluidized bed reactor to be in contact with pressurized $CO_2$ for initiation of carbonation. The rate of dissolution of $Ca(OH)_2$ into $Ca^{2+}$ depends on the dissolution pressure and moisture content while, the reaction rate of calcium ions combining with carbonate ions is instantaneous. Therefore, the rates of formation of calcium and carbonate ions are the primary limitations for the overall reaction rate, more calcium hydroxide dissolves to equalize the concentration of calcium ions. With a pressurized $CO_2$ gas into the fluidized bed reactor and moist calcium hydroxide; the overall reaction will proceed rapidly.

During the carbonation process, a rapid temperature was observed over a period of 7-15 minutes. The maximum evolved temperature was 86° C. This may be attributed to the exothermic nature of the carbonation process. Additionally, the exposure of di-calcium silicate in CKD powder to $CO_2$ and moisture produced a noticeable exothermic reaction.

Optimization of the Carbonation Process

The following parameters were investigated to optimize the carbonation efficiency:

1. Moisture content: Moisture content is an important parameter of the reaction; the reaction does not completely occur for totally dried samples. It is known that water is necessary to promote the reaction of $CO_2$ but too much water limits the reaction due to the blockage of the pores in the solid. Hydration and dissolution of $CO_2$ occur in the presence of water, as well as the dissolution of $Ca^{2+}$ ions from the solid phase, which reacts with the $CO_2$ to form calcium carbonate. At low water-to-solid ratios, the gas permeability is high and the $CO_2$ effectively diffuses into the material. However, with the increase in water content, the pores in the CKD are effectively sealed off. The diffusion of gas into the pore system is hindered, and inhibits the reaction.

Figure 7:
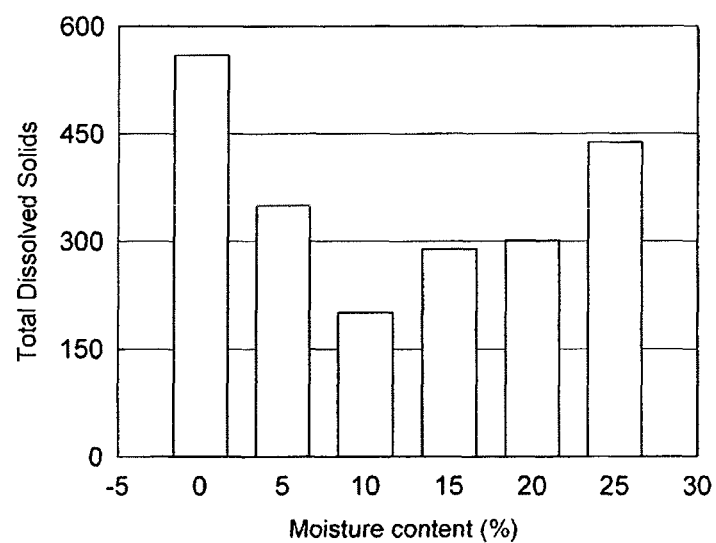
FIG. 7 is a graphical representation of the total dissolved solids (TDS) as a function of moisture content during carbonation.
Figure 8:
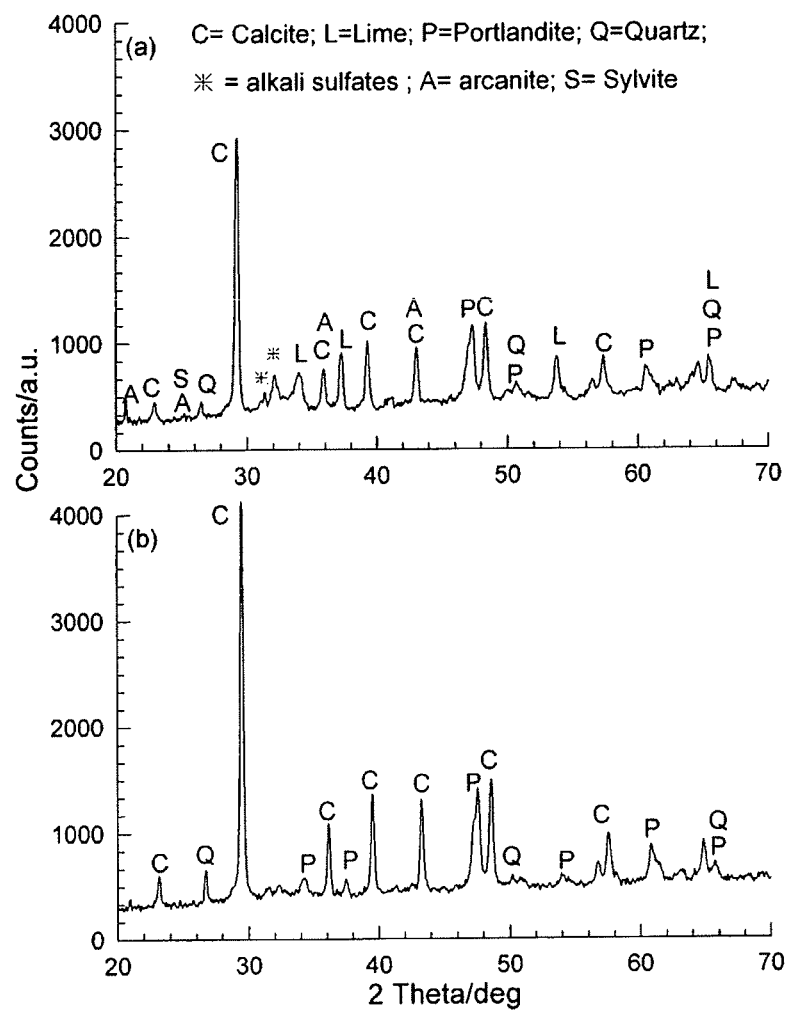
FIG. 8($a$) illustrates an x-ray diffraction analyses resulting from untreated CKD.
Figure 9:
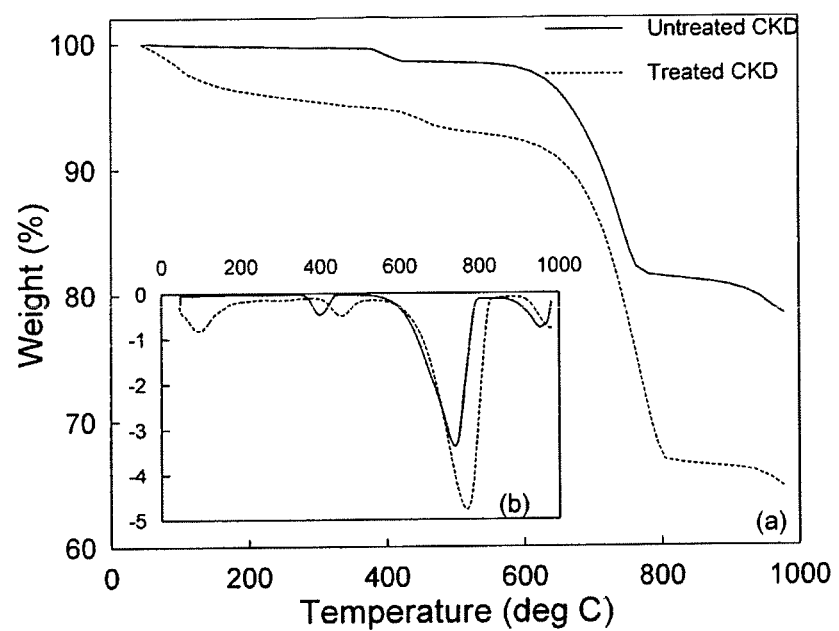
FIG. 9 shows TGA(a) and DTG(b) curves for untreated and treated CKD waste samples with a heating range of 20° C./min.
Figure 10:
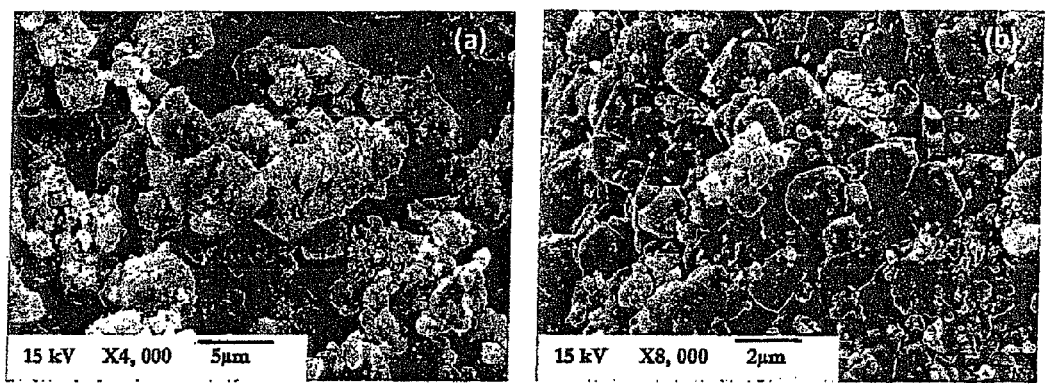
FIG. 10 is a scanning electron microscope (SEM) image of (a) fresh CKD supplied by a cement factory produced from a dry kiln process and (b) 1 month stock pile CKD.
Figure 11:
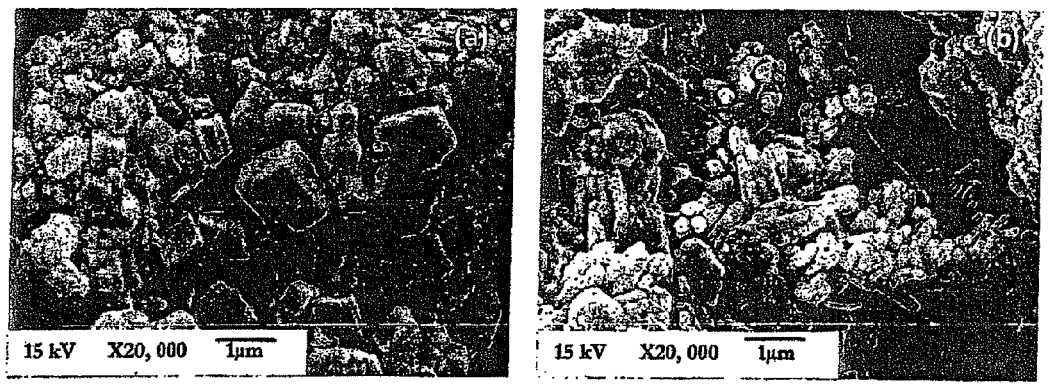
FIG. 11 is SEM images (same scale) of carbonated CKD, showing two morphological structures of $CaCO_3$; (a) rhombohedra structures and (b) aragonite structures.

Hydrated CKD waste, with different humidity ranging from 0-25% was exposed to $CO_2$ in the fluidization bed reactor. The moisture content was optimized through the measurements of the total dissolved solids (TDS) after shaking the product in distilled water for 72 hrs. FIG. 7) indicates that; CKD with humidity of 7-10% (w/w) seems to be the best option. Above 12% there is a decreasing tendency for the carbonation process. This could indicate that the reaction mainly occurs in the pores of the solid matrix.

Besides the change in the TDS after carbonation, there is also a change in the mass of the treated CKD. The formation of solid calcite induces an increase in the sample mass, which can be directly related to the amount of trapped carbon dioxide.

2. Influence of sieving: Carbonation success was evaluated for un-sieved samples 1.0 and samples sieved through 16-mesh sieve, at the same humidity percentage of 10%. Comparing an un-sieved CKD sample and 16-mesh sieved sample indicates that it would be better to keep sieving the samples, in order to increase the exchange surfaces. Grinding was expected to activate the materials chemically through reducing particle size, increasing exposed surfaces for chemical reactions, and introducing electrostatic charges on the surfaces.

3. $CO_2$ flow rate: At sufficiently high $CO_2$ gas flow rate, beyond the so-called point of minimum velocity, the bed can be observed to be traversed. Also, it was noticed that the time required for completing the carbonation reaction decreases with increasing $CO_2$ flow rate.

4. Carbonation time: Samples were exposed to $CO_2$ for different times ranging from 5-60 minutes. The results indicated that carbonation reaction may be essentially completed in 20-60 minutes. However, in air, the carbonation reaction may be completed in 24 hours and will be limited to the externally exposed surfaces without full penetration.

The optimum conditions for the carbonation process are summarized in Table 2.

TABLE 2

| Optimized carbonation parameters for CKD | |
|---|---|
| Parameters | Optimized results |
| Moisture content | 7-12% |
| Temperature | 25° C. |
| Time | 20-60 minutes |
| $CO_2$ concentration | 100% |
| $CO_2$ flow rate | 3 liter/min |
| $CO_2$ pressure | 1.5 bar |

Example 3

Physical Properties of Untreated and Carbonated CKD

The physical and chemical characteristics of the CKD, which is collected for use outside of the cement production facility, will depend in part on the method of dust collection employed at the facility. Free lime can be found in CKD, and its concentration is typically highest in the coarser particles captured closest to the kiln. Finer particles tend to exhibit higher concentrations of sulfates and alkalis. If the coarser particles are not separated out and returned to the kiln, the total dust will be higher in free lime.

The pH of the original CKD water mixtures is very close to the pH of a solution saturated in Portlandite. It contains significant alkalis, and is considered to be caustic. After carbonation, however, the alkalinity of CKD is reduced since the calcium oxide is converted into calcium carbonate. As the concentration of OH— decreased, the concentration of $Ca^{++}$ in solution also decreased since the hydroxide is more soluble than the carbonate. Table 3 lists some typical physical properties of CKD.

TABLE 3

Typical ranges of physical properties of untreated and carbonated CKD

| Measurement | CKD Untreated | CKD Carbonated |
|---|---|---|
| Gradation 75% passing | 0.030 mm | 0.010 mm |
| pH | 12-12.5 | 8.5-9.5 |
| Electrical conductivity (µs) | 94.1 | 33.3 |
| TDS (mg/1) | 560 | 201 |
| LOI | 25.17 | 35.57 |

A higher loss on ignition (LOI) means that a dust sample contains a higher percentage of bound water within its chemical structure and less calcium oxide is available to react. A lower LOI indicates less bound water, and more free lime for hydration reactions.

Example 4

Mineralogical Composition of Untreated and Carbonated CKD

To determine the mineral composition of the carbonated CKD, samples of CKD were analyzed using a Philips x-ray diffractometer model PW/1840, with Ni filter, Cu—Kα radiation ($\lambda$=1.542 Å) at 40 kV, 30 mA° and scanning speed 0.02°/S. The diffraction peaks between 2θ=2° and 2θ=80° were recorded. The untreated CKD samples contained mainly limestone (CaO) as a main component, quartz ($SiO_2$ and calcite ($CaCO_3$ which actually presented in the raw materials, with some hydrated lime (Portlandite $Ca(OH)_2$) arcanite ($K_2SO_4$ and sylvite (KCl), alkali sulfate (sodium/potassium sulfate) and sulfate phases such as gypsum ($CaSO_4.H_2O$ and syngenite ($K_2Ca(SO_4)_2.H_2O$) as shown in Table 4.

TABLE 4

Main mineral phases in CKD

| Mineral phases | Formula | CKD Untreated | CKD Carbonated |
|---|---|---|---|
| Lime | CaO | x | |
| Portlandite | $Ca(OH)_2$ | x | x |
| Quartz | $SiO_2$ | x | x |
| Anhydrite | $CaSO_4$ | x | |
| Halite | NaCl | x | |
| Sylvite | KCl | x | |
| Calcite | $CaCO_3$ | x | x |
| Arcanite | $K_2SO_4$ | x | |
| Alkali sulfate | $Na_2SO_4$ | x | |
| Gypsum | $CaSO_4 \cdot 2H_2O$ | x | |
| Syngenite | $K_2Ca(SO_4) \cdot 2H_2O$ | x | |

FIGS. 8a and b are representatives of XRD diffractograms for untreated (stocked) and carbonated CKD samples. The untreated CKD sample contains mainly limestone (CaO) as a main component, quartz ($SiO_2$ and calcite ($CaCO_3$) which actually presented in the raw materials, with some hydrated lime, arcanite and sylvite, alkali sulfate (sodium/potassium sulfate) and sulfate phases such as gypsum and syngenite.

X-ray diffraction identification of the carbonated CKD sample showed that the absolute intensities of calcite lines had increased. There are some phases that disappeared after carbonation including; lime, calcium sulfate, alkali-calcium double salts, due to consumption of calcium ion in the formation of calcium carbonate. This indicates that the carbonation forces the precipitation (or formation) of calcium carbonates and ties up the available calcium present in the CKD, thereby greatly reducing the formation of syngenite and gypsum precipitates which would otherwise contaminate the residual CKD solids. X-ray diffraction identification of the carbonated precipitated solids showed the presence of some Portlandite indicating that both $CO_3^-$ and OH were present and the pH in the range of 8.5-9.5. At low pH, namely below 9, $HCO_3^-$ was present in addition to $CO_3^-$.

Example 5

Thermal Characteristics of Untreated and Carbonated CKD

Thermo-gravimetric analysis before and after carbonation of CKD was performed with a thermo gravimetric analyzer (TGA 7 Perkin-Elmer), in a temperature range of 50-1000° C. at a heating rate of 20° C./min, the carbonate content was calculated from the weight loss on ignition.

The thermo-gravimetric analysis (TGA) and the derivative of thermo-gravimetric (DTG) curves, for untreated and carbonated CKD samples, showed a good repeatability whatever the carbonation condition. FIGS. 9a and b show that the loss of water in carbonated CKD sample occurred less than 200° C. due to hydrating water. Also, as the carbonation reaction occurs, the water combined in hydroxide is released as free water, equation 8. Above 400° C., there is an endothermic that corresponds to the decomposition of calcium hydroxide into calcium oxide and water, equation 16.

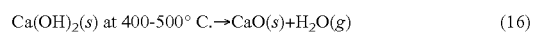
$$Ca(OH)_2(s) \text{ at } 400\text{-}500° C. \rightarrow CaO(s)+H_2O(g) \qquad (16)$$

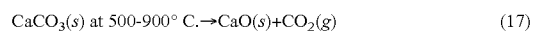
$$CaCO_3(s) \text{ at } 500\text{-}900° C. \rightarrow CaO(s)+CO_2(g) \qquad (17)$$

The decomposition of calcium carbonate between 500 and 900° C. is considered to be the carbonate content of the samples, equation 17. From TGA, the percent weight loss of carbonated content for untreated CKD is determined to be 17.7% where, carbonated CKD is 26.77%. Hence, the carbonation process has contributed to an increase in the content of calcium carbonate within the treated CKD by about 52%. The carbonation efficiency is defined as the ratio between the carbon uptakes from experiments to that calculated theoretically by equation 15. Therefore, the carbonation efficiency is 26.77/29.45=91%, which suggested that the treatment method used in this invention (i.e., fluidized bed reactor) is very successful.

Example 6

Microstructure Characteristics of Untreated and Carbonated CKD

The microstructure results obtained using the scanning electron microscopy has indicated that the characteristics of CKD particles, such as morphology and particle size, can vary greatly under storage conditions. The scans of the fresh and stockpiled CKD are obtained by using the scanning electron microscope (JSM-5600 Joel microscope equipped with an energy Dispersive x-ray detector for chemical analysis) as shown in FIGS. 10a and 10b. The micrographs indicate that there are significant morphological differences between the fresh and stockpiled CKD. The fresh CKD particles are coarse, irregular, and random in shape and size, with a mean particle size of approximately 7 μm. The stockpiled CKD shows clear evidence of reaction products in the form of cubes. These results are expected because of the changes in microstructure occurring as a result of chemical reactions (e.g., hydration due to moisture absorption and surface carbonation).

The stabilization mechanism of CKD, after carbonation, can be evaluated by investigating the characteristics of the formed particles, such as morphology and size. It has been shown that there are two forms of $CaCO_3$ morphology; well defined rhombohedra calcite particles, and uniform needle like aragonite particles, with a mean particle size of approximately one or less μm as revealed in FIGS. 11a and b. The morphology and particle size can vary greatly in the carbonation process, according to precipitation (or reaction) conditions such as:
  a. dispersion of $CO_2$
  b. presence of divalent cations.
  c. the ionic ratio of $[Ca^{2+}]/[CO_3^{-2}]$.
  d. pH.
  e. the elevated temperature during carbonation process, which affect the crystalline form and particle size distribution.

There are various forms of $CaCO_3$ morphology namely rhombic calcite, needle like aragonite and spherical vaterite that vary according to precipitation conditions. It has also been observed that the initial super saturation and temperature of the $Ca(OH)_2$ slurry determined the proportion of calcite, aragonite and vaterite shaped particles. It was concluded that saturation level and the ionic ratios affect the crystalline form and the particle size distribution. Others described the $CaCO_3$ morphology change as being related to the pH and super saturation levels of the $Ca(OH)_2$ solution. The carbonation process usually produces precipitated $CaCO_3$ particles that are of spindle shape and having a particle size of about 2 μm.

Example 7

Anions and Cations Leached from Untreated and Carbonated CKD Dust

One of the most important criteria for disposal of CKD to landfill or reuse of wastes is the release of hazardous compounds to the surrounding environment. Experimental results have indicated that CKD has very high alkali, and high sulfate contents. The alkalis exist as alkali sulfates, such as arcanite ($K_2SO_4$), $NaSO_4$ and sylvite (KCl), and an assemblage of oxidized products such as lime. These products are unstable or highly soluble at earth surface conditions. When CKD contacts water, these products will either dissolve completely or more stable and less soluble secondary phases will precipitate. Thus, the concentration of some constituent elements in CKD) leachate will be controlled by the solubility of the secondary precipitates while, the concentration of others will be controlled by their availability to the leachate solutions and by their diffusive flux into the solution from the leaching of primary phases over time. To differentiate between these two classes of elemental behavior, it is recommended to conduct leaching tests on a particular waste at least at two different solid/water ratios. Then, if an element's concentration does not double when solid/water ratio is halved, there must be a solid phase control on its concentration in solution.

TABLE 5

Anions leaching values for the CKD wastes in landfills (mg/kg), obtained by Ion-Chromatography:

| Leaching Test | Time (hrs) | ratio of water to CKD | CKD Untreated | | Carbonated (+ % reduction for the short term values) | |
|---|---|---|---|---|---|---|
| | | | $SO_4$ | Cl | $SO_4$ | Cl |
| Short Term | 6 | 2 L/kg | 1736.53 | 1286.86 | 112.44 (93%) | 673.90 (47.6%) |
| Long Term | 18 | 8 L/kg | 576.01 | 376.01 | 150.026 | 338.56 |

The observed leaching test was carried out in accordance to the British Standard BS EN 12457: 2002, which is designed to examine the short-term and long-term leaching behavior for landfills. It is a two-step leaching test with liquid-to-solid ratio of 10 L/kg. The CKD was leached at liquid-to-solid ratio of 2 L/kg for 6 hours of end-over-end mixing and then filtered. The residues were leached further at liquid-to-solid ratio of 8 L/kg for 18 hours. The leachate was filtered with a 0.45 μm filter paper and then divided into two parts. The first part was measured by Ion-Chromatography (DIONEX IC 90) for the chloride and sulfate contents. The second part was acidified with nitric acid to pH<2 for metal analysis. The concentration of the major elements Ca, K, Na and minor elements Sr, and Cr in leachates were analyzed by ICP (inductively coupled plasma).

The sulfate and chloride concentrations were obviously lowered after carbonation as shown in Table 5. When carbon dioxide was reacted with the CKD, calcium carbonate ($CaCO_3$) is formed. Since $CaCO_3$ is two orders of magnitude less soluble than the calcium sulfates (0.01 to 0.02 g/L as opposed to 2 to 3 g/L), the calcium is effectively tied up, thereby lowering alkalis and sulfate in the solution. For untreated CKD sample, the concentrations of leached Ca, Na and K are very high and result from the high solubility of minerals bearing these elements, such as halite and sylvite. The release of other elements, such as Sr and Cr, was found in lesser amounts. Table 6 shows the change in the metals release after carbonation.

TABLE 6

Metals leaching values for the CKD waste in landfills (mg/kg), obtained by ICP analysis:

| Leaching Test | Time (hrs) | Ratio of water to CKD | CKD | | | | | | | | | |
|---|---|---|---|---|---|---|---|---|---|---|---|---|
| | | | Untreated | | | | | Carbonated | | | | |
| | | | Ca | K | Na | Sr | Cr | Ca | K | Na | Sr | Cr |
| Short Term | 6 | 2 L/kg | 1418 | 2093 | 226 | 7.5 | 17 | 202 | 640 | 105 | 0.5 | 11 |
| Long Term | 18 | 8 L/kg | 1399 | 701 | 78.8 | 11.8 | 11 | 132 | 446 | 46.8 | 0.3 | 5.3 |

Example 9

Durability of Treated CKD

Examination of the durability of CKD is an essential part of the overall disposal system performance assessment methodology. The availability of the CKD waste dust contents was displayed by subjecting the untreated and treated CKD to multiple environments tested solutions; distilled water, boiling water, sea water, acidic and basic universal buffer solutions. One gram of waste CKD was suspended in 100 ml distilled water and subjected to vigorous shaking for 72 hrs. Metal leaching was measured using ICP analysis.

Figure 12:
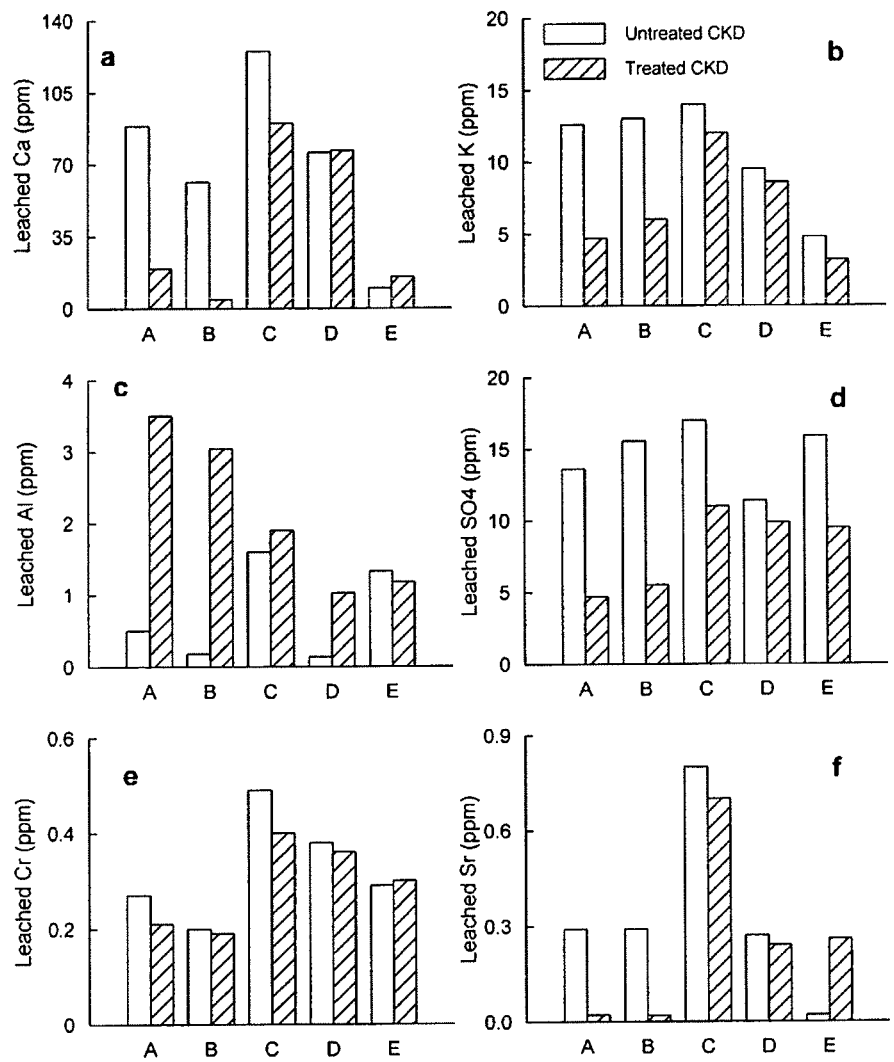
FIG. 12 ($a, b, c, d, e$, and $f$) are graphical representations of leaching untreated and treated CKD tested for 72 hours in different solutions; A) is distilled water, B) is boiling water, C) is sea water, D) is acidic universal buffer solutions, E) is a basic universal buffer solution.

When untreated CKD is brought into contact with water, high concentration of sulfates and alkali metals Ca, K, Na and Al are leached. Other constituents are leached to a lesser extent such as Cr and Sr. In treated CKD, the concentration of released sulfate and alkali metals is decreased as indicated in FIG. 12. The leached elements show the following characteristics:

1. The overall leached Ca in treated CKD solutions were clearly decreased compared with untreated one. This is due to the conversion of soluble calcium hydroxide to insoluble precipitated $CaCO_3$.
2. The leached Ca quantity in boiling water is less than that leachated at 25° C.; this phenomenon can be illustrated as follow; some of calcium carbonate combined with $H^+$ which is saturated with carbon dioxide to form the soluble calcium bicarbonate as demonstrated by equation 18. Boiling water promotes the formation of carbonate from the bicarbonate and precipitates calcium carbonate out of solution, reducing the leached calcium as demonstrated by equation 19.

$$CaCO_3 + CO_2 + H_2O \rightarrow Ca(HCO_3)_2 \quad (18)$$

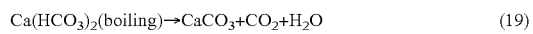

$$Ca(HCO_3)_2 (boiling) \rightarrow CaCO_3 + CO_2 + H_2O \quad (19)$$

3. The leached K was also decreased after treatment of CKD. This can be attributed to the conversion of potassium hydroxide to potassium carbonate, producing difference in solubility's, where 100 gm KOH dissolves in 50 ml $H_2O$ while 112 gm $K_2CO_3$ dissolves in 100 ml $H_2O$.
4. CKD leach test results, at different environments, showed high concentrations of leached sulfate; when CKD is brought into contact with water. After carbonation more reduction of released sulfates has been proven. After the structure is fully carbonated, the alkali metals are effectively tied up as carbonates thus, preventing formation of alkali sulfates. The leached sulfate in the basic medium can be attributed to the intensive interaction between sulfates and sodium hydroxide in the alkaline buffer.
5. The high product of leached alkali metals and sulfates in sea water is due to the interaction between CKD and sea water salts resulting in the formation of water soluble compounds, which are then leached away.
6. With respect to Cr and Sr, the leached amounts are relatively low. They actually have very low reaction with different solutions, coupled with the potential of the anionic forms of these elements to proxy for $SO_4$ in the gypsum structure. Carbonation leads us to speculate that quantities of these elements were reduced due to reduction of sulfates.

Figure 13:
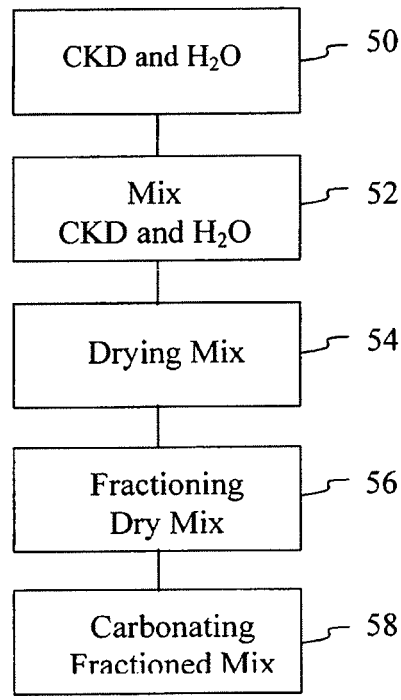
FIG. 13 is a flow chart illustrating one embodiment of the invention.

FIG. 13 illustrates a process in accordance with the first preferred embodiment of the invention wherein a mass of CKD and a mass of water are provided in step 50. The kiln dust and water are mixed in step 52 with Heidolph mechanical 5 stirrer Model RZR1 and a maximum speed of about 600 rpm for about 30 minutes then dried in step 54 at a temperature of below about 80° C. for a period of about 24 hours. The dried mixture is then fractionated in step 56 by sieving through a screen with 1/16th mesh openings. The fractionated moistened CKD is then carbonated in the fluidized bed reactor, using pressured $CO_2$ at moisture content in the range of 7-12% in step 58.

Figure 14:
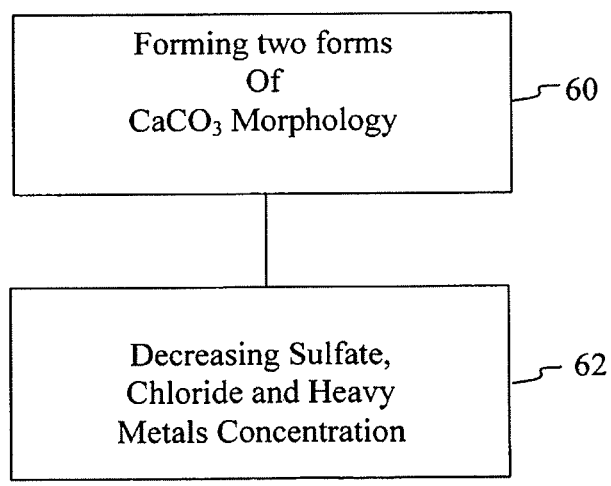
FIGS. 14 to 18 are portions of flow charts illustrating further steps which can be included in processes according to other embodiments of the invention.

FIG. 14 illustrates further steps included in one embodiment of the invention. These steps are added to the steps shown in FIG. 13 and include the steps of forming two forms of calcium carbonate in step 60. In step 62, the sulfate, chlorides, and heavy metals such as; strontium and chromium concentrations are reduced.

Figure 15:
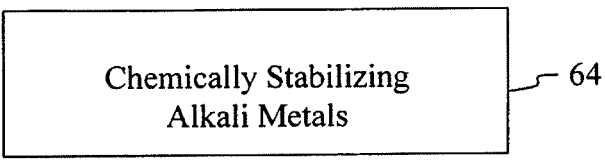

As shown in FIG. 15 the alkali metals are stabilized in step 64.

Figure 16:
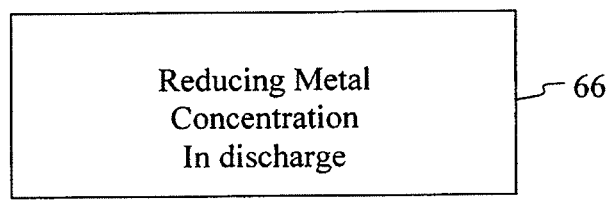

A further embodiment of the invention is illustrated in FIG. 16 where the metal concentrations in the discharge from the embodiment shown in FIG. 13 are reduced in step 66.

Figure 17:
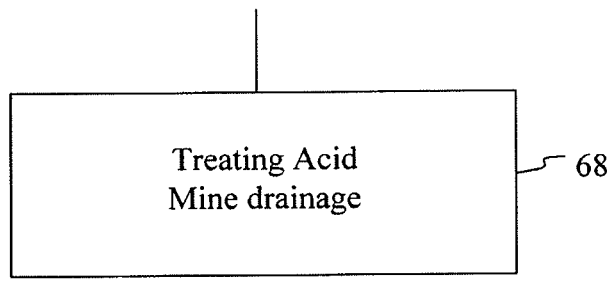
Figure 18:
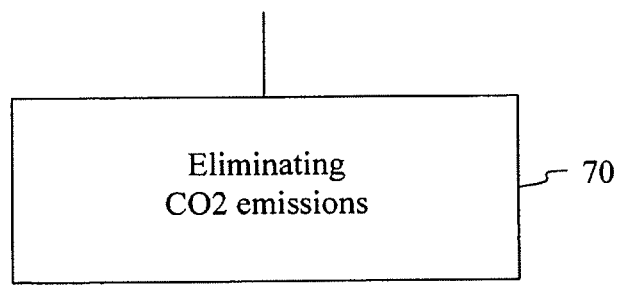

A subsequent step to the process of FIG. 13 is shown in FIG. 17. That step 68 uses the treated kiln dust from step 58 or 62 or 64 or 66 to treat acid mine drainage. Further, as shown in FIG. 18 the process of the present invention may also include step 70 for reducing or eliminating carbon dioxide emissions.

While the invention has been described in connection with its preferred embodiment, it should be recognized that changes and modifications may be made therein without departing from the scope of the appended claims.

Example 10

Stabilization of CKD

The stabilization mechanism of hydrated CKD through carbonation was evaluated experimentally by investigating the morphological structure, colour and size of the particles before and after the treatment process. The colour gets fainter after carbonation and the particle sizes reduced from about 7 to 1 μm. The untreated CKD particles were coarse, irregular and random in shape and size. After carbonation, well defined rhombohedra calcite particles are formed as indicated in FIGS. 10a and 11a). Furthermore, the physicochemical properties of the treated CKD were modified after the carbonation as shown in Table 7.

TABLE 7

Typical physical properties of untreated and treated CKD

| Measurement | Untreated CKD | Treated CKD |
|---|---|---|
| Mean Particle Size (μm) | 3-5 | 1 |
| pH | 12-12.5 | 8.5-9.5 |
| Electrical Conductivity (μs) | 94.1 | 33.3 |
| TDS (mg/l) | 560 | 201 |
| Loss on Ignition | 25.17 | 35.57 |
| Liquid Limit (%) | 26.13 | 47.96 |
| Plastic limit (%) | 24.70 | 42.70 |
| CEC meq/100 gm | 11.72 | 20.59 |

Also, the results shown in Tables 5 and 6 above indicate that carbonation of the CKD reduced the possible leached pollutants such as chloride, sulfate, Sr and Cr. The observed results can be explained as follows. Firstly, since pH is a dominant parameter for any potential leaching, the lower (closer to neutral) pH of treated CKD contributes to low concentrations of sulfates and chlorides, and low heavy metal solubility. Thus, after accelerated carbonation, the natural pH of treated CKD is closed to the minima of heavy metal solubility. Furthermore, it has been shown that a trace element leaching is also reduced by sorption in new formed phases. Secondly, since some of the existing phases of untreated CKD such as arcanite ($K_2SO_4$) and sylvite (KCl) are unstable or soluble at earth surface conditions they will precipitate when CKD gets in contact with water and carbon dioxide.

Example 11

Production of Modified Sulfur

The desert sand used in this study was obtained from a sandy dunes quarry in Al Ain area, UAE. Sand is a naturally occurring, finely divided rock, comprising particles or granules. The most common constituent of sand is silica (silicon dioxide), usually in the form of quartz, which because of its chemical inertness and considerable hardness, is quite resistant to weathering. The cumulative grain sizes distribution is represented in FIG. 1. Chemical analysis of the sand showed that the same consisted of 74.4% $SiO_2$, 0.47% $AL_2O_3$, 0.676% $Fe_2O_3$, 16.35% CaO, 1.158% MgO and 0.13% $K_2O$.

The sulfur employed was commercial grade sulfur (about. 99.9% purity), attained from Al Ruwais refinery, (UAE), where large quantities of by-product sulfur are currently generated by the cleanup of hydrogen sulfide in the production of petroleum and natural gas.

Modified sulfur was prepared by mixing elemental sulphur, bitumen and Triton X-100® at about 140° C. for a period of 45-60 minutes. The development of the reaction was followed by changes in viscosity and homogeneity of the mixture. The modified sulfur product contains sulfur polymer, and on cooling possesses glass like properties. The bitumen and Triton X-100 inhibit the sulfur from forming, or reverting into crystals and minimizes the size of any sulfur crystals, which do form. It is believed that the growth of large crystals may be restricted because the particles of bitumen serve as nucleation sites that induce the formation of many small crystals instead of fewer large ones, as indicated in FIGS. 19a and 19b. The resulting modified sulfur, which is suitable for use according to the present invention, can be made economically, and leads to SPC products that are not highly stressed and have good durability and corrosion resistance. It should be noted that addition of the bitumen and Triton X-100 contributed to: (a) prevention of the growth of macro sulfur crystals, (b) uniform polymer distribution in the resulting modified sulfur, leading to an increased resistance to crack formation and increased thermal stability, and (c) modification of sulfur mineralogy. Experimental results indicated that the modified sulfur remained in its monoclinic (beta) form and did not transform to its original orthorhombic (alpha) form within a test period of 30 months, indicating the high stability of the polymerized sulfur in the modified sulfur product.

Example 12

Sulfur Polymer Concrete Production

SPC specimens were prepared according to the procedure described in ACI 548.2R-93 for mixing and placing sulfur concrete. FIG. 20 illustrates a possible SPC production process. It has been simplified to show that the raw materials undergo several treatment processes. The preparation of the SPC articles is carried out by mixing preheated aggregates with melted elemental sulfur and modified sulfur in a mixer at between approx. 120 and 140° C. More specifically, treated CKD was heated to approx. 100-110° C. Heated sand and treated CKD are mixed with a liquid mix (containing both the elemental sulfur and the modified sulfur) in a suitable mixer until a substantially homogeneous mixture is obtained, the temperature being maintained throughout the mixing. The hot mixture is subsequently cast and shaped into cylinders and cubes using moulds.

Figure 21:
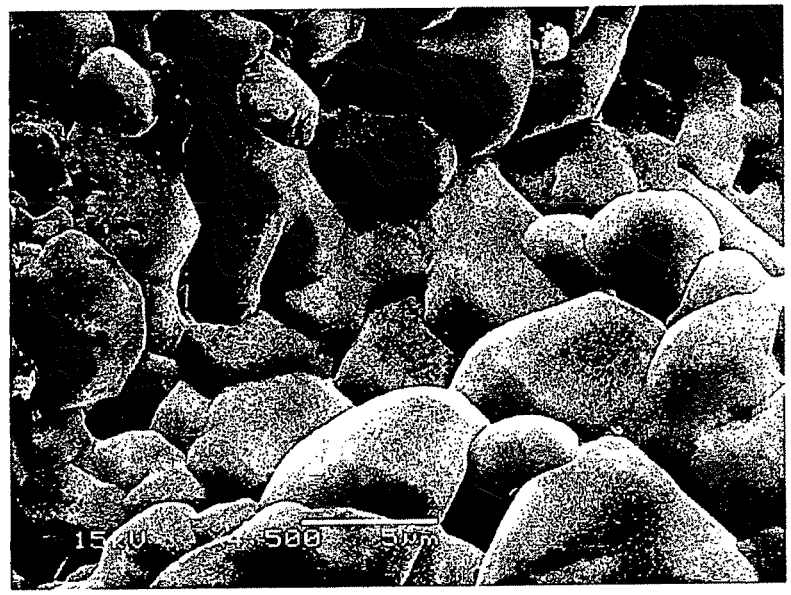
FIG. 21 is a SEM image of CKD-based SPC at the surface.
Figure 22:
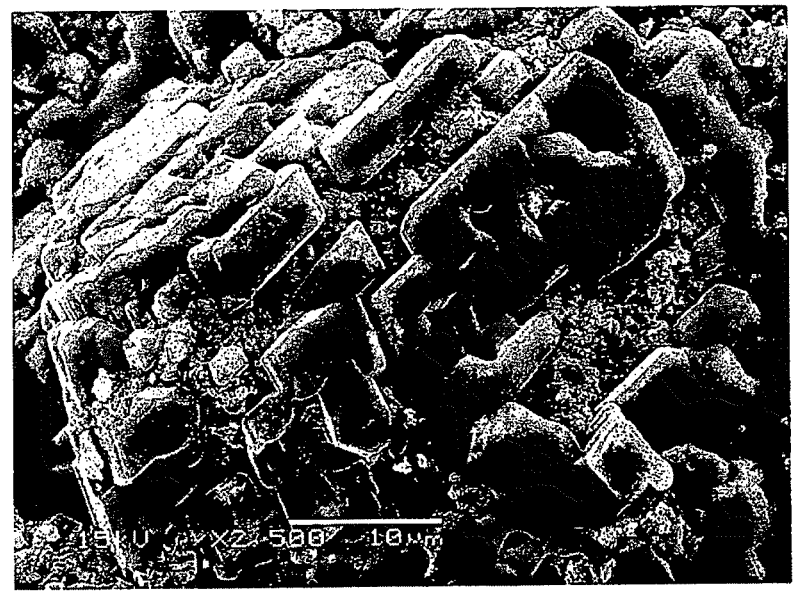
FIG. 22 is a SEM image showing crystallization features of sulfur binder in CKD-based SPC at 25 mm from the surface.

SEM results have shown that the internal structure of the SPC is extremely homogeneous with a high degree of packing. Sulfur was shown to cover and bind very well the aggregates and also fill the inner spaces in such a way that there was almost no appreciable void as shown in FIG. 21. No large sulfur crystals could be observed. Both orthorhombic and monoclinic crystallization features were observed in the samples as shown in FIG. 22.

Example 13

Reinforced SPC Compositions

The ability to reinforce a constructional material with glass fibre is of great practical importance to enhance the tension characteristics of the SPC products. The use of glass fibre to improve the structural integrity of SPC in the construction industry has been reported before (Jong et al., 1985, Fiber reinforcement of concrete to enhance flexural properties. RI-8956, Bureau of Mines, Department of Interior, Washington, D.C., see also U.S. Pat. No. 5,678,234 and U.S. Pat. No. 4,414,385). A small quantity (0.5 wt %) of glass fibre manufactured by Owens Corning, N.Y. and measuring 12.7 mm in length was added to the SPC mixture of Example 12.

Example 14

Mixing Protocol and Measurement Sequence

The proportion of the components used in the SPC mixture affects the workability of the mixture and also the properties of the resulting SPC such as strength and durability. The SPC of the present invention preferably comprises sulfur binder (elemental sulfur and modified sulfur), aggregates (treated CKD and sand) and glass fibre. The strength of the SPC depends on the type of mix, the aggregate properties and the binder to aggregate ratio. As used herein, "binder" refers to the sulfur matrix that derives from both the elemental sulfur and the modified sulfur.

i) Effect of proportion of modified sulphur in the binder: To have proper criteria for evaluating the effect of using modified sulfur, i.e. the difference between the performance of SPC and sulfur-based concrete made without using modified sulfur, SPC specimens were prepared using different proportions of modified sulfur. The results are shown in FIG. 24a: the compressive strength decreased linearly as the proportion of modified sulfur is increased. This is believed to be due to an increase in viscosity, which is in agreement with previous reports in U.S. Pat. No. 4,293,463; viscosity increase due to the presence of polymerized sulfur (in the modified sulfur) has a direct impact on sulfur crystallization. In a more viscous liquid, the growth of the crystals is inhibited, causing a partial reduction in compressive strength.

ii) Effect of glass fibre: The quantity of glass fibre was varied from 0.1-1 wt %. The addition of glass fibre to the mix causes an increase in the compressive strength of SPC. The most preferred proportion, 0.35 wt %, provides suitable structural integrity without adversely affecting mixability. Larger quantities tended to clump, reducing the mixture workability and lowering the strength as shown in FIG. 24b.

iii) Effect of sulfur binder to aggregate ratio: Compressive strength was measured for different ratios. Compressive strength increased as the sulfur binder to aggregate ratio increases up to 0.8, where all particles are coated by a thin layer of sulfur. The sulfur binder enhances SPC corrosion resistance by bonding the aggregate particles, filling the voids, minimizing moisture absorption, and provides sufficient fluidity in the mix to give a workable SPC mixture. The sulfur binder eases the interlocking between the sand and treated CKD particles and makes the mix more compacting by virtue of its lubricating effect. However, with larger proportions of sulfur binder the compressive strength decreased as shown in FIG. 24c, because the thickness of sulfur layers around the aggregate particles was increased, leading to the formation of brittle bonds. The addition of sulfur binder has a very significant influence, on rheological properties of the mixture, which is reflected in the compatibility, density and voids content of the resulting SPC.

Based on the experimental results discussed above, the optimum mix design for the preparation of SPC articles is as follows: 40-45% by weight of elemental sulfur, 0.25-2% by weight of modified sulfur, 20-25% by weight of treated CKD, 30-40% by weight of sand, and 0.1-0.6% by weight of glass fibre.

TABLE 8

Physical and chemical properties of CKD-based SPC, after three days of air curing

| Property | Typical results |
| --- | --- |
| Density (ASTM C 642) | 2.11-2.25 g/cm3 |
| Setting time | 30-60 minutes |
| Curing | Not required |
| Air content (ASTM C 642) | 3-5% |
| Max. moisture absorption (ASTM C 128-97) | 0.22% |
| Max. volumetric shrinkage | 1.29% |
| Electrical conductivity | Nonconductive |
| Max. service temperature | 85-90° C. |
| Flame spread classification | 0 |
| Fuel contributed | 0 |
| Compressive strength (ASTM C 39) | 51 MPa |

Example 15

Physicochemical Properties of SPC

The most common way to evaluate solidification/stabilization is to test density and permeability. The calculated densities of the prepared SPC are in the range of 2.11-2.25 Mg/m$^3$. To perform permeability tests, attempts were made to force water at a pressure of 500 psi through SPC cylindrical samples measuring 38 mm in diameter and 85 mm in length. There was no flow despite continuous application of 500 psi pressure for a period of 3 days, indicating that the prepared SPC is impermeable to water flow. Additional physicochemical results are shown in Table 8.

Example 16

SPC Compressive Strength

Figure 25:
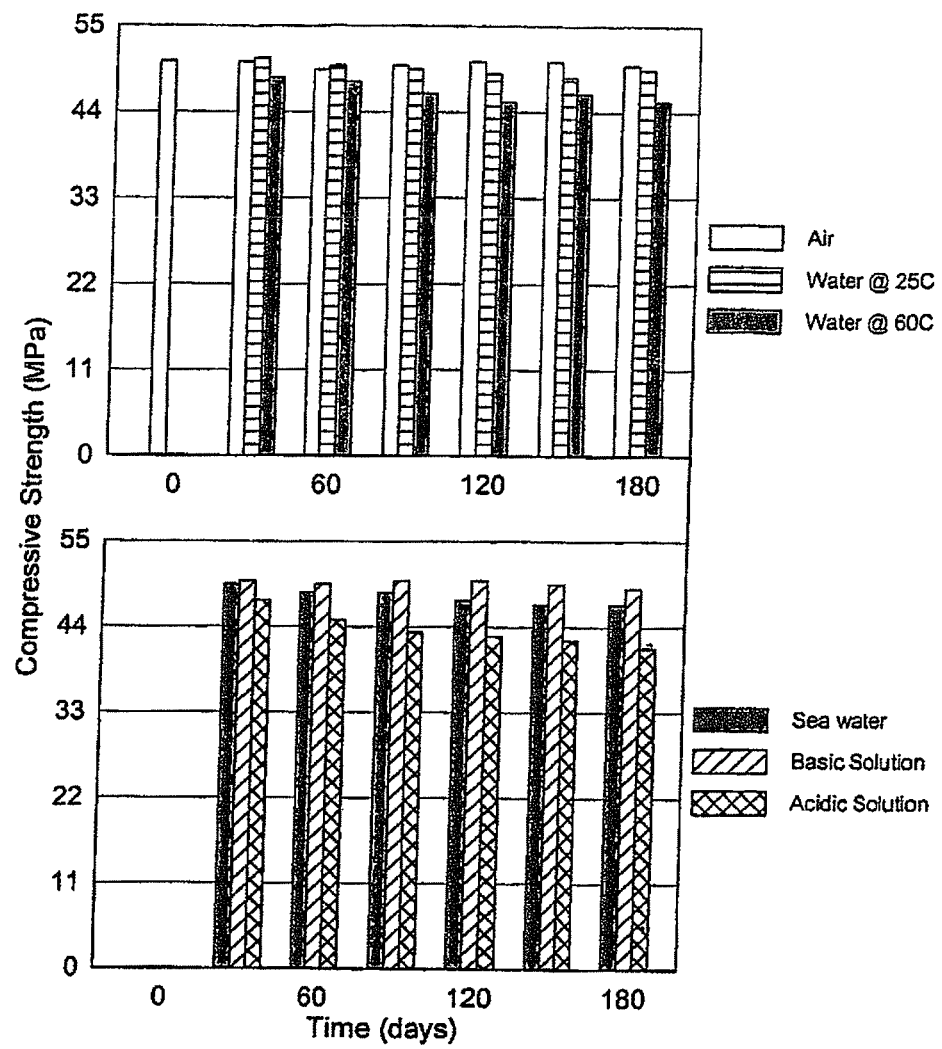
FIG. 25 illustrates how the compressive strength of the CKD-based SPC varies when exposed to different environmental conditions for six months.
Figure 26:
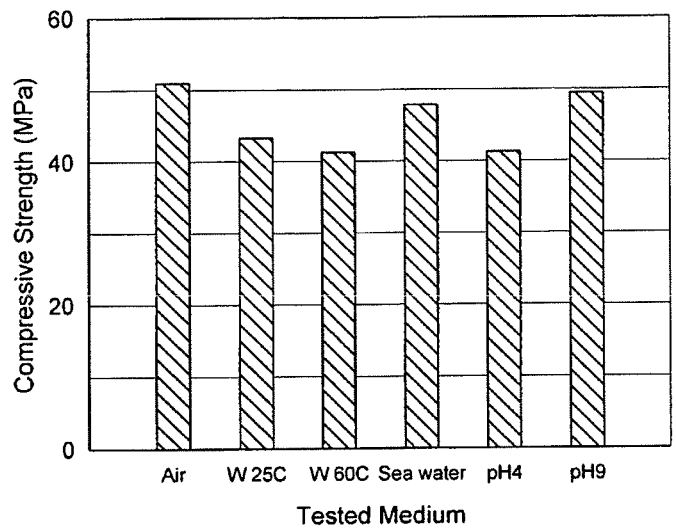
FIG. 26 illustrates how the compressive strength of the CKD-based SPC varies when exposed to different environments for one year.

Cylindrical SPC specimens measuring 38 mm in diameter and 85 mm in length were cast and cured in air for 3 days. Specimens were then immersed in: (a) water solution at 25 and 60° C., (b) sea water at 25° C., (c) acidic universal buffer solution of pH 4 at 25° C., and (d) basic universal buffer solution of pH 9 25° C. All experiments were carried out for a period of 12 months. The cylindrical specimens were positioned so that all sides were in contact with the tested solution. The solutions were kept covered throughout the testing period to minimize evaporation. Compressive strength results are shown in FIG. 25, along with the results for dry SPC specimens prior to immersion in solutions. No visual cracking or volume changes were observed during the 12 month test period. Treated CKD-based SPC exhibits a high resistance to moisture absorption. All specimens had negligible changes in weight and dimensions after 1 year immersed in solution and their compressive strength was also retained after the immersion period as shown in FIG. 26. The results clearly indicated that there was no adverse effect on the compressive strength of the treated CKD-based SPC soaked in: (a) water at 25 and 60° C., (b) basic universal solution of pH 9, (c) sea water, and (d) acidic universal solution of pH 4, after 1, 2, 3, 4, 5, 6 and 12 months of immersion. This in turn supports the view that SPC manufactured with treated CKD has high resistance to wide range of environmental conditions.

Example 17

SPC Mineralogical Properties and Microstructure

Figure 27:
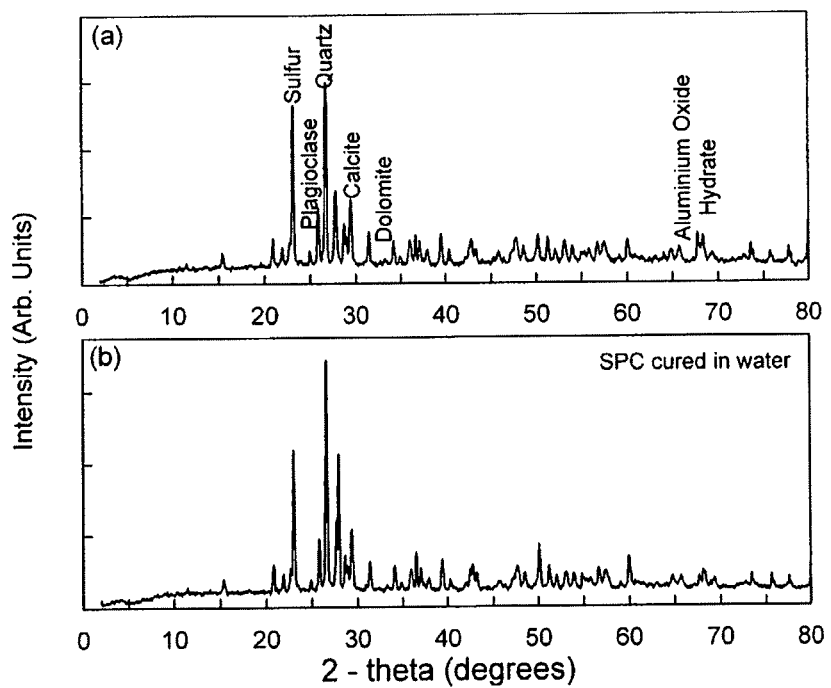
FIG. 27 is a correlation of X-ray diffraction of the CKD-based SPC which has been cured for one month (a) in air at 25° C., and (b) in water at 60° C.

The minerals formed during the production of treated CKD-based SPC were tested using x-ray Philips PW/1840 diffraction analysis, with Ni filter, Cu—Kα radiation (λ=1.542 Å) at 40 KV, 30 mA and scanning speed 0.02°/S. The diffraction peaks were recorded and the minerals formed due to chemical reaction were evaluated. The mineral composition of the SPC, after manufacture and curing conditions in air at 25° C. and water at 60° C., is shown in FIGS. 27a and b. The results shown in these figures indicate that treated CKD-based SPC is composed of sulfur (S), quartz ($SiO_2$), calcite ($CaCO_3$), aluminum oxide ($Al_2O_3$), calcium aluminum oxide hydrate ($Ca_3Al_2O_6nH_2O$), plagioclase; calcium aluminum silicate ($CaAlSi_3O_8$), and dolomite ($CaMg(CO_3)_2$). These dominating peaks remained unchanged in dry and wet cured conditions as indicated in Table 9, except that about 1.5% thaumasite ($CaSiO_3.CaSO_4.CaCO_3.14.5H_2O$) was identified when curing occurs in humid conditions. Thaumasite has been reported as oriented overgrowths on ettringite and enclosed by a second generation on ettringite (Carpenter, A. B., Oriented overgrowths of thaumasite on ettringite, 1963, Am. Miner. 48 11 and 12, pp. 1394-1396). The mineralogical analysis indicated the stability of the manufactured SPC due to the formation of stable minerals such as quartz, calcite, calcium aluminum silicate, aluminium oxide hydrate, calcium aluminium oxide hydrate, and dolomite, with little ettringite formation (which constitutes a major problem in Portland cement concrete due to its ability to absorb water, expand, and produce cracks).

ments were carried out for SPC cubic specimens measuring 50×50×50 mm in length, width and height. The specimens were immersed in pure water at different temperatures of 25 and 60° C., universal basic buffer solution of pH 9, universal acidic buffer solution of pH 4, different acid solutions of pH 4 (sulphuric, acetic, phosphoric, hydrochloric and nitric acid) for 270 days. In such tests, the material is kept in contact with pure water, acid, base or salt solution for a certain period of time, after which the concentration of ions in the liquid is measured and compared with regulatory standards.

An accelerated test method was used to produce a response that characterizes the long term behaviour of cementitious material. The leaching of monolithic (instead of crushed) waste forms was evaluated in these tests. Leaching may occur under static or dynamic conditions, depending on the frequency of the leaching solution renewal. In static leach tests, the leaching solution is not replaced by a fresh solution; therefore, leaching takes place under static hydraulic conditions (low leaching velocities and maximum leached concentrations for monolithic waste forms). In dynamic leach tests, the leaching solution is periodically replaced with new solution; therefore, this test simulates the leaching of a monolithic

TABLE 9

Distribution of the mineral composition percentage of CKD-based SPC cured at different conditions

| Curing medium | Quartz | Sulfur | Calcite | plagioclase | Dolomite | Thaumasite (Ettringite) | Aluminum Oxide | Calcium Aluminum Oxide Hydrate |
|---|---|---|---|---|---|---|---|---|
| Air | 44 | 36 | 16 | 1.2 | 0 | 0 | 1.5 | 1.3 |
| Water | 46 | 32 | 14 | 2 | 1 | 1.5 | 2 | 1.5 |

Figure 28:
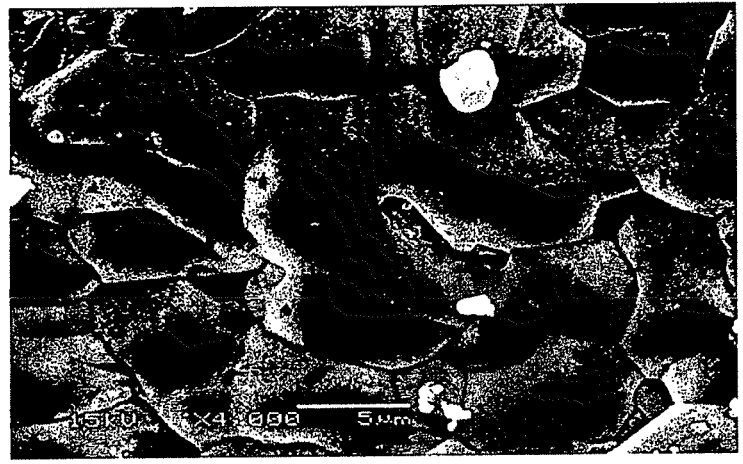
FIG. 28 is a SEM image of CKD-based SPC which has been immersed for one year in distilled water.
Figure 29:
FIG. 29 is a SEM image of CKD-based SPC which has been immersed for one year in 10% sulphuric acid solution.

Microscopic studies of treated CKD-based SPC, immersed in water and in 10% sulphuric acid solution for one year at 24° C., are shown in FIGS. 28 and 29. The SPC, which was immersed in water for one year, had a structure which was closely bonded together with no surface or internal cracking (like that left in open air), while the specimen which was immersed in 10% sulphuric acid solution suffered slight surface erosion. This effect is to be expected because the treated CKD contains calcium carbonate, which is highly affected by acid solution. Elemental analysis of the CKD-based on SPC in water and acid solution using EDX is represented in Table 10 and shows clearly that the average concentration of calcium was decreased after being immersed in acid solution.

TABLE 10 is EDS analyses of CKD-based SPC immersed in water and in 10% sulfuric acid, for one year ar 24° C.

| | Atomic % | |
|---|---|---|
| Element | Water immersion | 10% sulfuric acid immersion |
| Si | 7.81 | 7.50 |
| S | 61.73 | 72.38 |
| Ca | 30.46 | 20.10 |

Example 18

SPC Leaching Potential

Figure 30:
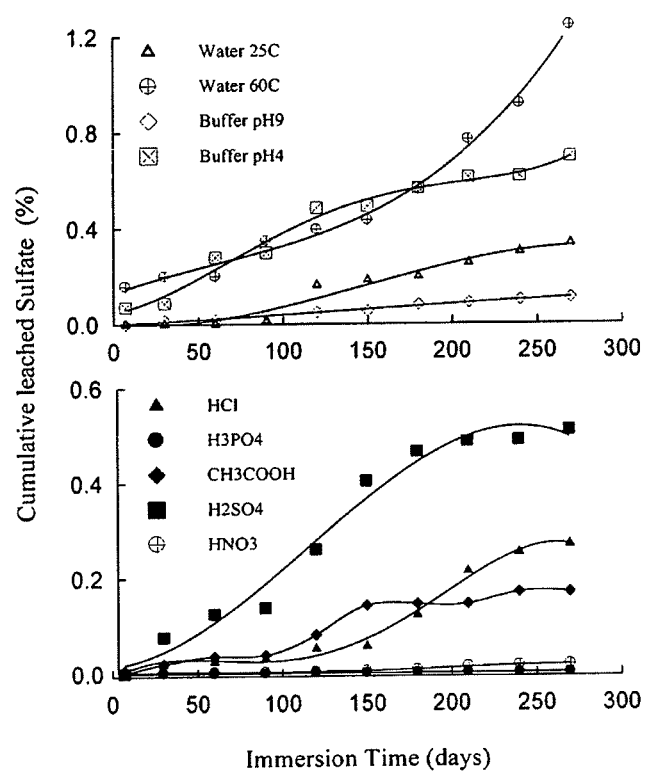
FIG. 30 shows the cumulative leached sulfate from CKD-based SPC in different environments with time.
Figure 31:
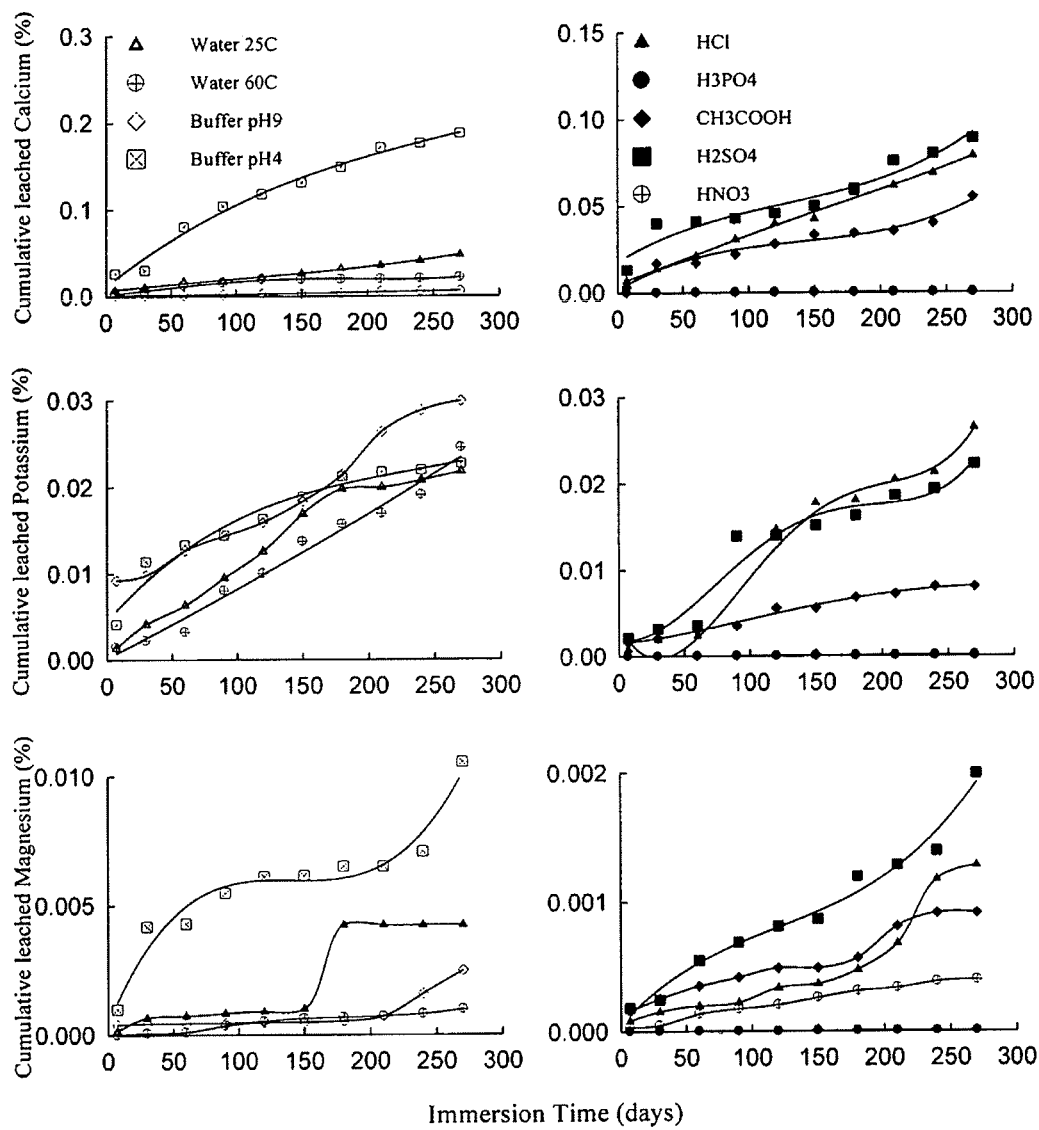
FIG. 31 shows the cumulative leached metals from CKD-based SPC in different environments with time.
Figure 32:
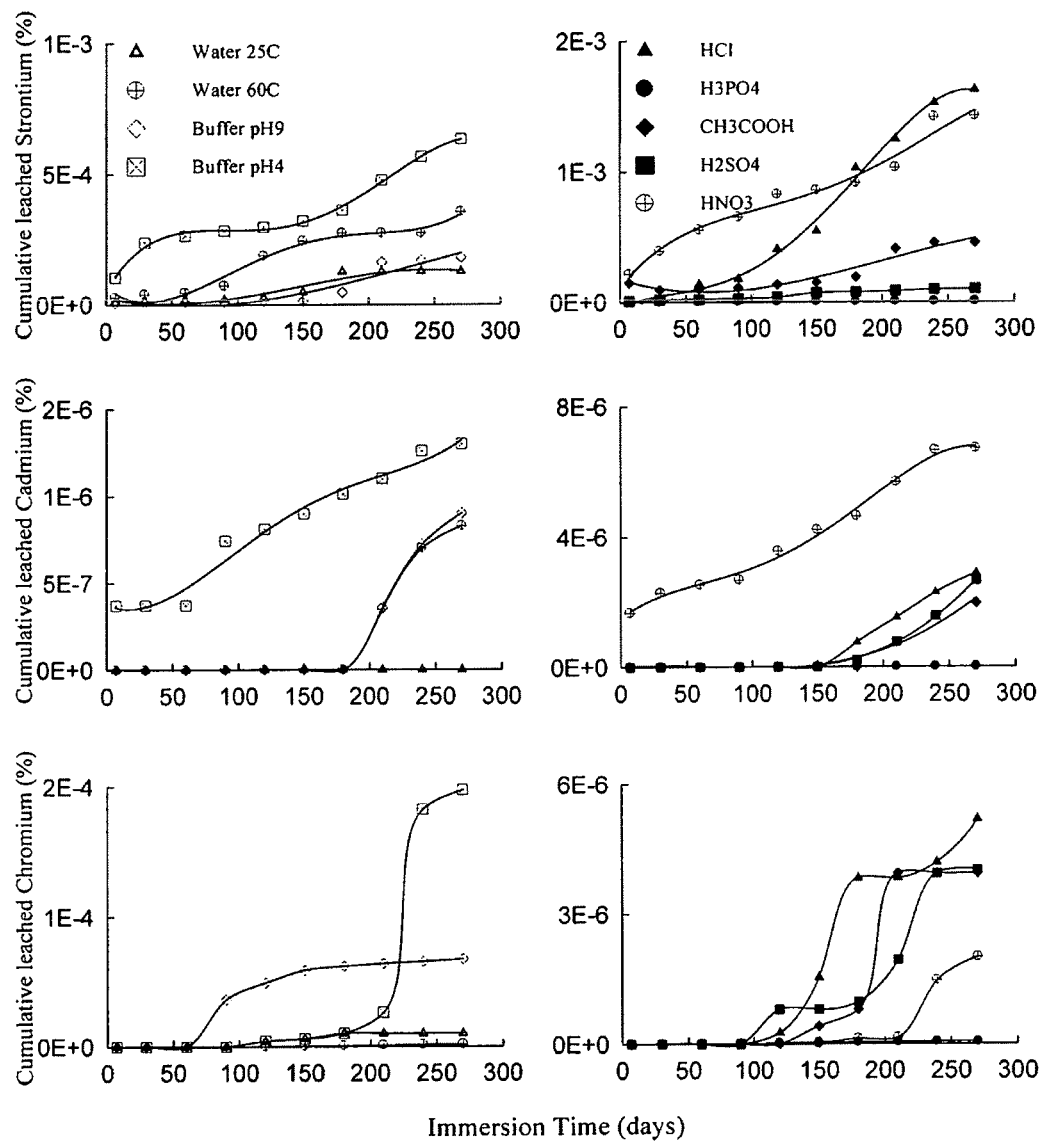
FIG. 32 shows the cumulative leached heavy and transition metals from CKD-based SPC in different environments with time.

The durability of the SPC in harsh environmental conditions was evaluated using leaching tests. Leaching experiwaste form under non equilibrium condition in which maximum saturation limits are not obtained and leaching rates are higher. Static and dynamic, therefore, refer to the velocity not the chemistry of the leaching solution Leached ions were measured by inductively coupled plasma ICP-OES, which is an extremely accurate analytical technique. The results are shown in FIGS. 30-32 and are summarized below.
1. Leached sulfate, calcium, potassium and magnesium are detected, while other materials such as aluminum, sodium, barium and iron were not detected in the leached products.
2. Leached rates of sulfate are extremely low in water and basic buffer solution, but there was a slight increase in acidic buffer solution and in water at 60° C., as shown in FIG. 30. Treated CKD is mostly made up of calcium carbonate ($CaCO_3$), which is water insoluble. Addition of an acid however means addition of hydrogen ions ($H^+$), which will react with carbonate to form hydrogen carbonate $HCO_3^-$ ions that are very soluble in water. If there is more acid, it will react with a carbonate to form $H_2CO_3$ which decomposes to form carbon dioxide $CO_2$ and water. This in turn greatly increases the formation of unstable sulfates. If exposure time was increased it would be expected that the amount of sulfate and metals leached into solution would increase.
3. Temperature is an important factor that greatly influences the rate of leaching of sulfate and metals from the SPC matrix. It was observed that as temperature increases, the amount of leaching also increases, because solubility of metals increases as temperature increases.
4. In all treated CKD-based SPC specimens, calcium salts and oxides form a very stable carbonate. Since the solubility of this product is very low, the dissolution is unlikely to take place. After 270 days of exposure the calcium leached was in the range of 0.05% to 0.20% (based on the initial weight).

5. The treated CKD-based SPC specimens prepared according to the present invention are particularly resistant to corrosion in salt and in basic environments, with a larger corrosion effect being observed in acidic solutions.

6. It was also observed that the rate of calcium leaching was higher in $H_2SO_4$ and HCl compared to $CH_3COOH$, $HNO_3$ and $H_3PO_4$. It was also observed that the amount of leached calcium increased with time and the initial metal leaching rate might not remain constant over a longer duration of immersion as shown in FIG. 31. There is no linear relationship between the amount of metal leached and the initial concentration. Potassium and magnesium leaching was insignificant at room temperature.

7. The results show that metals leached from SPC of the present invention was not affected by nitric, acetic and phosphoric acid solutions.

Three key trace elements were monitored selectively—strontium, cadmium, and chromium—as shown in FIG. 32. The cumulative leaching of these metals was insignificant even after prolonged immersion times. Cadmium is a transition metal that reacts readily with dilute nitric acid, slowly with hot hydrochloric acid, and does not react with alkalis. High temperature has accelerated the leaching process because the solubility of metals depends on temperature and increases as temperature increases.

The invention claimed is:

1. A method for the carbonation of a solid, inorganic and alkaline particulate material which contains alkaline metal salts, which method uses a fluidized bed reactor to effect the carbonation, wherein the material is hydrated cement kiln dust (CKD) having a moisture content of 20% by weight or less.

2. A method for treating CKD containing alkaline metal salts, which method comprises (1) a hydration step, (2) a drying step and (3) a carbonation step, wherein the carbonation step is carried out in a fluidized bed reactor, and wherein if the hydrated CKD resulting from step (2) comprises particles greater than 10 mm in size at their widest point the method further comprises a fractionating step between steps (2) and (3), which fractionating step involves removing particles greater than 10 mm in size at their widest point.

3. A method according to claim 2 wherein in the hydration step the CKD is mixed with water at a temperature of 35-40° C. for a total time of at least 20 minutes, wherein the weight ratio of CKD to water is from 1:1 to 3:1.

4. A method for treating CKD according to claim 2 in which the hydration step involves mixing the CKD and the water at 400 to 800 rpm for 10 to 30 minutes.

5. A method according to claim 2 wherein in the drying step the moisture content of the hydrated CKD is reduced to less than 20% by weight.

6. A method according to claim 5 wherein the drying step involves heating the hydrated CKD to reduce the moisture content of the hydrated CKD to 7 to 12% by weight.

7. A method according to claim 2 in which the drying step is done at 70 to 90° C. for a period of 12 to 48 hours.

8. A method according to claim 2 which includes a fractionating step after the drying step but before the carbonation step, which fractionating step involves removing particles greater than 2 mm at their widest point, and is carried out by sieving.

9. A method according to claim 2 wherein the carbonation step comprises exposing the hydrated CKD to a source of carbon dioxide.

10. A method according to claim 9 wherein in step (3) the hydrated CKD is exposed to carbon dioxide gas at a pressure of 1 to 2 bar for 20 to 60 minutes.

11. A method according to claim 2 wherein the flow rate of the gas fed into the fluidized bed reactor in the carbonation step is at least 2 liter/min.

12. A method according to claim 2 wherein the carbonation step is carried out at 20 to 30° C.

13. A method according to claim 9 in which during the carbonation step carbon dioxide gas is injected into the base of the reactor chamber of the fluidized bed reactor via one or more inlets located around a conical distributor in the base of the reactor chamber.

14. A method according to claim 2 wherein the pH of the CKD to be treated is from 12 to 12.5.

15. A method according to claim 2 wherein at least 25 g of $CO_2$ is consumed in carbonation for each 100 g of hydrated CKD.

16. A method according to claim 15 wherein the amount of $CO_2$ consumed in carbonation for each 100 g of hydrated CKD is measured using thermo-gravimetric analyzer, a temperature range of 50 to 1000° C. and a heating rate of 20° C./min.

17. A method according to claim 16 wherein the measured amount of $CO_2$ consumed in carbonation represents at least 90% of the theoretical maximum amount.

18. A method according to claim 2, which is a method for treating waste CKD containing alkaline metal salts comprising the steps of:
 a.) providing a mass of CKD containing alkaline metal salts and a mass of water;
 b.) mixing the kiln dust and water to form a mixture containing calcium hydroxide by the hydration process;
 c.) drying the mixture from step b;
 d.) fractionating the dried mixture from step c by sieving;
 e.) providing a fluidized bed reactor; and
 f.) carbonating the dried fractionated and hydrated mixture from step d with cement kiln exhaust gas containing a pollutant selected from the group consisting of acidic oxides of sulfur, nitrogen, carbon, halogen compounds and mixtures thereof in the fluid bed reactor to form a stable material.

19. A fluidized bed reactor apparatus suitable for use in the carbonation step as defined in claim 2, wherein the fluidized bed reactor has a reactor chamber, and in the lower half of the reactor chamber there are one or more inlets for entry of gas into the reactor chamber, the inlets being located around a conical distributor in the base of the reactor chamber.

20. Treated CKD which leaches less than 200 mg/l $SO_4^{2-}$, less than 800 mg/l $Cl^-$, less than 15 mg/l Cr, less than 1 mg/l Sr, less than 300 mg/l Ca, less than 1000 mg/l K and/or less than 150 mg/l Na, when tested according to the British Standard BS EN12457: 2002, using the short term (6 hr) test with a ratio of water to CKD of 2 L/Kg.

21. Treated CKD according to claim 20, which has a pH of less than 10.

22. Treated CKD according to claim 20, which has a mean particle size of less than 5 μm.

23. Treated CKD obtained or obtainable by a method as defined in claim 2.

24. A method of using treated CKD as defined in claim 20 (i) as an aggregate in concrete, (ii) in the neutralization of acid mine drainage or acidic soils, (iii) in a clinker making process, (iv) in the stabilization of soft soils, (v) in the treatment of expansive/swelling soils, (vi) backfilling, (vii) as a sub-base material, (viii) as a pozzolanic activator, or (ix) in asphalt pavement.

25. A method according to claim 24 wherein the treated CKD is used as an aggregate in sulfur polymer concrete (SPC) and the SPC is obtained or obtainable from a mixture comprising said treated CKD, elemental sulfur and modified sulfur.

26. A method according to claim 25 wherein said mixture further comprises fiber glass.

27. A method for manufacturing lime cement, which method uses treated CKD as defined in claim 20.

28. A method of producing SPC, which method comprises heating and mixing treated CKD as defined in claim 20, elemental sulfur and modified sulfur to produce a mixture.

29. A method according to claim 28, which further comprises mixing sand and/or glass fibers with the other components in producing the mixture.

30. A method according to claim 29, which comprises mixing 40-45% by weight of the elemental sulfur, 0.2-2% by weight of the modified sulfur, 20-25% by weight of the treated CKD, 30-40% by weight of the sand and 0-1% by weight of the glass fibers, wherein the % by weight is based on the total weight of the mixture.

31. A method according to claim 28, which comprises subjecting the mixture to a temperature of 130-150° C. for 30 minutes to 2 hours.

32. A method according to claim 28, which comprises mixing together (i) sand which has been pre-heated to a temperature of 170-180° C., (ii) treated CKD which has been pre-heated to a temperature of 95-105° C., and (iii) a mixture of the elemental sulfur and modified sulfur, and then subjecting the mixture of (i), (ii) and (iii) to a temperature of 130-150° C. for 20-40 minutes, casting the resulting mixture into a mold and allowing it to cool.

* * * * *

UNITED STATES PATENT AND TRADEMARK OFFICE
CERTIFICATE OF CORRECTION

PATENT NO. : 8,721,785 B2
APPLICATION NO. : 12/992520
DATED : May 13, 2014
INVENTOR(S) : Abdel-Mohsen Onsy Mohamed et al.

Page 1 of 1

It is certified that error appears in the above-identified patent and that said Letters Patent is hereby corrected as shown below:

On the Title Page

Between Item (65) Prior Publication Data and Item (51) International Patent Classification (Int. Cl.), please insert:

Item -- (60) Related U.S. Application Data
National stage of PCT/IB2009/005579, filed on May 8, 2009, which is an application claiming benefit under 35 U.S.C. § 120 of application No. 12/119,525 filed May 13, 2008, now Pat. No. 8,043,426. --

Signed and Sealed this
Twenty-second Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,721,785 B2  Page 1 of 1
APPLICATION NO. : 12/992520
DATED : May 13, 2014
INVENTOR(S) : Mohamed et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 271 days.

Signed and Sealed this

Twenty-ninth Day of September, 2015

Michelle K. Lee
*Director of the United States Patent and Trademark Office*